(12) United States Patent  (10) Patent No.: US 7,776,175 B2
Silverbrook et al.  (45) Date of Patent: *Aug. 17, 2010

(54) METHOD OF SEALING A FACE OF A MST DEVICE

(75) Inventors: Kia Silverbrook, Balmain (AU); David Charles Psaila, Balmain (AU); Garry Raymond Jackson, Balmain (AU); Akira Nakazawa, Balmain (AU); Jonathan Mark Bulman, Balmain (AU); Jan Waszczuk, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 416 days.

This patent is subject to a terminal disclaimer.

(21) Appl. No.: 11/305,152

(22) Filed: Dec. 19, 2005

(65) Prior Publication Data

US 2006/0151086 A1    Jul. 13, 2006

Related U.S. Application Data

(60) Provisional application No. 60/642,095, filed on Jan. 10, 2005.

(51) Int. Cl.
    *B32B 38/04* (2006.01)
    *B32B 37/02* (2006.01)
    *B29C 65/02* (2006.01)
    *B41J 2/135* (2006.01)

(52) U.S. Cl. .................. 156/252; 156/250; 156/256; 347/65

(58) Field of Classification Search .................. 156/249, 156/250, 252, 256; 347/40, 71, 65
See application file for complete search history.

(56) References Cited

U.S. PATENT DOCUMENTS 5,143,785 A    9/1992   Pujol et al.

(Continued)

FOREIGN PATENT DOCUMENTS

JP    2001-113696    4/2001

(Continued)

*Primary Examiner*—Mark A Osele
*Assistant Examiner*—Christopher C Caillouet

(57) ABSTRACT

A method of sealing an attachment face of a MST device to a mounting surface on a support member, the attachment face having an aperture connected to a first fluid conduit, the attachment face having a second aperture connected to a second conduit, the method comprising the steps of:

applying a thermosetting adhesive to the mounting surface;
  aligning the first aperture with at least part of the second aperture;
  pressing the MST device and the mounting surface together; and,
  curing the thermosetting adhesive; wherein,
  the thermosetting adhesive has a viscosity of between 100 centiPoise and 10,000,000 centiPoise.

Using a thermosetting adhesive instead of a thermoplastic adhesive provides a far more reliable seal. The bond between the thermoplastic adhesive and the MST device surface is prone to thermal fatigue and leakage or outright failure.

18 Claims, 68 Drawing Sheets

U.S. PATENT DOCUMENTS

| | | |
|---|---|---|
| 6,361,146 B1 | 3/2002 | Singh et al. |
| 6,412,921 B1 * | 7/2002 | Manini ........................ 347/65 |
| 6,440,258 B1 | 8/2002 | Imashiro et al. |
| 6,820,797 B2 * | 11/2004 | Clifford ...................... 228/246 |
| 7,240,991 B2 * | 7/2007 | Timm et al. ................... 347/50 |
| 2002/0114947 A1 | 8/2002 | Tanabe et al. |
| 2003/0159773 A1 | 8/2003 | Tomiyama et al. |
| 2005/0156985 A1 | 7/2005 | Silverbrook |
| 2005/0156988 A1 | 7/2005 | Silverbrook |
| 2005/0157012 A1 | 7/2005 | Silverbrook |
| 2007/0196631 A1 * | 8/2007 | Truog et al. ............... 428/195.1 |

FOREIGN PATENT DOCUMENTS

| | | |
|---|---|---|
| JP | 2001-150680 | 6/2001 |
| JP | 2003-534142 | 11/2003 |
| JP | 2004-237528 | 8/2004 |
| JP | 2004-523394 | 8/2004 |

* cited by examiner

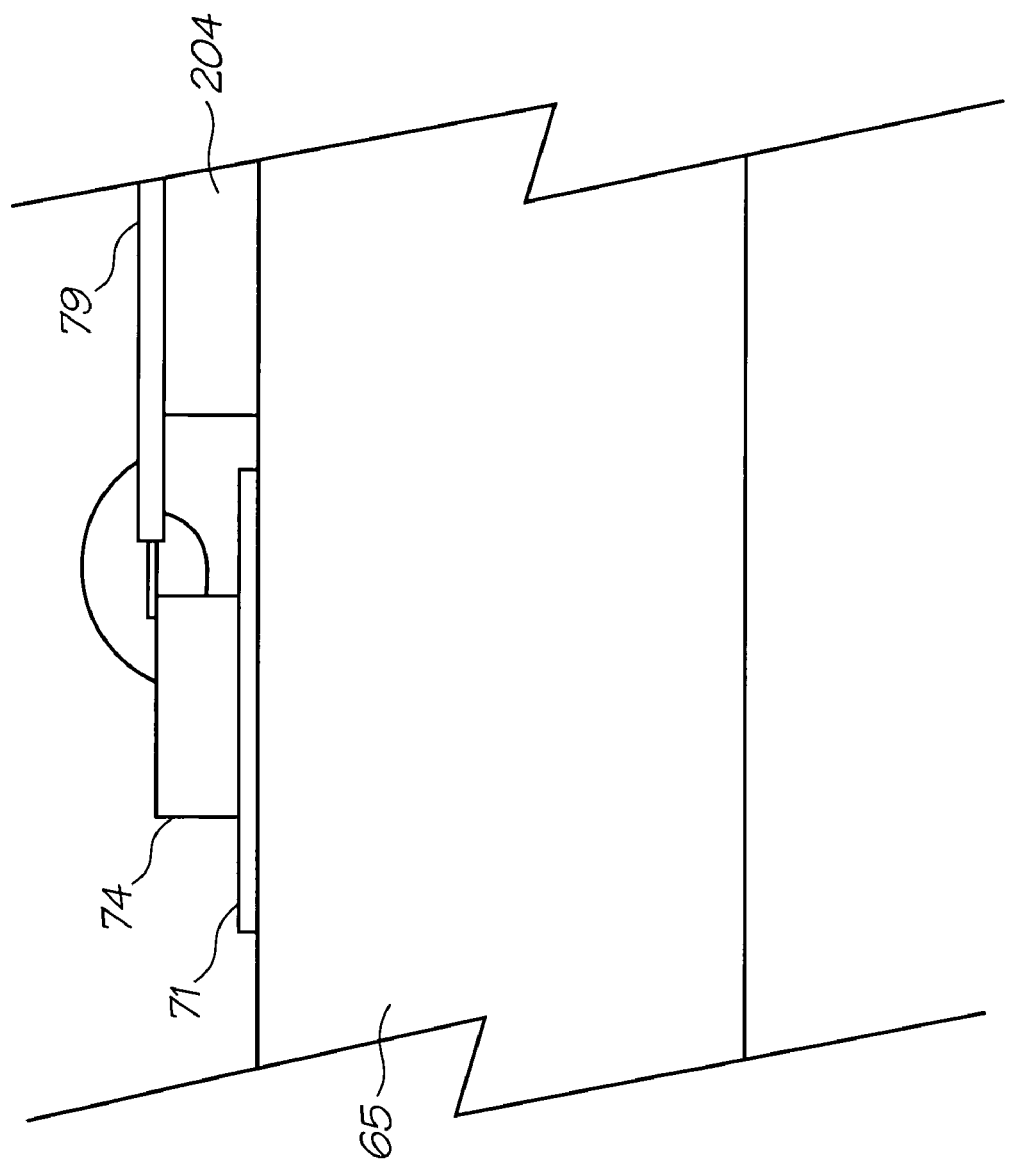

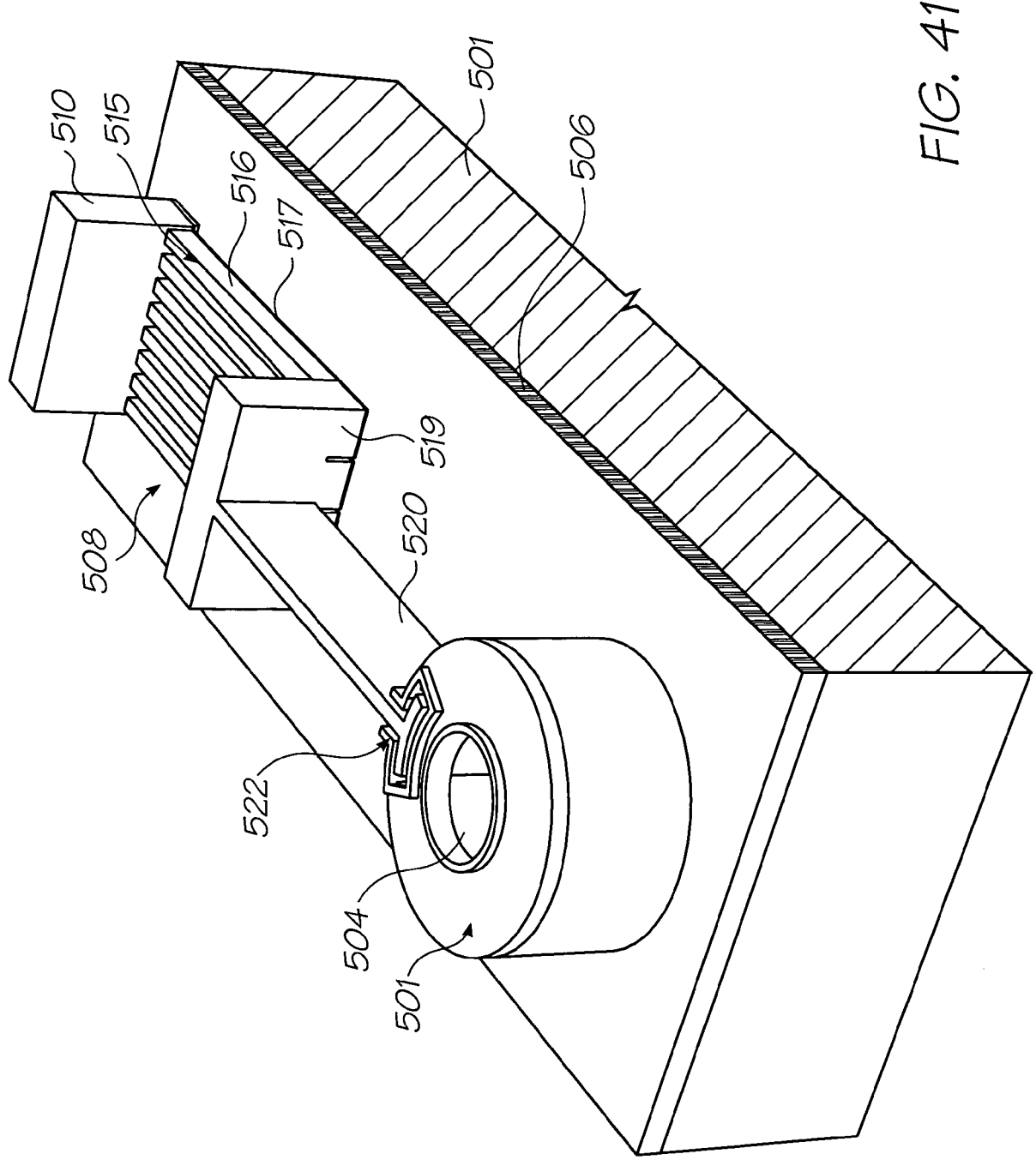

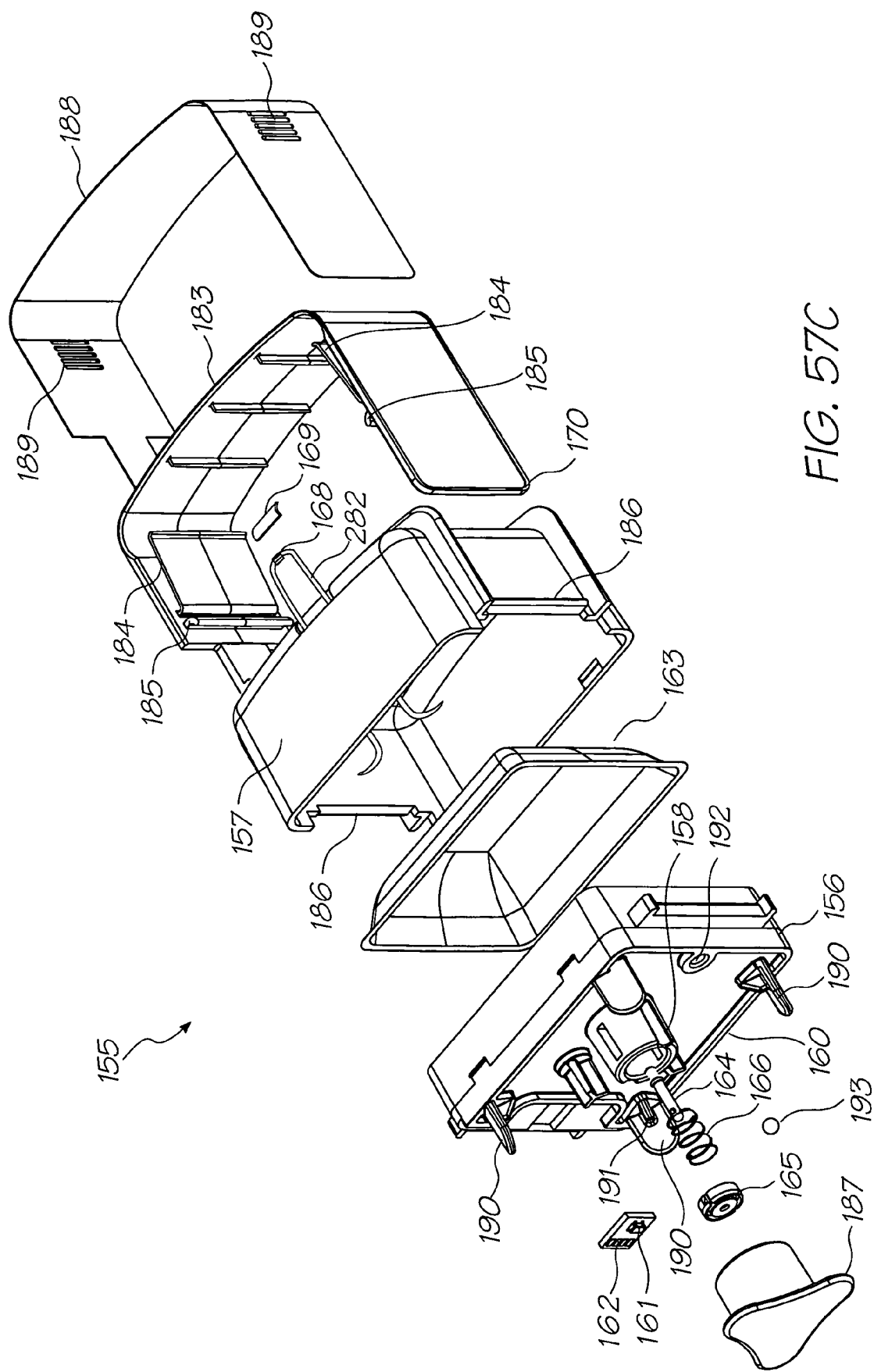

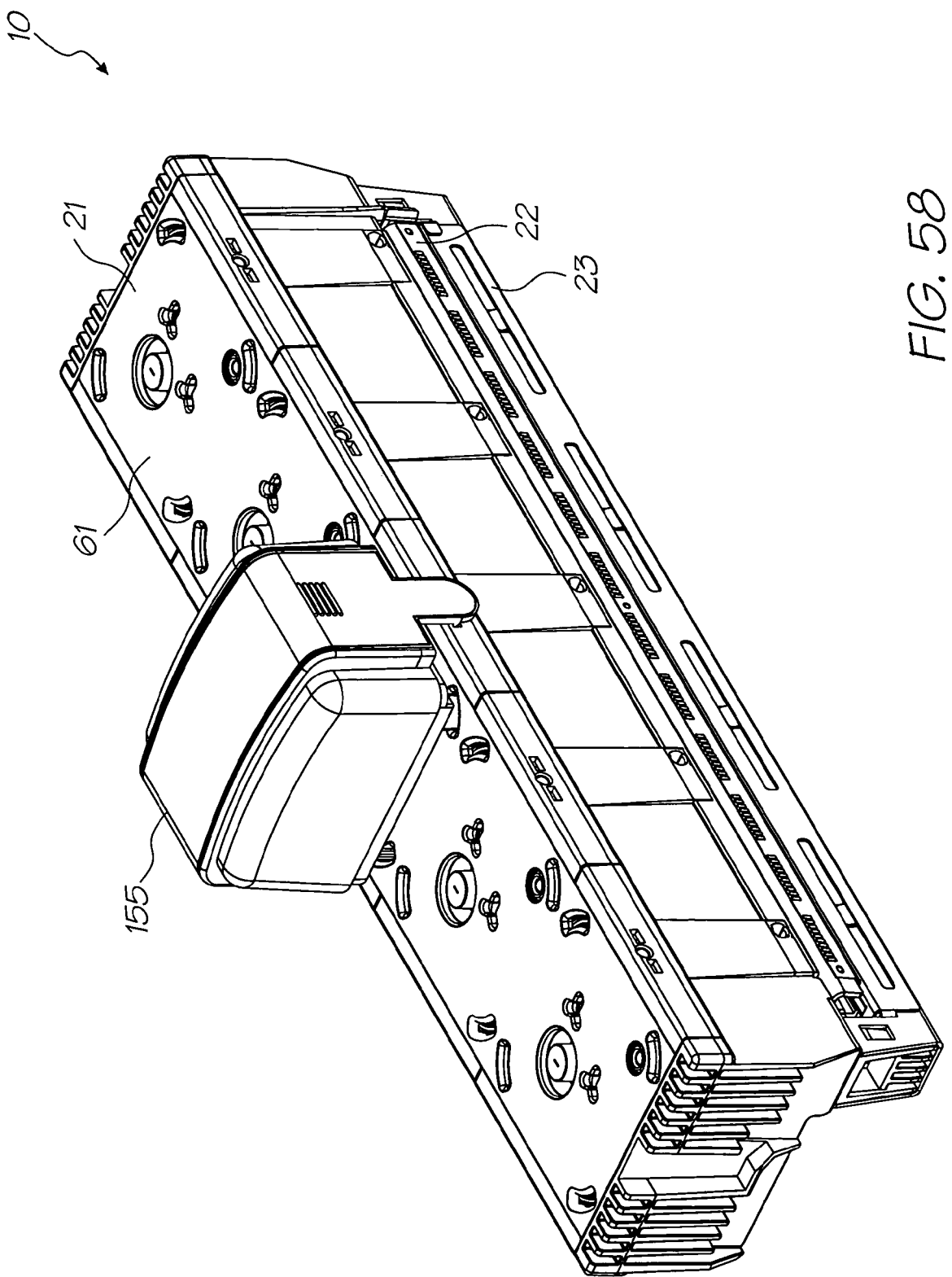

METHOD OF SEALING A FACE OF A MST DEVICE

FIELD OF THE INVENTION

The present invention relates to micro system technologies (MST) devices and in particular MST devices that use or process fluids. Inkjet printheads are a widely used example of such devices and the invention will be described with specific reference to its application as a printhead.

CO-PENDING APPLICATIONS

The following applications have been filed by the Applicant simultaneously with the present application:

| | | | | |
|---|---|---|---|---|
| 11/305,274 | 11/305,273 | 11/305,275 | 11/305,158 | 11/305,008 |

The disclosures of these co-pending applications are incorporated herein by reference.

CROSS REFERENCES TO RELATED APPLICATIONS

Various methods, systems and apparatus relating to the present invention are disclosed in the following US Patents/Patent Applications filed by the applicant or assignee of the present invention:

| | | | | | |
|---|---|---|---|---|---|
| 6,750,901 | 6,476,863 | 6,788,336 | 7,249,108 | 6,566,858 | 6,331,946 |
| 6,246,970 | 6,442,525 | 7,346,586 | 09/505,951 | 6,374,354 | 7,246,098 |
| 6,816,968 | 6,757,832 | 6,334,190 | 6,745,331 | 7,249,109 | 7,197,642 |
| 7,093,139 | 10/636,263 | 10/636,283 | 10/866,608 | 7,210,038 | 7,401,223 |
| 10/940,653 | 10/942,858 | 7,364,256 | 7,258,417 | 7,293,853 | 7,328,968 |
| 7,270,395 | 11/003,404 | 11/003,419 | 7,334,864 | 7,255,419 | 7,284,819 |
| 7,229,148 | 7,258,416 | 7,273,263 | 7,270,393 | 6,984,017 | 7,347,526 |
| 7,357,477 | 11/003,463 | 7,364,255 | 7,357,476 | 11/003,614 | 7,284,820 |
| 7,341,328 | 7,246,875 | 7,322,669 | 11/293,800 | 11/293,802 | 11/293,801 |
| 11/293,808 | 11/293,809 | 11/246,676 | 11/246,677 | 11/246,678 | 11/246,679 |
| 11/246,680 | 11/246,681 | 11/246,714 | 11/246,713 | 7,399,057 | 11/246,671 |
| 11/246,704 | 11/246,710 | 11/246,688 | 7,399,054 | 11/246,715 | 7,367,648 |
| 7,370,936 | 7,401,886 | 11/246,708 | 7,401,887 | 7,384,119 | 7,401,888 |
| 7,387,358 | 11/246,694 | 10/922,842 | 10/922,848 | 6,623,101 | 6,406,129 |
| 6,505,916 | 6,457,809 | 6,550,895 | 6,457,812 | 7,152,962 | 6,428,133 |
| 7,204,941 | 7,282,164 | 10/815,628 | 7,278,727 | 10/913,373 | 10/913,374 |
| 7,367,665 | 7,138,391 | 7,153,956 | 10/913,380 | 10/913,379 | 10/913,376 |
| 7,122,076 | 7,148,345 | 11/172,816 | 11/172,815 | 11/172,814 | 10/407,212 |
| 7,252,366 | 10/683,064 | 7,360,865 | 11/293,832 | 11/293,838 | 11/293,825 |
| 11/293,841 | 11/293,799 | 11/293,796 | 11/293,797 | 11/293,798 | 6,746,105 |
| 11/246,687 | 11/246,718 | 7,322,681 | 11/246,686 | 11/246,703 | 11/246,691 |
| 11/246,711 | 11/246,690 | 11/246,712 | 11/246,717 | 7,401,890 | 7,401,910 |
| 11/246,701 | 11/246,702 | 11/246,668 | 11/246,697 | 11/246,698 | 11/246,699 |
| 11/246,675 | 11/246,674 | 11/246,667 | 7,156,508 | 7,159,972 | 7,083,271 |
| 7,165,834 | 7,080,894 | 7,201,469 | 7,090,336 | 7,156,489 | 10/760,233 |
| 10/760,246 | 7,083,257 | 7,258,422 | 7,255,423 | 7,219,980 | 10/760,253 |
| 10/760,255 | 7,367,649 | 7,118,192 | 10/760,194 | 7,322,672 | 7,077,505 |
| 7,198,354 | 7,077,504 | 10/760,189 | 7,198,355 | 7,401,894 | 7,322,676 |
| 7,152,959 | 7,213,906 | 7,178,901 | 7,222,938 | 7,108,353 | 7,104,629 |
| 7,303,930 | 11/246,672 | 7,401,405 | 11/246,683 | 11/246,682 | 7,246,886 |
| 7,128,400 | 7,108,355 | 6,991,322 | 7,287,836 | 7,118,197 | 10/728,784 |
| 7,364,269 | 7,077,493 | 6,962,402 | 10/728,803 | 7,147,308 | 10/728,779 |
| 7,118,198 | 7,168,790 | 7,172,270 | 7,229,155 | 6,830,318 | 7,195,342 |
| 7,175,261 | 10/773,183 | 7,108,356 | 7,118,202 | 10/773,186 | 7,134,744 |
| 10/773,185 | 7,134,743 | 7,182,439 | 7,210,768 | 10/773,187 | 7,134,745 |
| 7,156,484 | 7,118,201 | 7,111,926 | 10/773,184 | 7,018,021 | 7,401,901 |
| 11/060,805 | 11/188,017 | 11/097,308 | 11/097,309 | 7,246,876 | 11/097,299 |
| 11/097,310 | 7,377,623 | 7,328,978 | 7,334,876 | 7,147,306 | 09/575,197 |
| 7,079,712 | 6,825,945 | 7,330,974 | 6,813,039 | 6,987,506 | 7,038,797 |
| 6,980,318 | 6,816,274 | 7,102,772 | 7,350,236 | 6,681,045 | 6,728,000 |
| 7,173,722 | 7,088,459 | 09/575,181 | 7,068,382 | 7,062,651 | 6,789,194 |
| 6,789,191 | 6,644,642 | 6,502,614 | 6,622,999 | 6,669,385 | 6,549,935 |
| 6,987,573 | 6,727,996 | 6,591,884 | 6,439,706 | 6,760,119 | 7,295,332 |
| 6,290,349 | 6,428,155 | 6,785,016 | 6,870,966 | 6,822,639 | 6,737,591 |
| 7,055,739 | 7,233,320 | 6,830,196 | 6,832,717 | 6,957,768 | 09/575,172 |
| 7,170,499 | 7,106,888 | 7,123,239 | 10/727,181 | 10/727,162 | 7,377,608 |
| 7,399,043 | 7,121,639 | 7,165,824 | 7,152,942 | 10/727,157 | 7,181,572 |
| 7,096,137 | 7,302,592 | 7,278,034 | 7,188,282 | 10/727,159 | 10/727,180 |
| 10/727,179 | 10/727,192 | 10/727,274 | 10/727,164 | 10/727,161 | 10/727,198 |
| 10/727,158 | 10/754,536 | 10/754,938 | 10/727,160 | 10/934,720 | 7,171,323 |
| 7,278,697 | 7,369,270 | 6,795,215 | 7,070,098 | 7,154,638 | 6,805,419 |
| 6,859,289 | 6,977,751 | 6,398,332 | 6,394,573 | 6,622,923 | 6,747,760 |
| 6,921,144 | 10/884,881 | 7,092,112 | 7,192,106 | 11/039,866 | 7,173,739 |
| 6,986,560 | 7,008,033 | 11/148,237 | 7,222,780 | 7,270,391 | 7,195,328 |
| 7,182,422 | 7,374,266 | 10/854,522 | 10/854,488 | 7,281,330 | 10/854,503 |
| 7,328,956 | 10/854,509 | 7,188,928 | 7,093,989 | 7,377,609 | 10/854,495 |
| 10/854,498 | 10/854,511 | 7,390,071 | 10/854,525 | 10/854,526 | 10/854,516 |
| 7,252,353 | 10/854,515 | 7,267,417 | 10/854,505 | 10/854,493 | 7,275,805 |
| 7,314,261 | 10/854,490 | 7,281,777 | 7,290,852 | 10/854,528 | 10/854,523 |

-continued

| | | | | | |
|---|---|---|---|---|---|
| 10/854,527 | 10/854,524 | 10/854,520 | 10/854,514 | 10/854,519 | 10/854,513 |
| 10/854,499 | 10/854,501 | 7,266,661 | 7,243,193 | 10/854,518 | 10/854,517 |
| 10/934,628 | 7,163,345 | 11/293,804 | 11/293,840 | 11/293,803 | 11/293,833 |
| 11/293,834 | 11/293,835 | 11/293,836 | 11/293,837 | 11/293,792 | 11/293,794 |
| 11/293,839 | 11/293,826 | 11/293,829 | 11/293,830 | 11/293,827 | 11/293,828 |
| 7,270,494 | 11/293,823 | 11/293,824 | 11/293,831 | 11/293,815 | 11/293,819 |
| 11/293,818 | 11/293,817 | 11/293,816 | 10/760,254 | 10/760,210 | 7,364,263 |
| 7,201,468 | 7,360,868 | 10/760,249 | 7,234,802 | 7,303,255 | 7,287,846 |
| 7,156,511 | 10/760,264 | 7,258,432 | 7,097,291 | 10/760,222 | 10/760,248 |
| 7,083,273 | 7,367,647 | 7,374,355 | 10/760,204 | 10/760,205 | 10/760,206 |
| 10/760,267 | 10/760,270 | 7,198,352 | 7,364,264 | 7,303,251 | 7,201,470 |
| 7,121,655 | 7,293,861 | 7,232,208 | 7,328,985 | 7,344,232 | 7,083,272 |
| 11/014,764 | 11/014,763 | 7,331,663 | 7,360,861 | 7,328,973 | 11/014,760 |
| 11/014,757 | 7,303,252 | 7,249,822 | 11/014,762 | 7,311,382 | 7,360,860 |
| 7,364,257 | 7,390,075 | 7,350,896 | 11/014,758 | 7,384,135 | 7,331,660 |
| 11/014,738 | 11/014,737 | 7,322,684 | 7,322,685 | 7,311,381 | 7,270,405 |
| 7,303,268 | 11/014,735 | 7,399,072 | 7,393,076 | 11/014,750 | 11/014,749 |
| 7,249,833 | 11/014,769 | 11/014,729 | 7,331,661 | 11/014,733 | 7,300,140 |
| 7,357,492 | 7,357,493 | 11/014,766 | 7,380,902 | 7,284,816 | 7,284,845 |
| 7,255,430 | 7,390,080 | 7,328,984 | 7,350,913 | 7,322,671 | 7,380,910 |
| 11/014,717 | 11/014,716 | 11/014,732 | 7,347,534 | 11/097,268 | 11/097,185 |
| 7,367,650 | 11/293,820 | 11/293,813 | 11/293,822 | 11/293,812 | 7,357,496 |
| 11/293,814 | 11/293,793 | 11/293,842 | 11/293,811 | 11/293,807 | 11/293,806 |
| 11/293,805 | 11/293,810 | | | | |

The disclosures of these applications and patents are incorporated herein by reference.

BACKGROUND OF THE INVENTION

Many MST devices use or process fluid from an external source. For example, MST pressure sensors, printheads or diagnostic 'lab on a chip' type devices need to allow fluid into the MST structures within the device. If the fluid is fed to the MST device from a larger supporting structure, then it is usually necessary to seal micron scale conduits in the support to micron scale conduits in the MST device. Accurately aligning the MST device relative to the support and forming a reliable fluid seal is difficult and time consuming.

Inkjet printhead integrated circuits (ICs) are good examples of MST devices that have a number of sealed connections to ink supply conduits. In light of this, the present invention will be described with particular reference to inkjet printhead ICs. However, it will be appreciated that the invention has much broader application than that of inkjet printheads.

SUMMARY OF THE INVENTION

Accordingly, the present invention provides a method of sealing an attachment face of a MST device to a mounting surface on a support member, the attachment face having an aperture connected to a first fluid conduit, the attachment face having a second aperture connected to a second conduit, the method comprising the steps of:

applying a thermosetting adhesive to the mounting surface;

aligning the first aperture with at least part of the second aperture;

pressing the MST device and the mounting surface together; and, curing the thermosetting adhesive; wherein, the thermosetting adhesive has a viscosity of between 100 centiPoise and 10,000,000 centiPoise.

Using a thermosetting adhesive instead of a thermoplastic adhesive provides a far more reliable seal. The bond between the thermoplastic adhesive and the MST device surface is prone to thermal fatigue and leakage or outright failure. A thermosetting adhesive can be heated until it is tacky for preliminary positioning of the MST device, and later heated to a known curing temperature so that the adhesive sets and forms a strong chemical bond to the MST device surface. However, the viscosity of the adhesive must be low enough to allow the MST device to properly embed into it, yet high enough that it does not extrude into the conduits to the extent that the flow is blocked or overly restricted.

Preferably the thermosetting adhesive is applied to the mounting surface as a laminated film having a central web with a layer of the thermosetting adhesive on either side and an opening for fluid communication between the first aperture and the second aperture.

Preferably the MST device has an array of inlet apertures in the attachment face connected to a plurality of first fluid conduits, the attachment face has an array of outlet apertures connected to a plurality of second fluid conduits and the laminated film has an array of openings for establishing fluid communication between corresponding apertures in the inlet and outlet arrays.

Preferably the opening in the laminated film is laser drilled.

Preferably the laminated film is drilled with a UV laser so as to not cure the thermosetting adhesive layers immediately adjacent the opening.

Preferably the central web is a polyimide film.

Preferably the polyimide film is more than 25 microns thick.

Preferably the polyimide film about 50 microns thick.

Preferably each of the thermosetting adhesive layers is more than 12 microns thick.

Preferably each of the thermosetting adhesive layers are about 25 microns thick.

Preferably the array of inlet apertures is a series of open channels in the attachment face.

Preferably the channels are more than 50 microns wide and spaced from adjacent channels by more than 50 microns.

Preferably the attachment face has recesses adjacent the channels to hold thermosetting adhesive displaced from between the attachment face and polyimide layer.

Preferably the laminated film is sandwiched between two protective liners, the liner on the support member side of the laminated film being removed after laser drilling the opening but before the attachment of the support structure and the protective liner on the MST device side is removed prior to attaching the MST device.

Preferably the protective liners are PET.

Preferably the thermosetting adhesive layers are initially made tacky when the laminated film is first attached to the support member and the MST device and subsequently heated to their curing temperature.

Preferably the thermosetting adhesive layers have different curing temperatures so that the laminated film is cured to the support member before the MST device is attached without the MST device side thermosetting adhesive curing until after the MST device is attached.

Preferably the opening is formed before the laminated film is attached to the mounting surface of the support member.

Preferably the MST device is a printhead IC and the support structure is a liquid crystal polymer (LCP) moulding.

Preferably the support structure has at least one fiducial marker on the mounting face and the array of openings is aligned with the array of outlet apertures using a vision system tracking a predetermined opening within the array of openings, relative to the at least one fiducial marker.

In a second aspect the present invention provides a method of producing a printhead for an inkjet printer with a print engine controller for controlling the printhead operation, the method comprising the steps of:

providing a printhead IC having an array of ink ejection nozzles formed on a substrate;

providing circuitry for electrical connection to the print engine controller;

providing a support member for supporting the printhead IC and the circuitry within the printer;

providing a polymer film;

securing the polymer film to a surface of the support member by applying heat and pressure for a predetermined time;

mounting the printhead IC and the circuitry to the support member via the polymer film; and, electrically connecting the circuitry to the printhead IC.

Preferably, the circuitry is a flex PCB with tracks of conductive material in layers of polyimide film, and the printhead IC and the flex PCB are simultaneously attached to the support member via the polymer film.

Preferably, the circuitry is a flex PCB with tracks of conductive material in layers of polyimide film, and the flex PCB is attached to the polymer film after the printhead IC is attached.

Preferably, the flex PCB has an adhesive area for attachment to the polymer film once the polymer film has cooled and hardened after the printhead IC attachment process.

Preferably, the circuitry is tracks of conductive material laid within the polymer film.

Preferably, the support member has a plurality of ink feed conduits for establishing fluid communication with at least one ink storage compartment; and, the polymer film is attached to the support member between the ink feed conduits and the printhead integrated circuits, the polymer film having an array of apertures such that the ejection nozzles are in fluid communication with the ink feed conduits.

Preferably, the polymer film is more than 25 microns thick.

Preferably, the polymer film is about 50 microns thick.

Preferably, the array of apertures is an array of laser drilled holes in registration with respective ends of the ink feed conduits.

Preferably, the polymer sealing film is a laminate with an adhesive layer on both sides of a thermoplastic film.

Preferably, the thermoplastic film is a PET or polysulphone.

Preferably, the ink feed conduits are formed in a liquid crystal polymer micro molding.

In a third aspect the present invention provides a method of attaching a MEMS device to a support member with an adhesive film, the MEMS device having an attachment face and a first fluid conduit connected to a first aperture in the attachment face;

the support member having a mounting face and a second fluid conduit connected to a second aperture in the mounting face; and, the polymer film has an opening for fluid communication between the first aperture and the second aperture, the method comprising the steps of:

forming the opening in the polymer film;

aligning the opening with at least part of the second aperture;

applying heat and pressure to attach the polymer film to the mounting face; and, positioning the MEMS device such that the opening is aligned with at east part of the first aperture.

By forming any holes or openings in the polymer film before it is attached to the support member is far less time consuming than forming any openings after the film is attached to the mounting surface. Furthermore, as the openings are usually formed by laser drilling, there is a significant risk that some of the underlying support member is also ablated. This ablated material can lodge in the opening or fluid conduit to constrict or clog the fluid flow.

Preferably, the polymer film is a laminated film having a central web between two outer layers of thermosetting adhesive.

Preferably, the MEMS device has an array of inlet apertures in the attachment face connected to a plurality of first fluid conduits, the attachment face has an array of outlet apertures connected to a plurality of second fluid conduits and the laminated film has an array of openings for establishing fluid communication between corresponding apertures in the inlet and outlet arrays.

Preferably, the opening in the laminated film is laser drilled.

Preferably, the laminated film is drilled with a UV laser so as to not cure the thermosetting adhesive layers immediately adjacent the opening.

Preferably, the central web is a polyimide film.

Preferably, the polyimide film is more than 25 microns thick.

Preferably, the polyimide film about 50 microns thick.

Preferably, each of the thermosetting adhesive layers is more than 12 microns thick.

Preferably, each of the thermosetting adhesive layers are about 25 microns thick.

Preferably, the array of inlet apertures is a series of open channels in the attachment face.

Preferably, the channels are more than 50 microns wide and spaced from adjacent channels by more than 50 microns.

Preferably, the attachment face has recesses adjacent the channels to hold thermosetting adhesive displaced from between the attachment face and polyimide layer.

Preferably, the laminated film is sandwiched between two protective liners, the liner on the support member side of the laminated film being removed after laser drilling the opening but before the attachment of the support structure and the protective liner on the MEMS device side is removed prior to attaching the MEMS device.

Preferably, the protective liners are PET.

Preferably, the thermosetting adhesive layers are initially made tacky when the laminated film is first attached to the support member and the MEMS device and subsequently heated to their curing temperature.

Preferably, the thermosetting adhesive layers have different curing temperatures so that the laminated film is cured to the support member before the MEMS device is attached without the MEMS device side thermosetting adhesive curing until after the MEMS device is attached.

Preferably, the opening is formed before the laminated film is attached to the mounting surface of the support member.

Preferably, the MEMS devices are printhead ICs and the support structure is a liquid crystal polymer (LCP) molding.

Preferably, the laminated film is aligned with the fiducial markers on the support structure with a vision system that calculates a point on or within one of the opening in the array of openings for each MEMS device.

In a fourth aspect the present invention provides laminated film for mounting a MEMS device to a support structure for sealed fluid communication therebetween, the laminated film comprising:

a polymer carrier web between two thermosetting adhesive layers; and, an opening formed in the film for establishing fluid communication between a first fluid conduit in the MEMS device and a second fluid conduit in the support member.

Using a laminated film with thermosetting adhesive one each side provides a far more reliable seal than heated thermoplastic film. The bond between the thermoplastic film and the MEMS device surface is prone to thermal fatigue and leakage or outright failure. A laminate with a central carrier web and thermosetting adhesive can be drilled by a UV laser and later heated to a known curing temperature so that the adhesive sets and forms a strong bond to the MEMS device surface.

Preferably, the MEMS device has an array of inlet apertures in the attachment face connected to a plurality of first fluid conduits, the attachment face has an array of outlet apertures connected to a plurality of second fluid conduits and the laminated film has an array of openings for establishing fluid communication between corresponding apertures in the inlet and outlet arrays.

Preferably, the opening is laser drilled.

Preferably, the thermosetting adhesive has a maximum curing temperature of 150 degrees Celsius.

Preferably, the laser is a UV laser so as to not cure the thermosetting adhesive layers immediately adjacent the opening.

Preferably, the central web is a polyimide film.

Preferably, the polyimide film is more than 25 microns thick.

Preferably, the polyimide film about 50 microns thick.

Preferably, each of the thermosetting adhesive layers is more than 12 microns thick.

Preferably, each of the thermosetting adhesive layers are about 25 microns thick.

Preferably, the array of inlet apertures is a series of open channels in the attachment face.

Preferably, the channels are more than 50 microns wide and spaced from adjacent channels by more than 50 microns.

Preferably, the attachment face has recesses adjacent the channels to hold thermosetting adhesive displaced from between the attachment face and polyimide layer.

In a further aspect there is provided laminated film further comprising two protective liners on each outer surface, the liner on the support member side of the polymer film being removed after laser drilling the opening but before the attachment of the support structure and the protective liner on the MEMS device side is removed prior to attaching the MEMS device.

Preferably, the protective liners are PET.

Preferably, the thermosetting adhesive layers can be heated to a temperature less than the curing temperature to make them for initially attaching the support member and the MEMS device prior to subsequent heating to the curing temperature.

Preferably, the thermosetting adhesive layers have different curing temperatures so that the polymer film is cured to the support member before the MEMS device is attached without the MEMS device side thermosetting adhesive curing until after the MEMS device is attached.

Preferably, the thermosetting adhesive has a viscosity between 100 centiPoise and 10,000,000 centiPoise.

Preferably, the MEMS device is a printhead IC and the support structure is a liquid crystal polymer (LCP) molding.

Preferably, the support structure has at least one fiducial marker on the mounting face and the array of openings is aligned with the array of outlet apertures using a vision system tracking a predetermined opening within the array of openings, relative to the at least one fiducial marker.

In a fifth aspect the present invention provides a method of attaching MEMS devices to a support member via an adhesive film, the MEMS devices each having an attachment face with a first aperture and the support member having a mounting surface with second apertures corresponding to each of the first apertures respectively and a fiducial marker for each of the MEMS devices respectively, and the adhesive film having a plurality of openings, the method comprising the steps of:

positioning the adhesive film using the fiducial marker and the corresponding opening such that the openings register with at least part of the second apertures in the mounting surface;

applying the adhesive film to the mounting surface;

positioning each of the MEMS devices relative to the respective openings; and, attaching the MEMS devices with heat and pressure such that the openings establish the respective first and second apertures.

Instead of putting fiducial markers on both the film and the support member for alignment, the vision system use the fluid openings themselves. This is far more direct and precise as the fiducial markers on the film—usually very small holes—are prone to gross distortion and closing over when the film is heated prior to attachment. The openings are much larger features that suffer less distortion relative to their overall shape. Because the openings are large features, the vision system may need to determine a point on or within the opening, such a the centre, using any convenient technique for calculating this point for shapes that will have a degree of variance due to deformation.

Preferably, the adhesive film is a laminated film having a central web with a layer of the thermosetting adhesive on either side and an opening for fluid communication between the first aperture and the second aperture.

Preferably, the MEMS device has an array of inlet apertures in the attachment face connected to a plurality of first fluid conduits, the attachment face has an array of outlet apertures connected to a plurality of second fluid conduits and the laminated film has an array of openings for establishing fluid communication between corresponding apertures in the inlet and outlet arrays.

Preferably, the opening in the laminated film is laser drilled.

Preferably, the laminated film is drilled with a LW laser so as to not cure the thermosetting adhesive layers immediately adjacent the opening.

Preferably, the central web is a polyimide film.

Preferably, the polyimide film is more than 25 microns thick.

Preferably, the polyimide film about 50 microns thick.

Preferably, each of the thermosetting adhesive layers is more than 12 microns thick.

Preferably, each of the thermosetting adhesive layers are about 25 microns thick.

Preferably, the array of inlet apertures is a series of open channels in the attachment face.

Preferably, the channels are more than 50 microns wide and spaced from adjacent channels by more than 50 microns.

Preferably, the attachment face has recesses adjacent the channels to hold thermosetting adhesive displaced from between the attachment face and polyimide layer.

Preferably, the laminated film is sandwiched between two protective liners, the liner on the support member side of the laminated film being removed after laser drilling the opening but before the attachment of the support structure and the protective liner on the MEMS device side is removed prior to attaching the MEMS device.

Preferably, the protective liners are PET.

Preferably, the thermosetting adhesive layers are initially made tacky when the laminated film is first attached to the support member and the MEMS device and subsequently heated to their curing temperature.

Preferably, the thermosetting adhesive layers have different curing temperatures so that the laminated film is cured to the support member before the MEMS device is attached without the MEMS device side thermosetting adhesive curing until after the MEMS device is attached.

Preferably, the opening is formed before the laminated film is attached to the mounting surface of the support member.

Preferably, the MEMS devices are printhead ICs and the support structure is a liquid crystal polymer (LCP) molding.

Preferably, the laminated film is aligned with the fiducial markers on the support structure with a vision system that calculates a point on or within one of the opening in the array of openings for each MEMS device.

In a sixth aspect the present invention provides a MEMS device for attachment to an adhesive surface, the MEMS device comprising:

an attachment surface for abutting the adhesive surface;

a first fluid conduit connected to a first aperture in the attachment surface; and, a recess in the attachment surface adjacent the first aperture to hold adhesive displaced from between the attachment surface and the adhesive surface when the MEMS device is attached such that displaced adhesive does not block fluid flow in the first conduit.

By profiling the attachment surface so there is a recess next to the first aperture, there is less risk that adhesive will be squeezed into the conduit and impair fluid flow.

Preferably, the MEMS device has an array of inlet apertures in the attachment face for connection to a plurality of first fluid conduits, the mounting face has an array of outlet apertures connected to a plurality of second fluid conduits and the attachment face further comprising an array of recesses interspersed with the array of inlet apertures.

Preferably, the array of inlet apertures is series of open channels in the attachment surface.

Preferably, the array of recesses is an arrangement of pits in the attachment surface.

Preferably, the channels are more than 50 microns wide and each separated by more than 50 microns of the attachment face.

Preferably, the channels are about 80 microns wide and separated by about 80 microns of attachment face.

Preferably, the pits are more than 5 microns wide and more than 5 microns deep.

Preferably, the adhesive is a thermosetting adhesive that cures at a predetermined temperature.

Preferably, the thermosetting adhesive has a maximum curing temperature of 150 degrees Celsius.

Preferably, the thermosetting adhesive are is more than 12 microns thick.

Preferably, the MEMS device is a printhead IC and the support structure is a liquid crystal polymer (LCP) molding.

Preferably, the thermosetting adhesive has a viscosity between 100 centiPoise and 10,000,000 centiPoise.

BRIEF DESCRIPTION OF THE DRAWINGS

The invention will now be described by way of example only, with reference to the preferred embodiments shown in the accompanying figures, in which:

FIG. 18B is a schematic sectional view of a known technique for attaching the printhead IC's to a support molding;

FIG. 41 shows a three dimensional view of a single ink jet nozzle arrangement constructed in accordance with FIG. 40;

FIG. 57C shows an exploded view of the ink refill unit of FIGS. 57A and 57B;

FIG. 58 shows a perspective view of the ink refill unit of FIGS. 57A and 57B docked with the docking ports of the cover assembly;

DETAILED DESCRIPTION OF EMBODIMENTS

Figure 1:
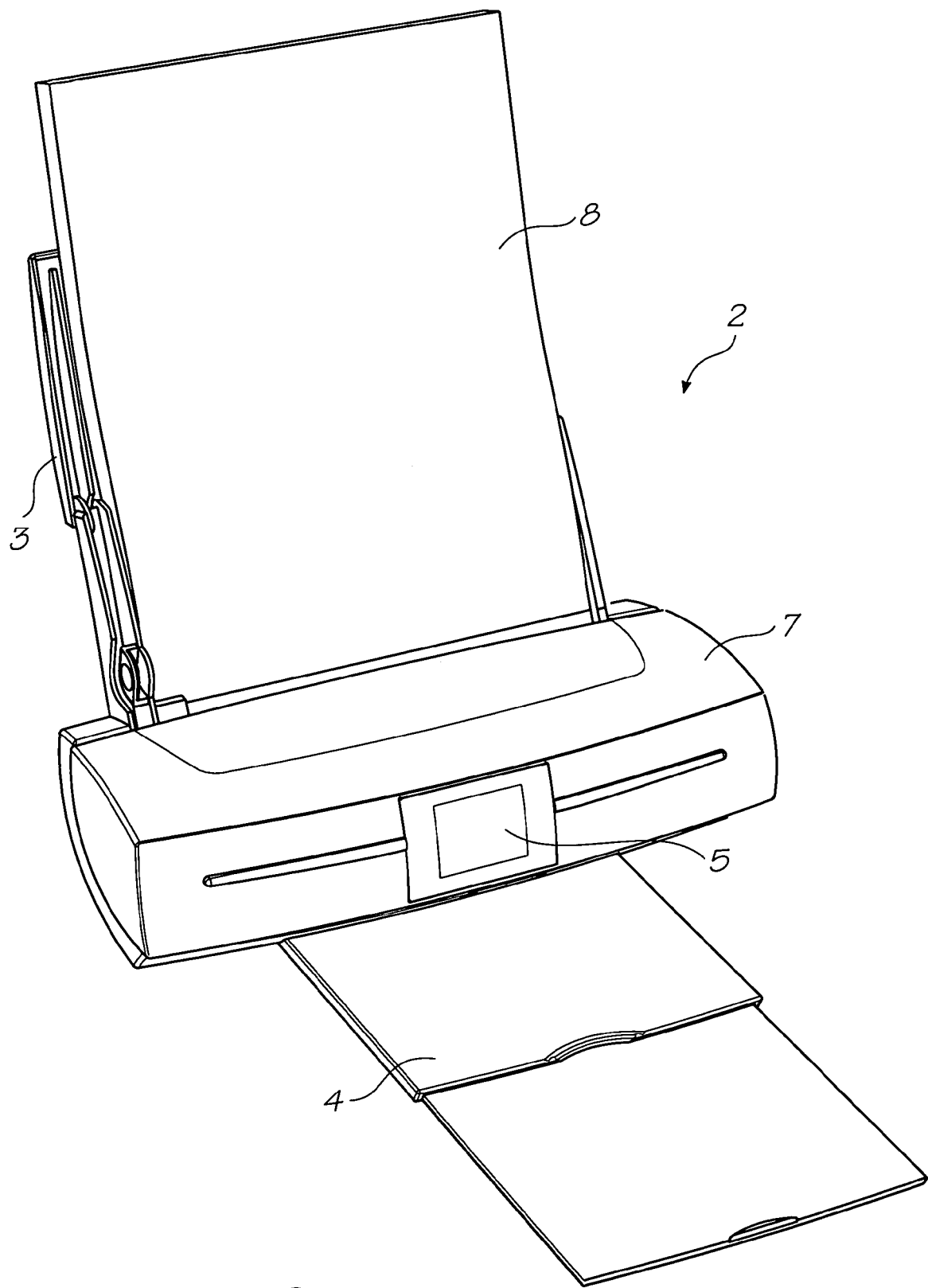
FIG. 1 shows a front perspective view of a printer with paper in the input tray and the collection tray extended.

FIG. 1 shows a printer unit 2 embodying the present invention. Media supply tray 3 supports and supplies media 8 to be printed by the print engine (concealed within the printer casing). Printed sheets of media 8 are fed from the print engine to a media output tray 4 for collection. User interface 5 is an LCD touch screen and enables a user to control the operation of the printer unit 2.

Figure 2:
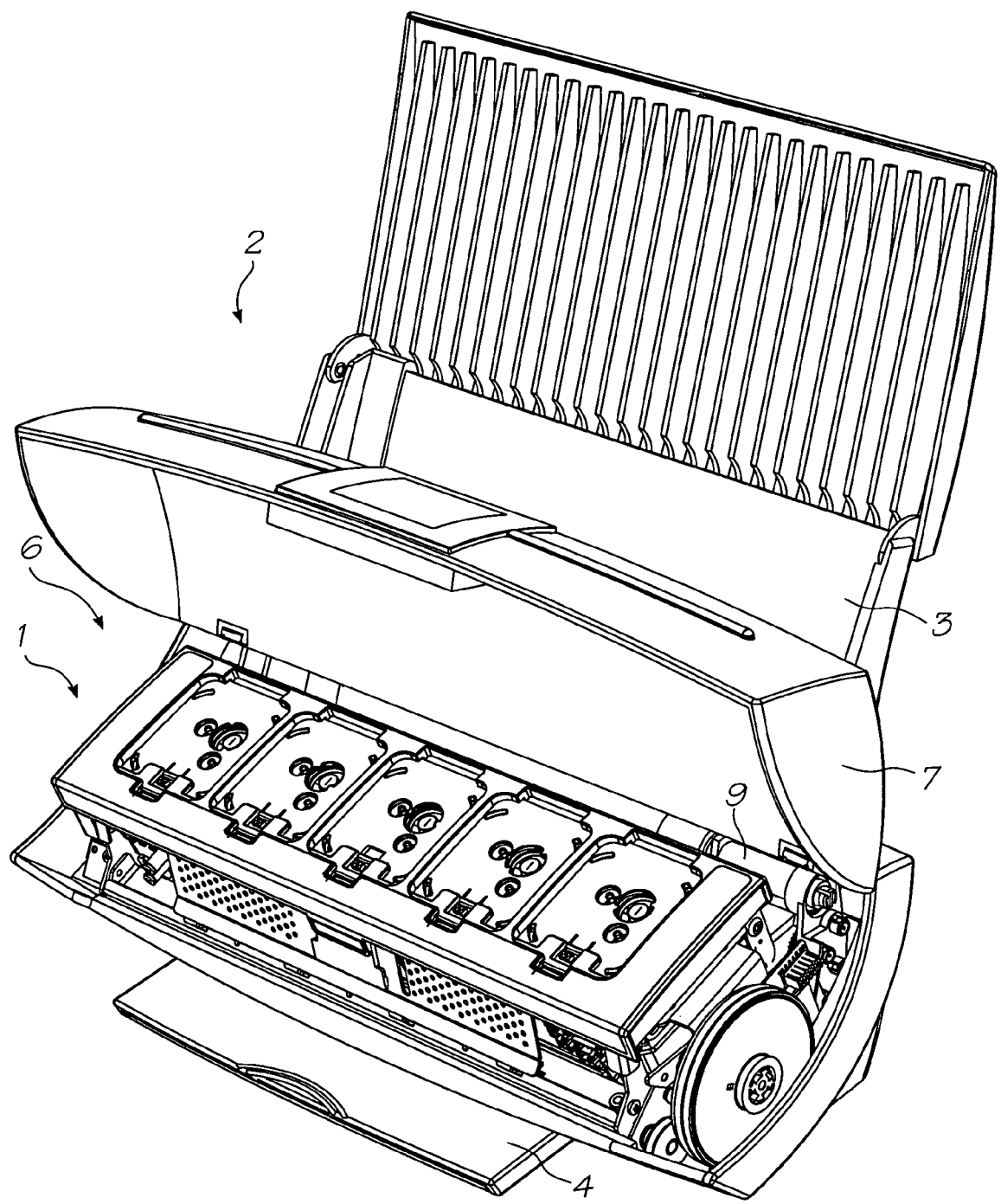
FIG. 2 shows the printer unit of FIG. 1 (without paper in the input tray and with the collection tray retracted) with the casing open to expose the interior.

FIG. 2 shows the lid 7 of the printer unit 2 open to expose the print engine 1 positioned in the internal cavity 6. Picker mechanism 9 engages the media in the input tray 3 (not shown for clarity) and feeds individual streets to the print engine 11.

The print engine 1 includes media transport means that takes the individual sheets and feeds them past a printhead assembly (described below) for printing and subsequent delivery to the media output tray 4 (shown retracted).

Figure 3:
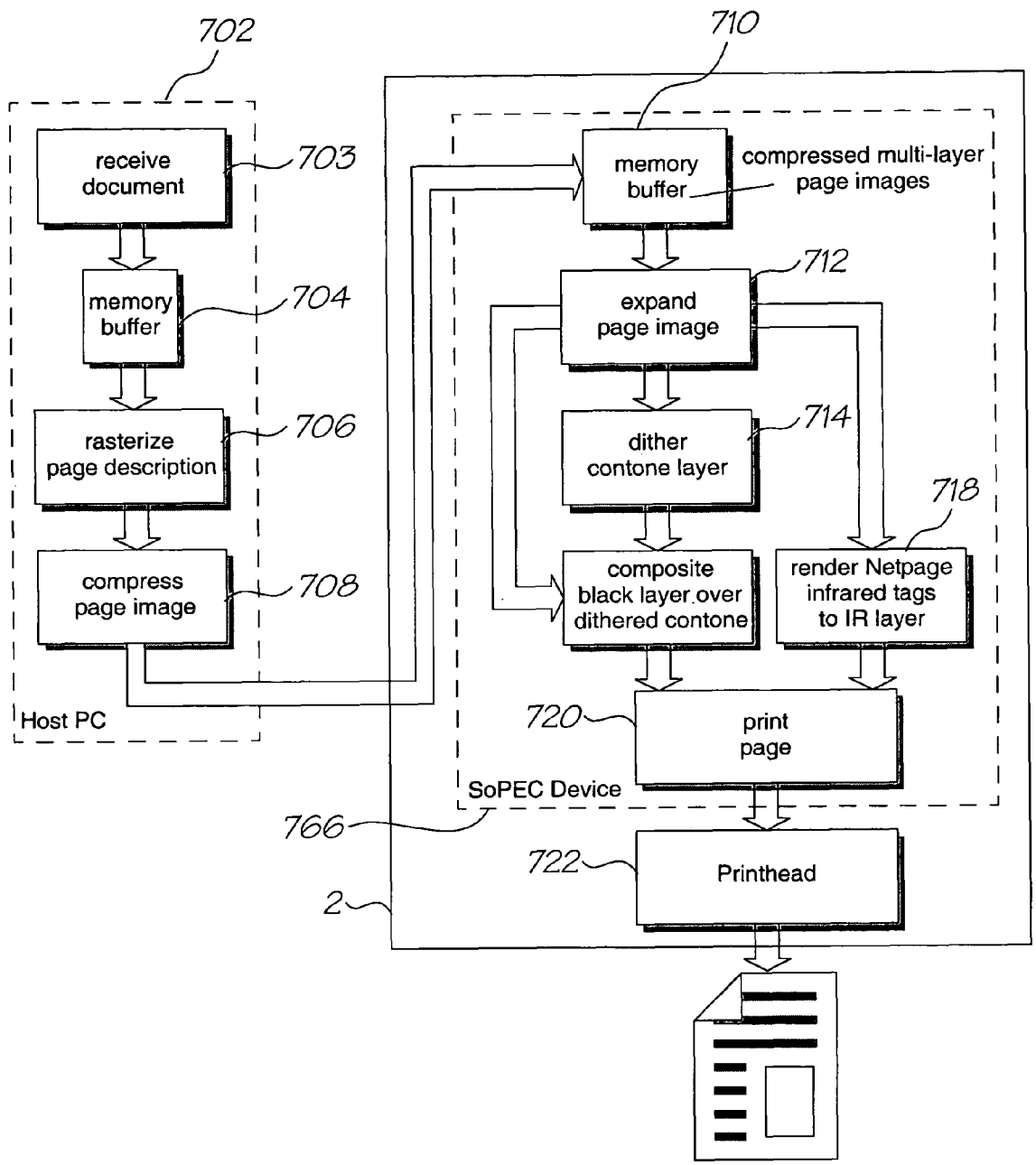
FIG. 3 shows a schematic of document data flow in a printing system according to one embodiment of the present invention.

FIG. 3 schematically shows how the printer unit 2 is arranged to print documents received from an external source, such as a computer system 702, onto a print media, such as a sheet of paper. In this regard, the printer unit 2 includes an electrical connection with the computer system 702 to receive pre-processed data. In the particular situation shown, the external computer system 702 is programmed to perform various steps involved in printing a document, including receiving the document (step 703), buffering it (step 704) and rasterizing it (step 706), and then compressing it (step 708) for transmission to the printer unit 2.

The printer unit 2 according to one embodiment of the present invention, receives the document from the external computer system 702 in the form of a compressed, multi-layer page image, wherein control electronics 766 buffers the image (step 710), and then expands the image (step 712) for further processing. The expanded contone layer is dithered (step 714) and then the black layer from the expansion step is composited over the dithered contone layer (step 716). Coded data may also be rendered (step 718) to form an additional layer, to be printed (if desired) using an infrared ink that is substantially invisible to the human eye. The black, dithered contone and infrared layers are combined (step 720) to form a page that is supplied to a printhead for printing (step 722).

In this particular arrangement, the data associated with the document to be printed is divided into a high-resolution bi-level mask layer for text and line art and a medium-resolution contone color image layer for images or background colors. Optionally, colored text can be supported by the addition of a medium-to-high-resolution contone texture layer for texturing text and line art with color data taken from an image or from flat colors. The printing architecture generalises these contone layers by representing them in abstract "image" and "texture" layers which can refer to either image data or flat color data. This division of data into layers based on content follows the base mode Mixed Raster Content (MRC) mode as would be understood by a person skilled in the art. Like the MRC base mode, the printing architecture makes compromises in some cases when data to be printed overlap. In particular, in one form all overlaps are reduced to a 3-layer representation in a process (collision resolution) embodying the compromises explicitly.

Figure 4:
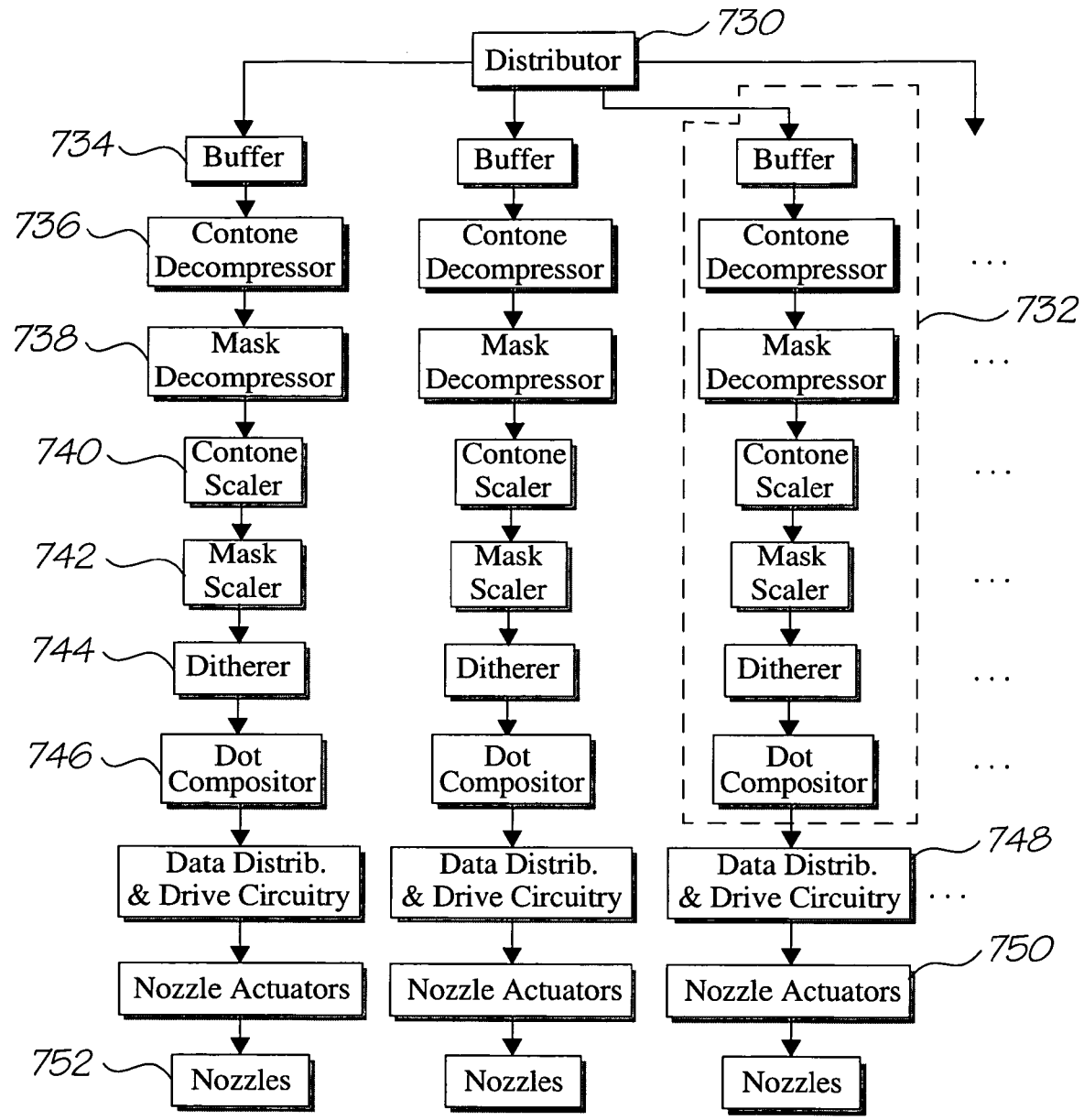
FIG. 4 shows a more detailed schematic showing an architecture used in the printing system of FIG. 3.

FIG. 4 sets out the print data processing by the print engine controller 766. As mentioned previously, data is delivered to the printer unit 2 in the form of a compressed, multi-layer page image with the pre-processing of the image performed by a mainly software-based computer system 702. In turn, the print engine controller 766 processes this data using a mainly hardware-based system.

Upon receiving the data, a distributor 730 converts the data from a proprietary representation into a hardware-specific representation and ensures that the data is sent to the correct hardware device whilst observing any constraints or requirements on data transmission to these devices. The distributor 730 distributes the converted data to an appropriate one of a plurality of pipelines 732. The pipelines are identical to each other, and in essence provide decompression, scaling and dot compositing functions to generate a set of printable dot outputs.

Each pipeline 732 includes a buffer 734 for receiving the data. A contone decompressor 736 decompresses the color contone planes, and a mask decompressor decompresses the monotone (text) layer. Contone and mask scalers 740 and 742 scale the decompressed contone and mask planes respectively, to take into account the size of the medium onto which the page is to be printed.

The scaled contone planes are then dithered by ditherer 744. In one form, a stochastic dispersed-dot dither is used. Unlike a clustered-dot (or amplitude-modulated) dither, a dispersed-dot (or frequency-modulated) dither reproduces high spatial frequencies (i.e. image detail) almost to the limits of the dot resolution, while simultaneously reproducing lower spatial frequencies to their full color depth, when spatially integrated by the eye. A stochastic dither matrix is carefully designed to be relatively free of objectionable low-frequency patterns when tiled across the image. As such, its size typically exceeds the minimum size required to support a particular number of intensity levels (e.g. 16×16×8 bits for 257 intensity levels).

The dithered planes are then composited in a dot compositor 746 on a dot-by-dot basis to provide dot data suitable for printing. This data is forwarded to data distribution and drive electronics 748, which in turn distributes the data to the correct nozzle actuators 750, which in turn cause ink to be ejected from the correct nozzles 752 at the correct time in a manner which will be described in more detail later in the description.

As will be appreciated, the components employed within the print engine controller 766 to process the image for printing depend greatly upon the manner in which data is presented. In this regard it may be possible for the print engine controller 766 to employ additional software and/or hardware components to perform more processing within the printer unit 2 thus reducing the reliance upon the computer system 702. Alternatively, the print engine controller 766 may employ fewer software and/or hardware components to perform less processing thus relying upon the computer system 702 to process the image to a higher degree before transmitting the data to the printer unit 2.

Figure 5:
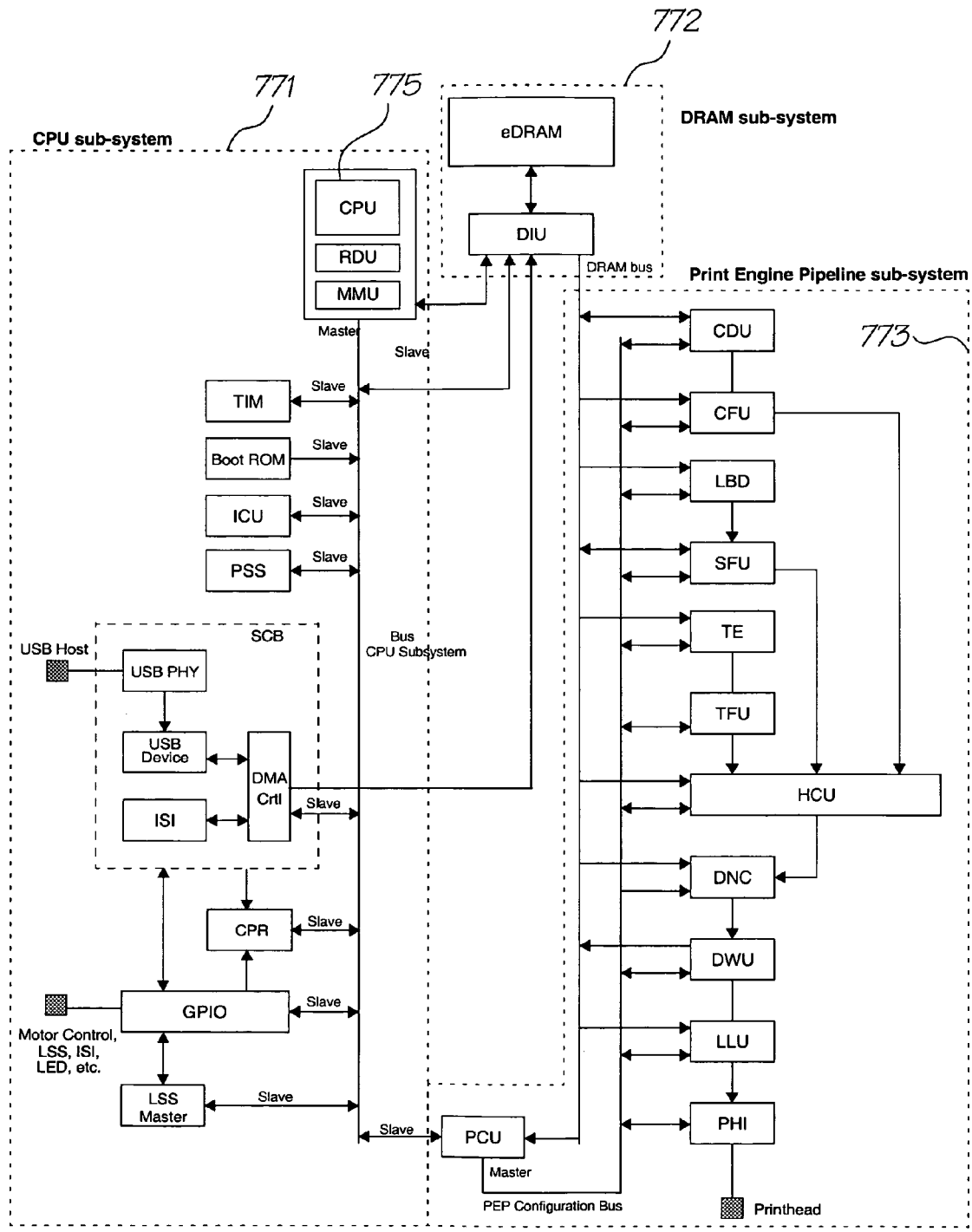
FIG. 5 shows a block diagram of an embodiment of the control electronics as used in the printing system of FIG. 3.

FIG. 5 provides a block representation of the components necessary to perform the above mentioned tasks. In this arrangement, the hardware pipelines 732 are embodied in a Small Office Home Office Printer Engine Chip (SoPEC) 766. As shown, a SoPEC device consists of 3 distinct subsystems: a Central Processing Unit (CPU) subsystem 771, a Dynamic Random Access Memory (DRAM) subsystem 772 and a Print Engine Pipeline (PEP) subsystem 773.

The CPU subsystem 771 includes a CPU 775 that controls and configures all aspects of the other subsystems. It provides general support for interfacing and synchronizing all elements of the print engine 1. It also controls the low-speed communication to QA chips (described below). The CPU subsystem 771 also contains various peripherals to aid the CPU 775, such as General Purpose Input Output (GPIO, which includes motor control), an Interrupt Controller Unit (ICU), LSS Master and general timers. The Serial Communications Block (SCB) on the CPU subsystem provides a full speed USB 1.1 interface to the host as well as an Inter SoPEC Interface (ISI) to other SoPEC devices (not shown).

The DRAM subsystem 772 accepts requests from the CPU, Serial Communications Block (SCB) and blocks within the PEP subsystem. The DRAM subsystem 772, and in particular the DRAM Interface Unit (DIU), arbitrates the various requests and determines which request should win access to the DRAM. The DIU arbitrates based on configured parameters, to allow sufficient access to DRAM for all requesters. The DIU also hides the implementation specifics of the DRAM such as page size, number of banks and refresh rates.

The Print Engine Pipeline (PEP) subsystem 773 accepts compressed pages from DRAM and renders them to bi-level dots for a given print line destined for a printhead interface (PHI) that communicates directly with the printhead. The first stage of the page expansion pipeline is the Contone Decoder Unit (CDU), Lossless Bi-level Decoder (LBD) and, where required, Tag Encoder (TE). The CDU expands the JPEG-compressed contone (typically CMYK) layers, the LBD expands the compressed bi-level layer (typically K), and the TE encodes any Netpage tags for later rendering (typically in IR or K ink), in the event that the printer unit 2 has Netpage capabilities (see the cross referenced documents for a detailed explanation of the Netpage system). The output from the first stage is a set of buffers: the Contone FIFO unit (CFU), the Spot FIFO Unit (SFU), and the Tag FIFO Unit (TFU). The CFU and SFU buffers are implemented in DRAM.

The second stage is the Halftone Compositor Unit (HCU), which dithers the contone layer and composites position tags and the bi-level spot layer over the resulting bi-level dithered layer.

A number of compositing options can be implemented, depending upon the printhead with which the SoPEC device is used. Up to 6 channels of bi-level data are produced from this stage, although not all channels may be present on the printhead. For example, the printhead may be CMY only, with K pushed into the CMY channels and IR ignored. Alternatively, any encoded tags may be printed in K if IR ink is not available (or for testing purposes).

In the third stage, a Dead Nozzle Compensator (DNC) compensates for dead nozzles in the printhead by color redundancy and error diff-using of dead nozzle data into surrounding dots;

The resultant bi-level 5 channel dot-data (typically CMYK, Infrared) is buffered and written to a set of line buffers stored in DRAM via a Dotline Writer Unit (DWU).

Finally, the dot-data is loaded back from DRAM, and passed to the printhead interface via a dot FIFO. The dot FIFO accepts data from a Line Loader Unit (LLU) at the system clock rate pclk), while the PrintHead Interface (PHI) removes data from the FIFO and sends it to the printhead at a rate of ⅔ times the system clock rate.

In the preferred form, the DRAM is 2.5 Mbytes in size, of which about 2 Mbytes are available for compressed page store data. A compressed page is received in two or more bands, with a number of bands stored in memory. As a band of the page is consumed by the PEP subsystem 773 for printing, a new band can be downloaded. The new band may be for the current page or the next page.

Using banding it is possible to begin printing a page before the complete compressed page is downloaded, but care must be taken to ensure that data is always available for printing or a buffer under-run may occur.

The embedded USB 1.1 device accepts compressed page data and control commands from the host PC, and facilitates the data transfer to either the DRAM (or to another SoPEC device in multi-SoPEC systems, as described below).

Multiple SoPEC devices can be used in alternative embodiments, and can perform different functions depending upon the particular implementation. For example, in some cases a SoPEC device can be used simply for its onboard DRAM, while another SoPEC device attends to the various decompression and formatting functions described above. This can reduce the chance of buffer under-run, which can happen in the event that the printer commences printing a page prior to all the data for that page being received and the rest of the data is not received in time. Adding an extra SoPEC device for its memory buffering capabilities doubles the amount of data that can be buffered, even if none of the other capabilities of the additional chip are utilized.

Each SoPEC system can have several quality assurance (QA) devices designed to cooperate with each other to ensure the quality of the printer mechanics, the quality of the ink supply so the printhead nozzles will not be damaged during prints, and the quality of the software to ensure printheads and mechanics are not damaged.

Normally, each printing SoPEC will have an associated printer unit QA, which stores information relating to the printer unit attributes such as maximum print speed. The cartridge unit may also contain a QA chip, which stores cartridge information such as the amount of ink remaining, and may also be configured to act as a ROM (effectively as an EEPROM) that stores printhead-specific information such as dead nozzle mapping and printhead characteristics. The refill unit may also contain a QA chip, which stores refill ink information such as the type/colour of the ink and the amount of ink present for refilling. The CPU in the SoPEC device can optionally load and run program code from a QA Chip that effectively acts as a serial EEPROM. Finally, the CPU in the SoPEC device runs a logical QA chip (i.e., a software QA chip).

Usually, all QA chips in the system are physically identical, with only the contents of flash memory differentiating one from the other.

Each SoPEC device has two LSS system buses that can communicate with QA devices for system authentication and ink usage accounting. A large number of QA devices can be used per bus and their position in the system is unrestricted with the exception that printer QA and ink QA devices should be on separate LSS busses.

In use, the logical QA communicates with the ink QA to determine remaining ink. The reply from the ink QA is authenticated with reference to the printer QA. The verification from the printer QA is itself authenticated by the logical QA, thereby indirectly adding an additional authentication level to the reply from the ink QA.

Data passed between the QA chips is authenticated by way of digital signatures. In the preferred embodiment, HMAC-SHA1 authentication is used for data, and RSA is used for program code, although other schemes could be used instead.

As will be appreciated, the SoPEC device therefore controls the overall operation of the print engine 1 and performs essential data processing tasks as well as synchronising and controlling the operation of the individual components of the print engine 1 to facilitate print media handling, as will be discussed below.

Print Engine

Figure 6:
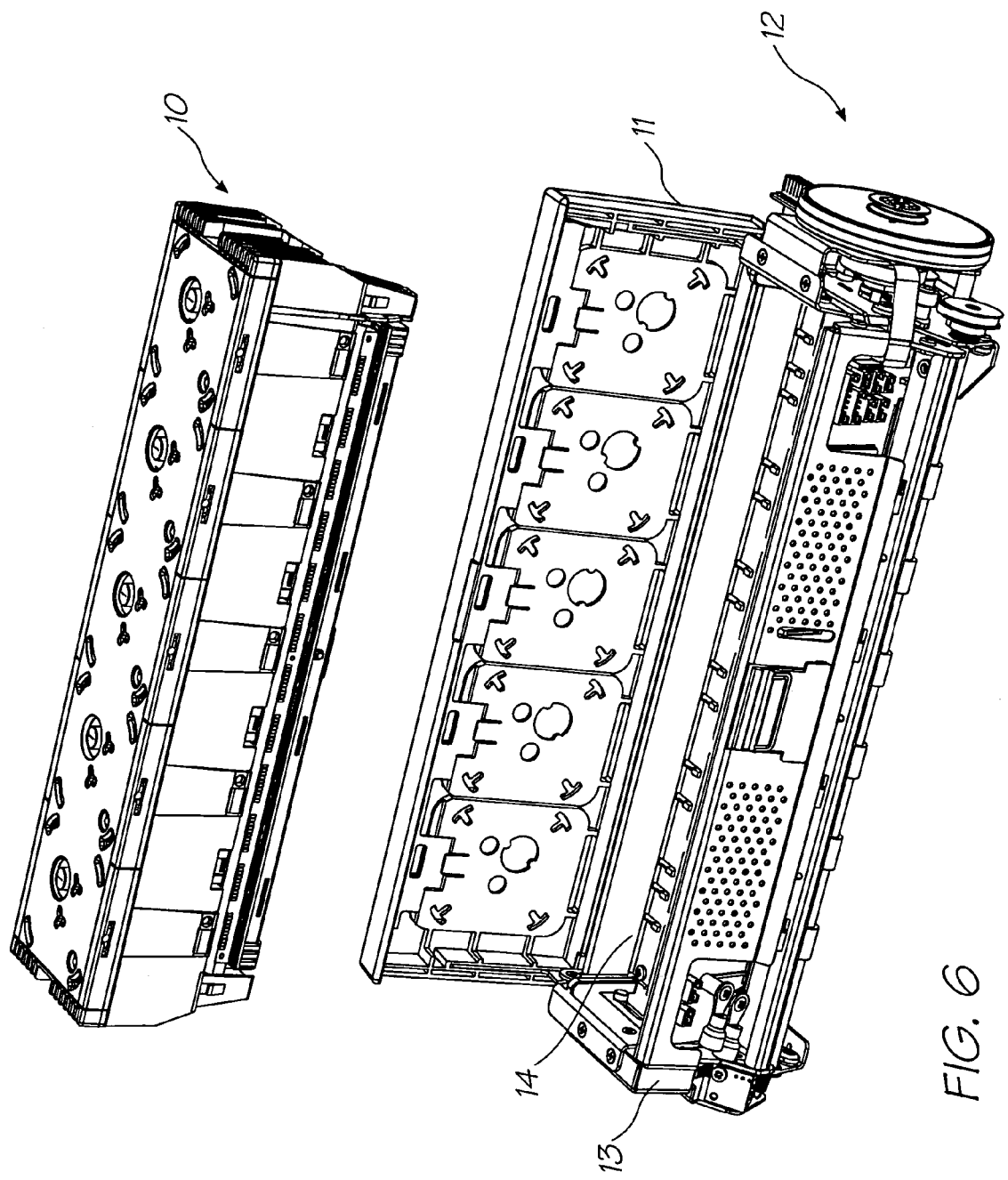
FIG. 6 shows a perspective view of a cradle unit with open cover assembly and cartridge unit removed therefrom.
Figure 7:
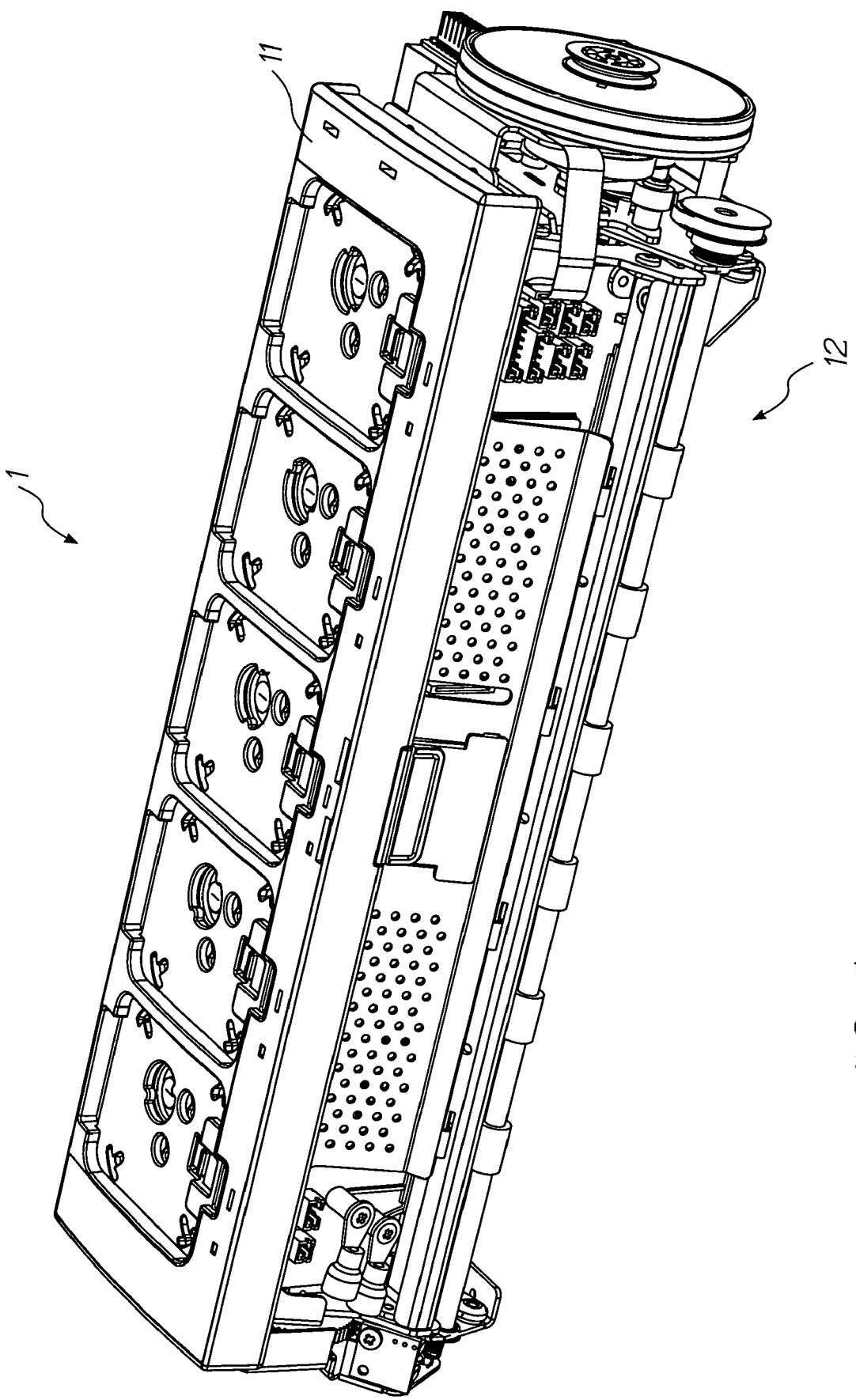
FIG. 7 shows the cradle unit of FIG. 6 with the cover assembly in its closed position.

The print engine 1 is shown in detail in FIGS. 6 and 7 and consists of two main parts: a cartridge unit 10 and a cradle unit 12.

The cartridge unit 10 is shaped and sized to be received within the cradle unit 12 and secured in position by a cover assembly 11 mounted to the cradle unit. The cradle unit 12 is in turn configured to be fixed within the printer unit 2 to facilitate printing as discussed above.

FIG. 7 shows the print engine 1 in its assembled form with cartridge unit 10 secured in the cradle unit 12 and cover assembly 11 closed. The print engine 1 controls various aspects associated with printing in response to user inputs from the user interface 5 of the printer unit 2. These aspects include transporting the media past the printhead in a controlled manner and the controlled ejection of ink onto the surface of the passing media.

Cartridge Unit

Figure 8:
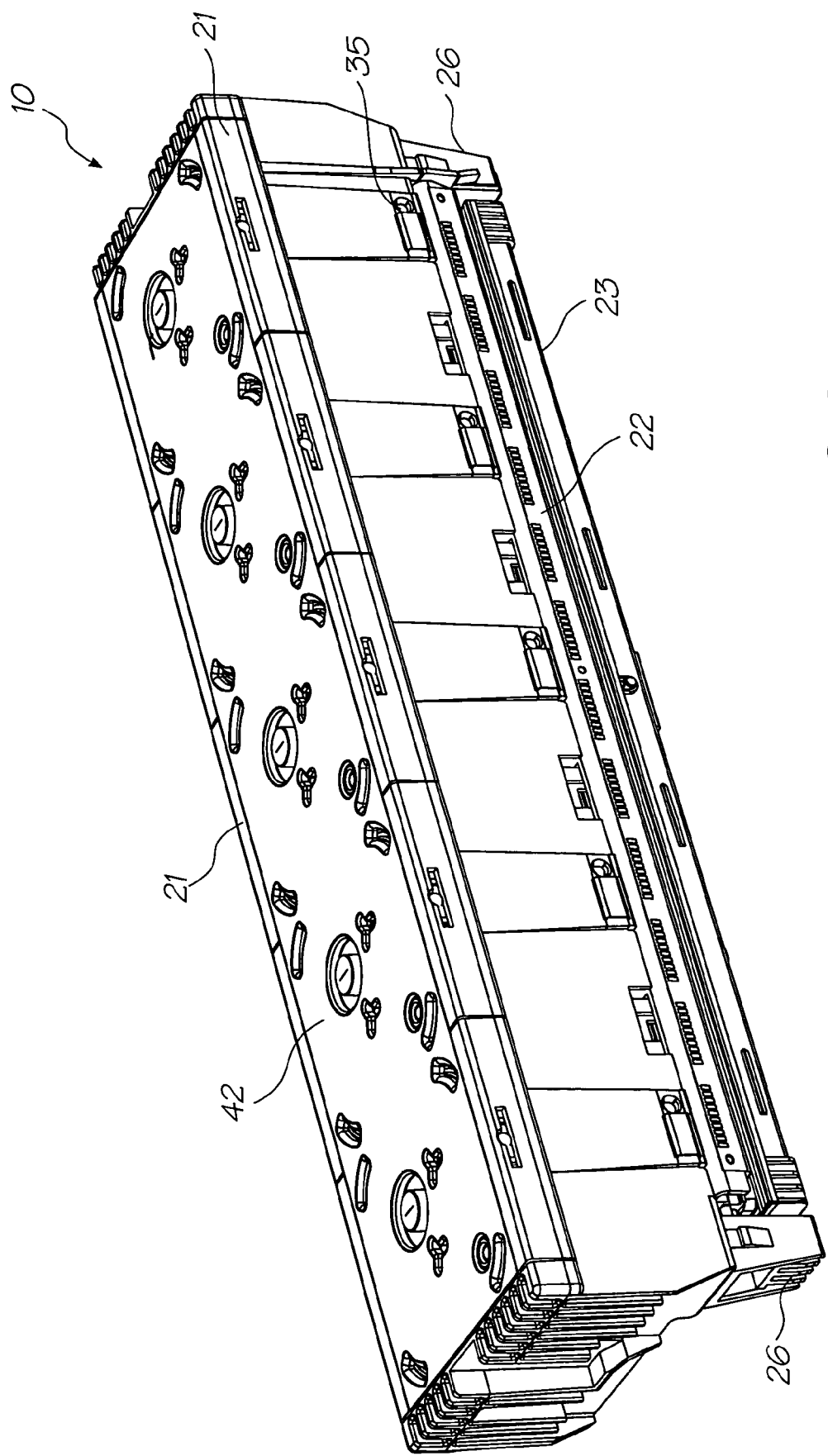
FIG. 8 shows a front perspective view of the cartridge unit of FIG. 6.
Figure 9:
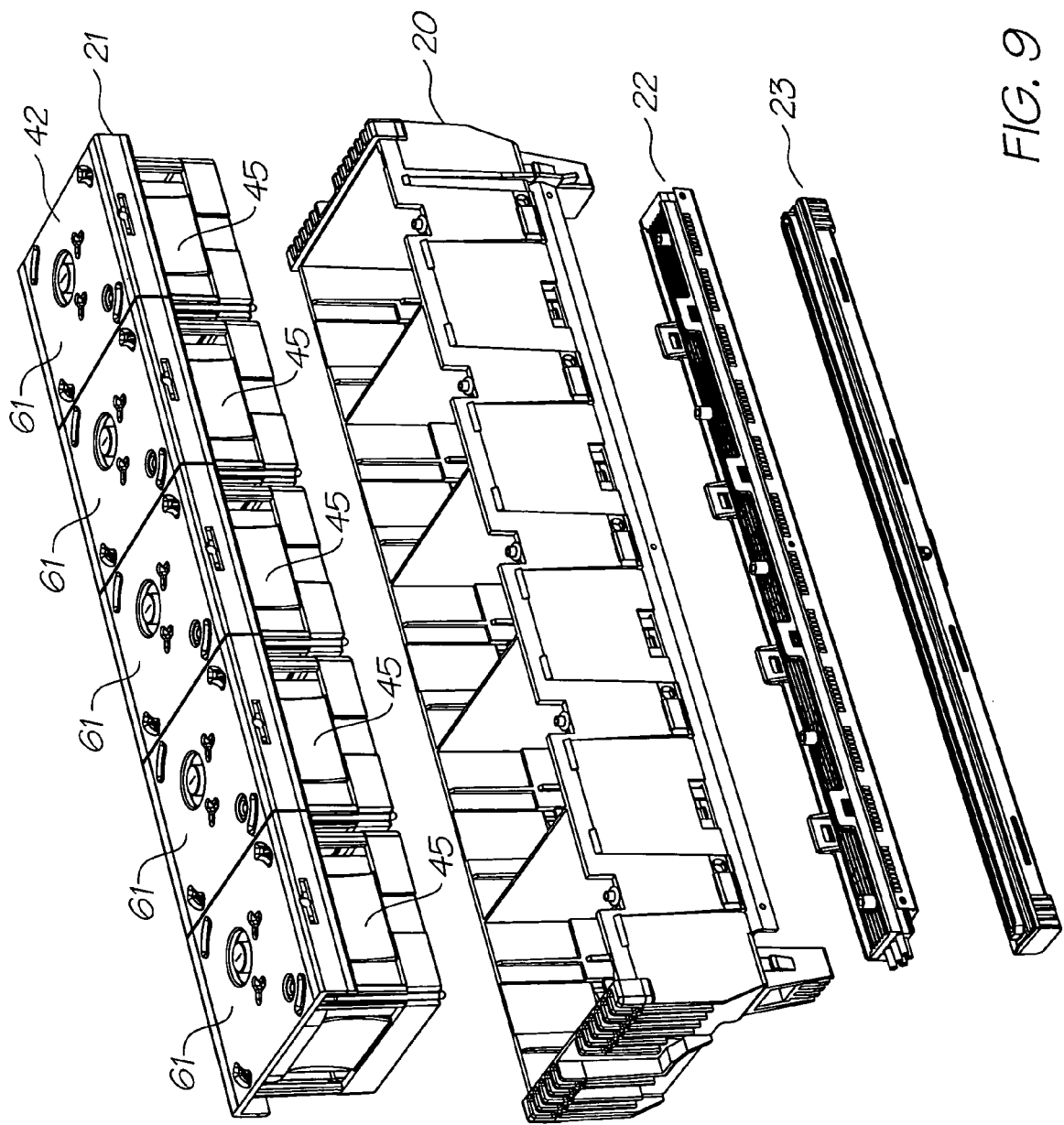
FIG. 9 shows an exploded perspective view of the cartridge unit of FIG. 8.

The cartridge unit 10 is shown in detail in FIGS. 8 and 9. With reference to the exploded view of FIG. 9, the cartridge unit 10 generally consists of a main body 20, an ink storage module assembly 21, a printhead assembly 22 and a maintenance assembly 23.

Each of these parts are assembled together to form an integral unit which combines ink storage means together with the ink ejection means. Such an arrangement ensures that the ink is directly supplied to the printhead assembly 22 for printing, as required, and should there be a need to replace either or both of the ink storage or the printhead assembly, this can be readily done by replacing the entire cartridge unit 10.

However, the operating life of the printhead is not limited by the supply of ink. The top surface 42 of the cartridge unit 10 has interfaces 61 for docking with a refill supply of ink to replenish the ink storage modules 45 when necessary. The ink refill unit and the process of docking with the cartridge are discussed in greater detail below. To further extend the life of the printhead, the cartridge unit carries an integral printhead maintenance assembly 23 that caps, wipes and moistens the printhead. This assembly is also described in more detail later.

Main Body

Figure 10:
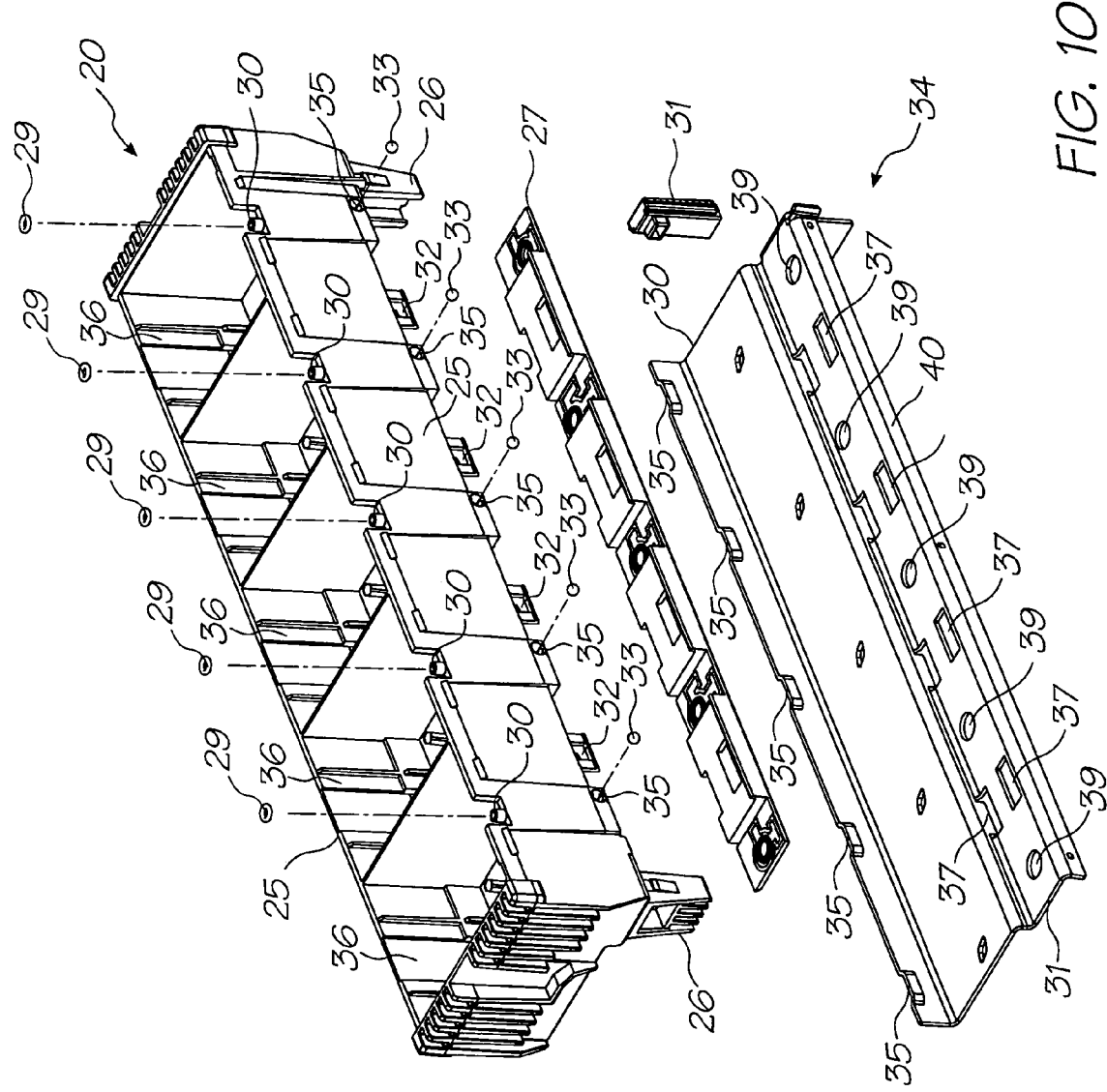
FIG. 10 shows an exploded front perspective view of the main body of the cartridge unit shown in FIG. 9.

The main body 20 of the cartridge unit 10 is shown in more detail in FIG. 10 and comprises a substantially rectangular frame 25 having an open top and an open longitudinally extending side wall. A pair of posts 26 project from the underside of the frame at either end. These posts 26 are provided to mount the maintenance assembly 23 to the main body 10, in a manner described below.

An ink outlet molding 27 has ink outlets (not shown) in its underside corresponding to each of the ink storage modules 45 to be housed in the main body 20. Each of the ink outlets has a pair of inwardly extending silicone rings seals. The rings seals are co-molded with the ink outlet molding 27 and seal against the ink inlets to the printhead assembly described below. The ink outlet molding 27 is ultra sonically welded to the underside of the rectangular frame 25.

Along one longitudinal wall of the frame 25 are a series of ink downpipes 30. Each downpipe 30 has an O-ring seal 29 at its upper end to form a sealed connection with the ink outlet of respective ink storage modules (described below). When the ink outlet molding 27 is welded to the body 20, each ink downpipe 30 is in fluid communication with respective ink outlets in the underside of the molding 27.

The air sleeve 31 is connected to a pressurized air source (not shown) and provides an air flow into the printhead assembly where it is directed across the printhead nozzles to avoid paper dust clogging (discussed further below).

Ink filing ports 35 are formed in the lower parts of each ink downpipe 30. These filling ports are for the initial charging of the ink storage assemblies 21 only. Any subsequent refilling of the ink storages assemblies, uses the ink refill units described below. To assist the initial filling process, a vacuum is applied to the air vents 41 in the top surface 42 of the cartridge unit 10 (see FIG. 9). The air vents 41 are connected to the interior of the ink bag in each ink storage module 45 (described below). Ink is fed through the filling port 35 and drawn up the ink downpipe 30 into the ink storage volume. During the filling process, the cartridge unit is tilted so that the air vents 41 are the highest point in each of the respective ink bag, and filled until the vacuum draws ink through the air vent 41. This ensures that each ink bag is completely filled and purged of air. Skilled workers in this field will appreciate that air bubbles entrained with the ink flow to the printhead can harm the operation of the nozzles.

Figure 15:
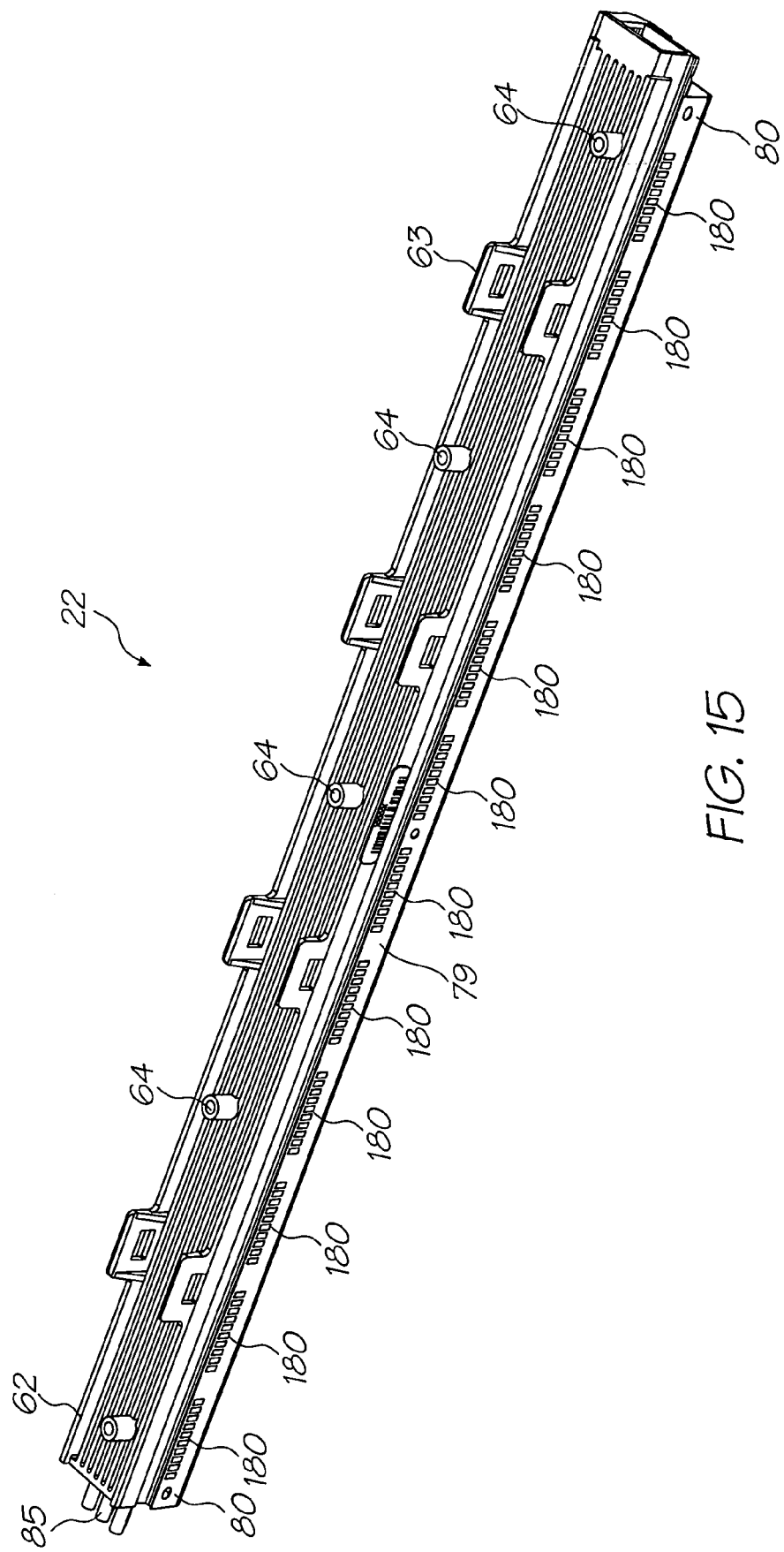
FIG. 15 shows a top perspective view of the printhead assembly shown in FIG. 9.
Figure 16:
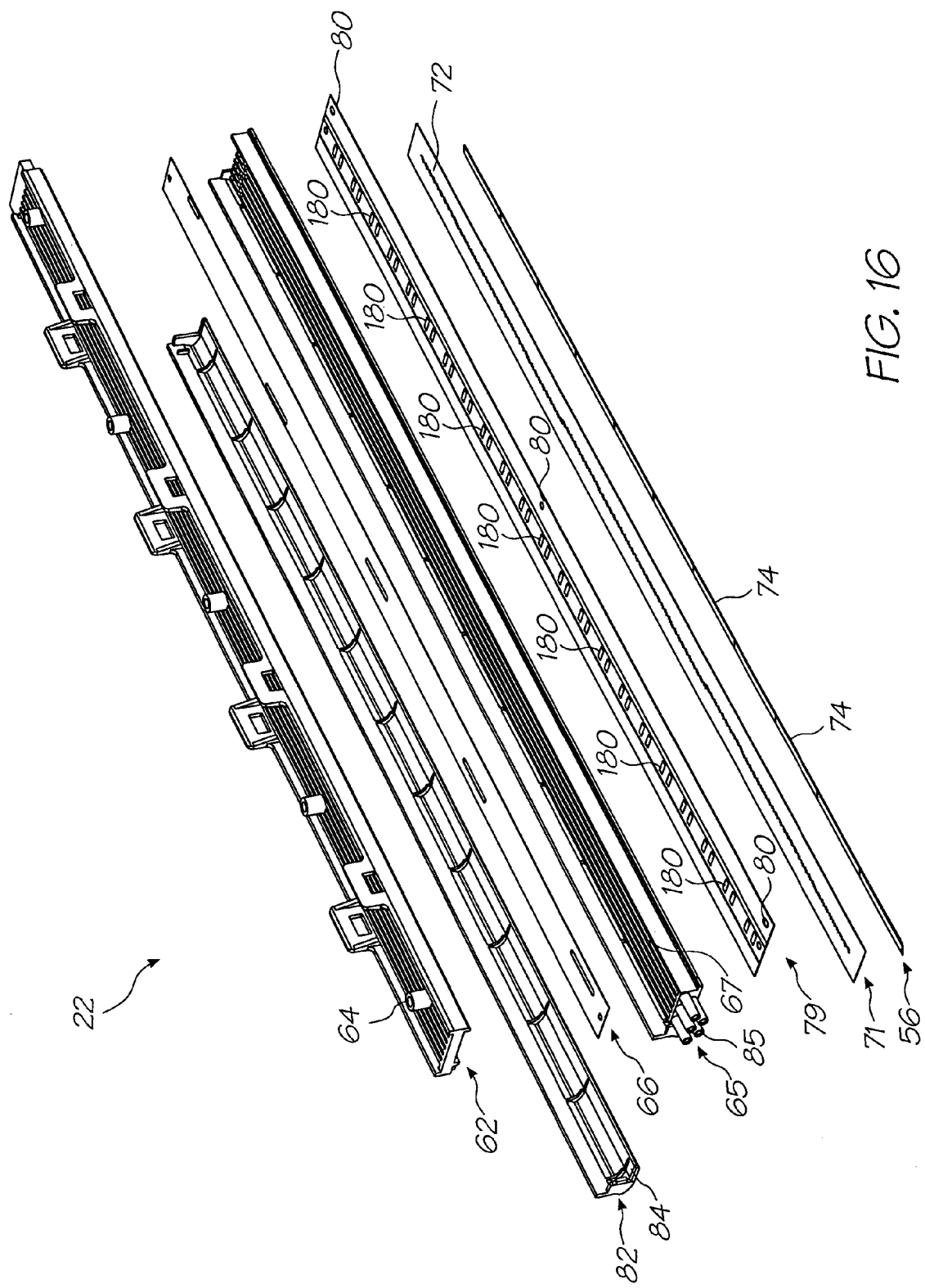
FIG. 16 shows an exploded view of the printhead assembly shown in FIG. 15.
Figure 17:
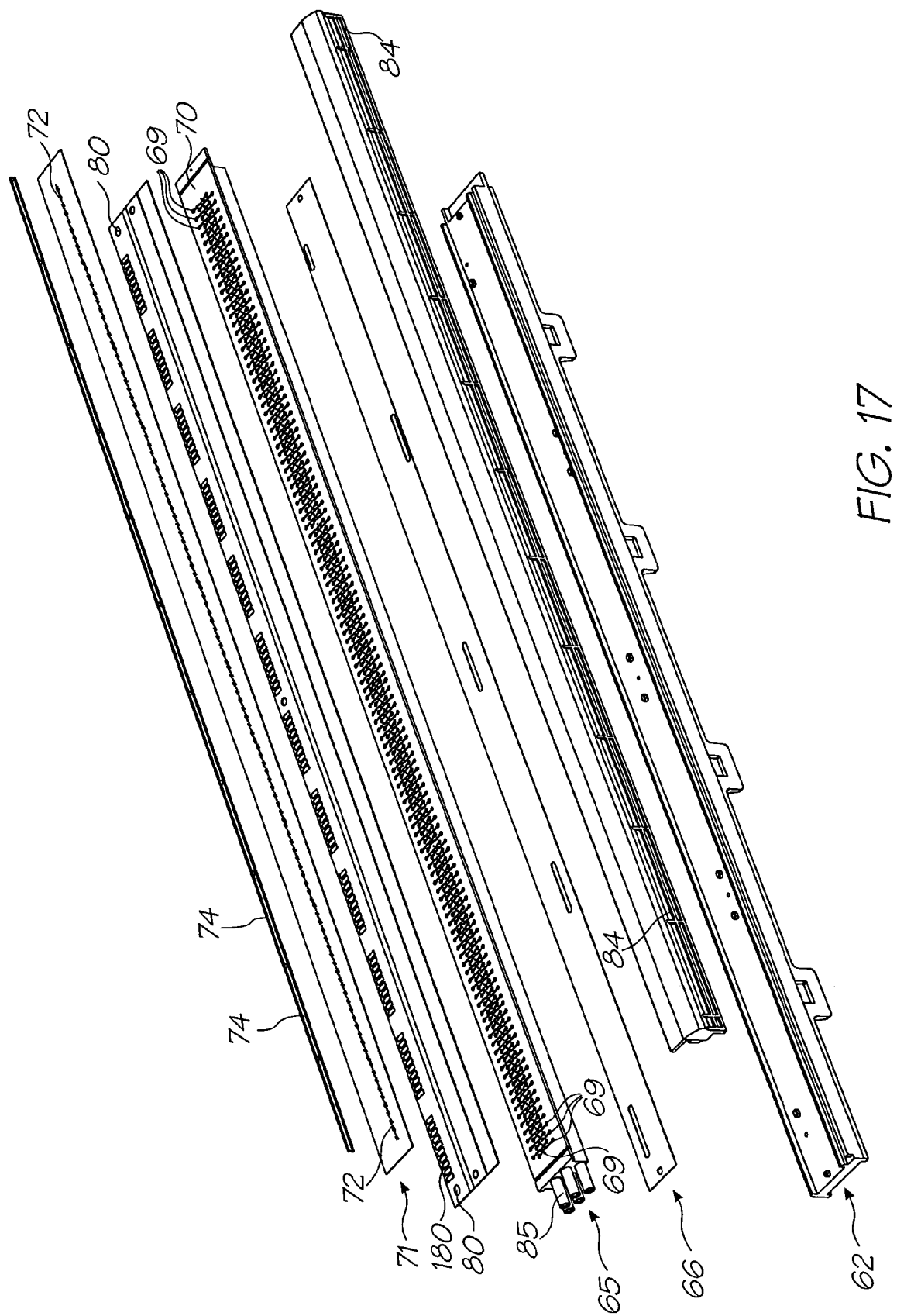
FIG. 17 shows an inverted exploded view of the printhead assembly shown in FIG. 15.

As shown in FIGS. 15 to 17, the lower member 65 is provided with a plurality of priming inlets 85 at one end thereof. Each of the priming inlets 85 communicate directly with one of the channels 67 and provide an alternative, or additional means for priming the ink storage modules 45 with ink prior to shipment and use.

When the ink storage modules are full, a polymer sealing ball 33 is inserted into the filling port 35 and the air vent 41.

A metal plate 34 mounts to the underside of the frame 25 and the outlet molding 30 to provide the cartridge unit 10 with structural rigidity. It is snap locked into place by hooking the detents 38 into slots (not shown) in the back wall of the frame 25 and rotating the plate 34 until the line of barbed snap lock formations 32 clip into the outer line of apertures 37.

The plate 34 has holes 39 to receive the ink outlets (not shown) that project from the lower surface of the outlet molding 27. The pressed metal plate 34 also has a flange portion 40 projecting downwardly with respect to the frame 25, which acts as a load bearing surface discussed in more detail below.

Figure 11:
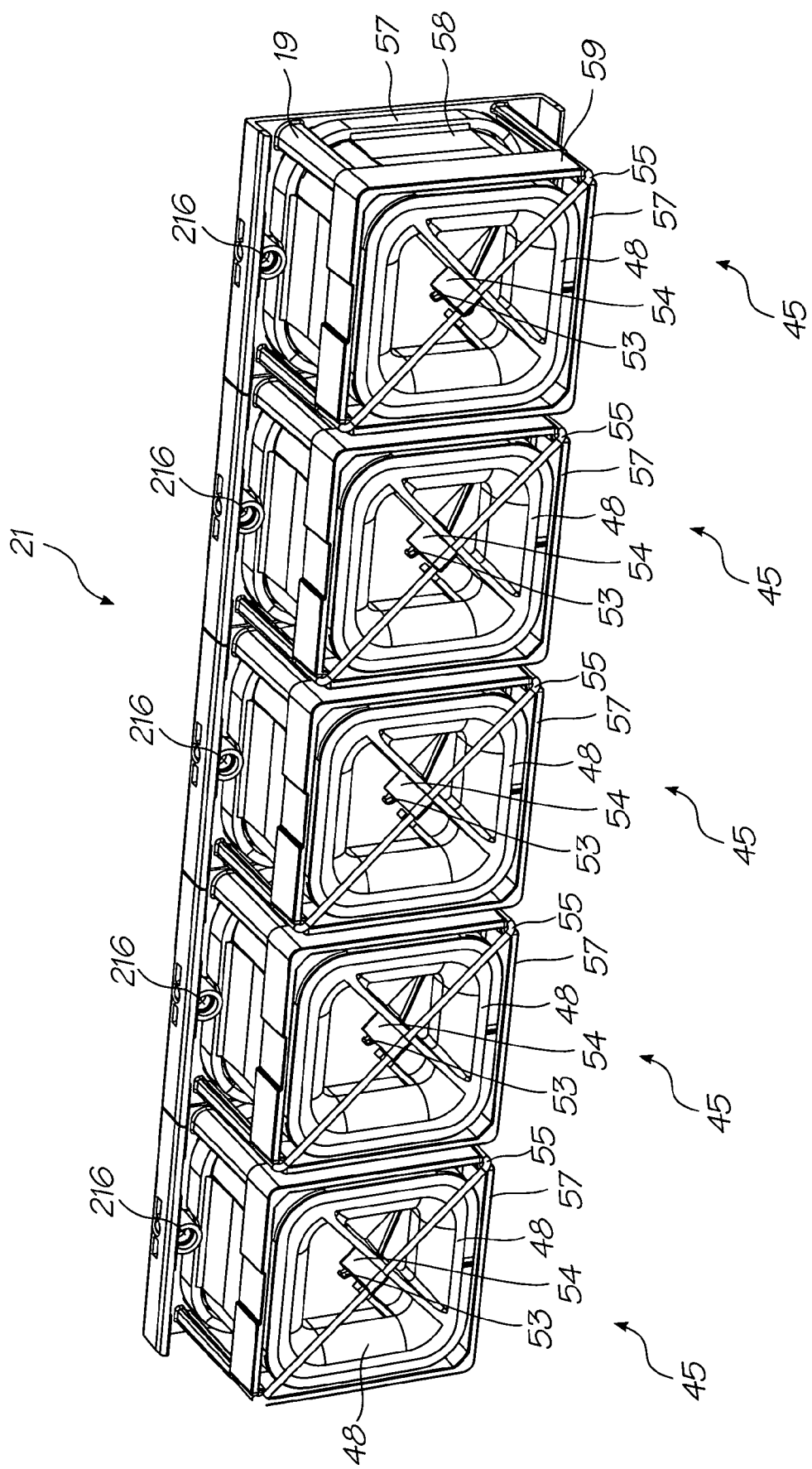
FIG. 11 shows a bottom perspective view of the ink storage module assembly that locates in the main body shown in FIG. 9.

The ink storage assembly lid 21 of the cartridge unit 10 is shown in detail in FIGS. 11 to 14. The lid 21 is configured to mate with the frame 25 of the main body 20 to form an enclosed unit. As best shown in FIG. 11, the ink storage modules 45 are mounted to the underside of the lid 21 and extend into the individual cavities 36 provided by the main body 20 (see FIG. 10).

Figure 12:
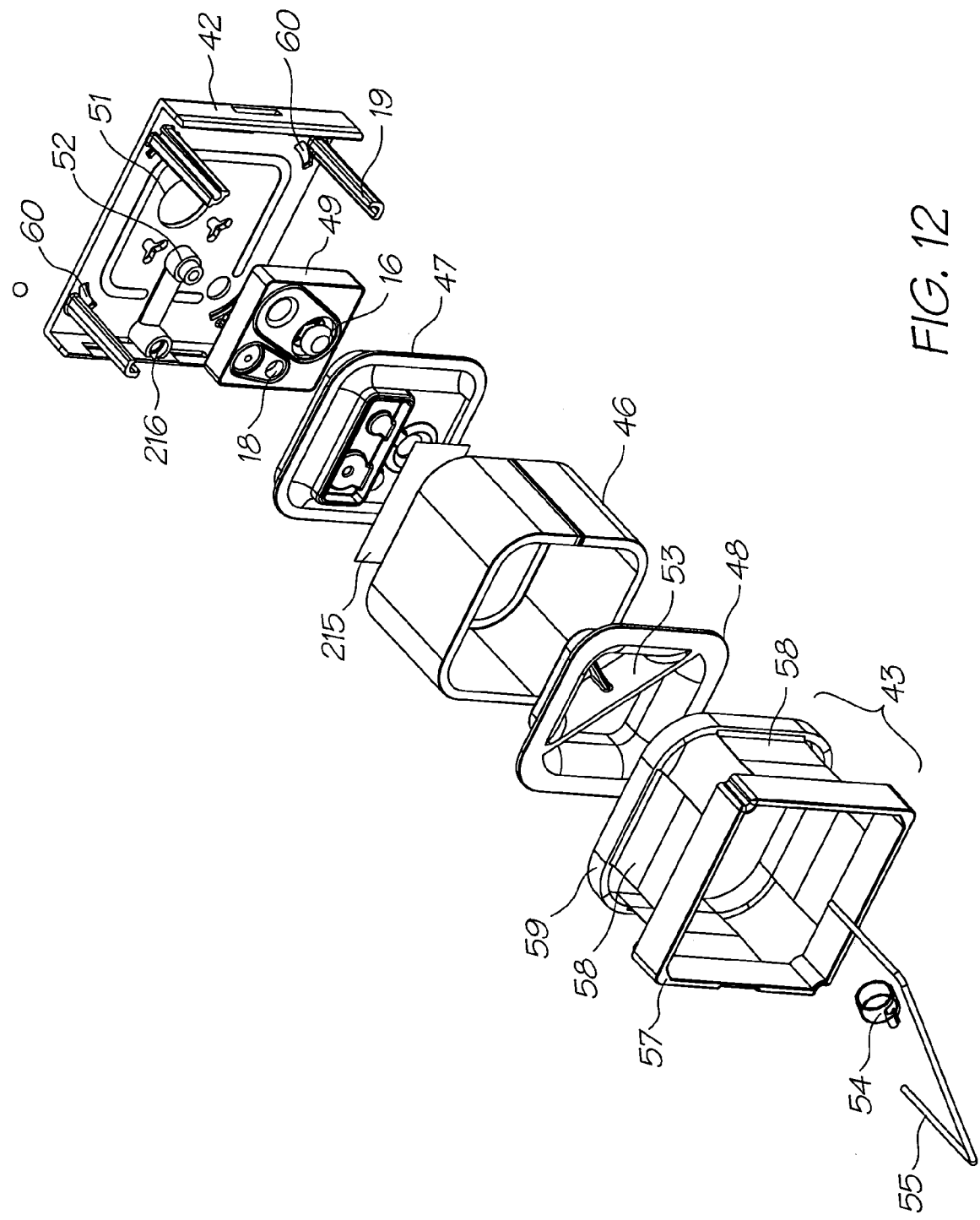
FIG. 12 shows an exploded perspective view of one of the ink storage modules shown in FIG. 11.
Figure 13:
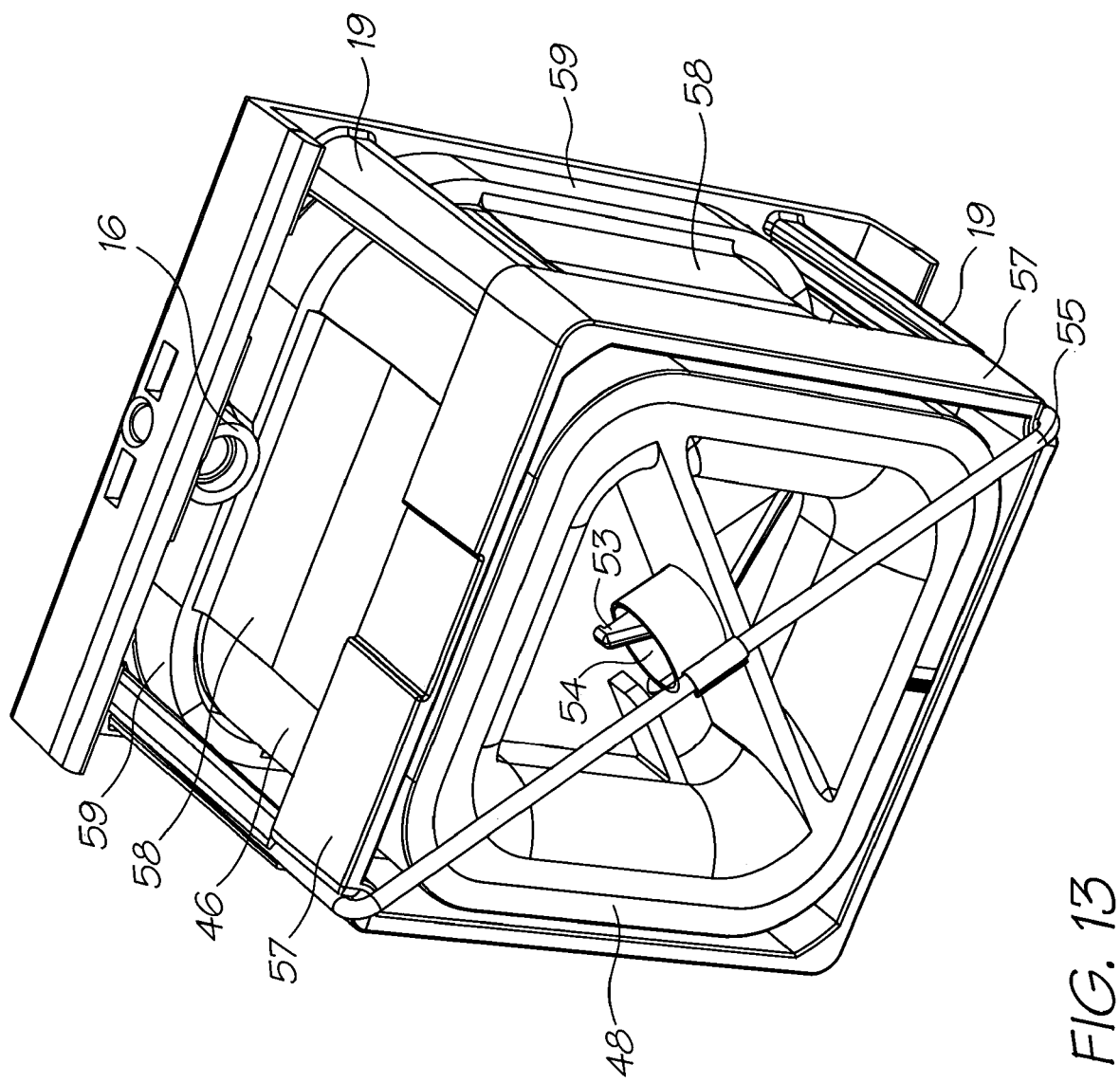
FIG. 13 shows a bottom perspective view of an ink storage module shown in FIG. 12.
Figure 14:
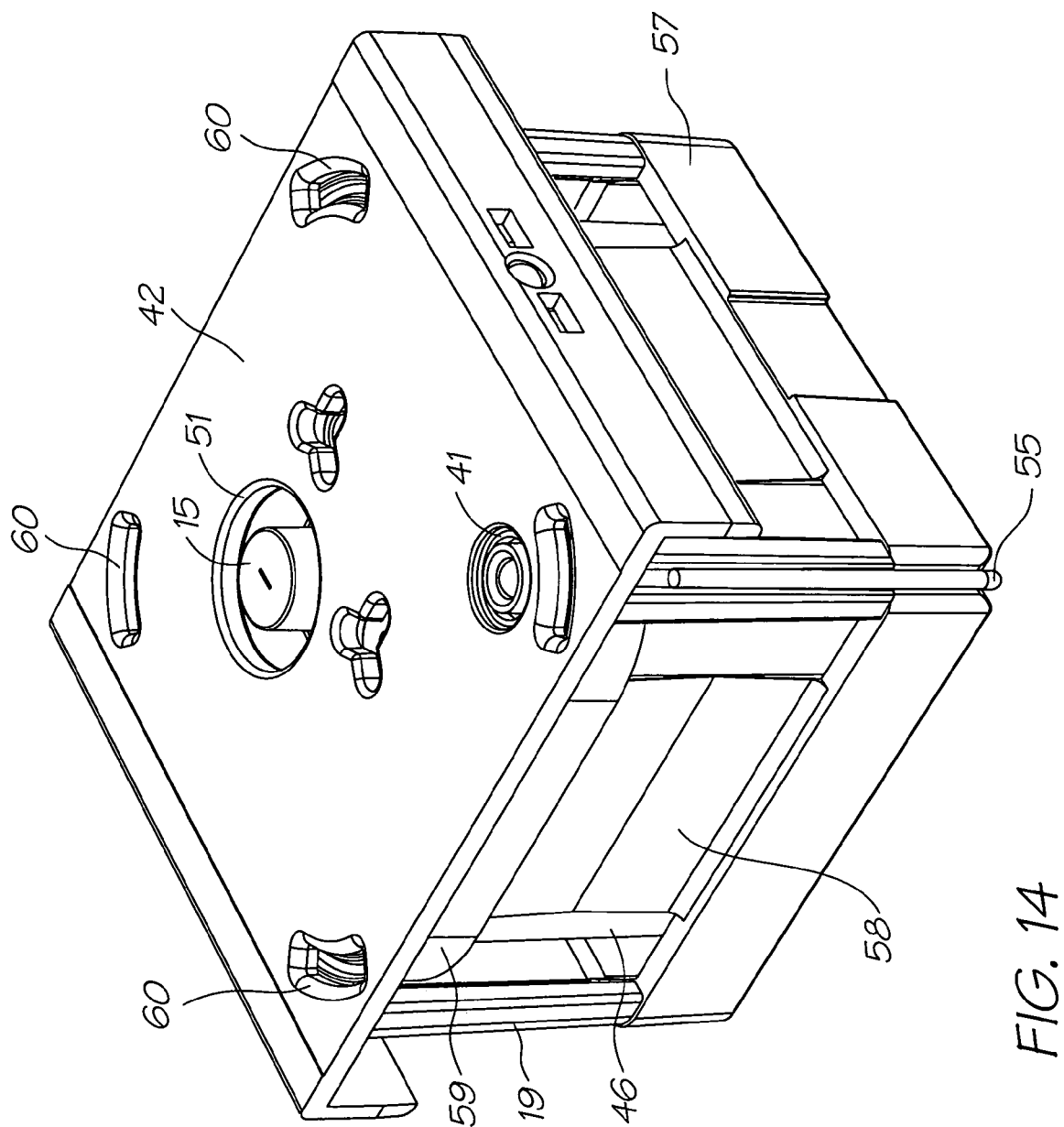
FIG. 14 shows a top perspective view of an ink storage module shown in FIG. 12.

One of the ink storage modules 45 is shown in isolation in FIGS. 12, 13 and 14. Ink bag 46 is made from a flexible, air impermeable thermoplastic film such as Mylar® which allows ink to be retained therein in a pressurised state. The flexible bag 46 can expand as it is filled with ink and collapse as ink is consumed. This is discussed in more detail later with reference to the refilling process shown in FIGS. 60A to 60D.

The ink bag 46 extends between an upper plate member 47 and a lower plate member 48. It is heat welded (or similar) to the plates 47 and 48 for an air tight seal. The upper plate member 47 is arranged to receive a valve insert 49. The valve insert has an inlet valve 18 and an outlet valve 17. The valve insert 49 is positioned such that it can communicate directly with a port 51 formed in the top surface 42 to receive ink from an ink refill unit, as well as an outlet 52 to deliver ink to the printhead assembly 22. As best shown in FIG. 14, the inlet valve 15 receives the ink delivery needle of an ink refill unit (discussed later) through a slit positioned in the port 51 in the upper surface 42. The inlet valve 18 is biased closed and opens when the refill unit (described below) docks with the cartridge unit 10.

Conversely, the outlet valve 18 is biased open and closes when the refill unit docks. A filter 215 covers the entrance to the outlet valve in the upper plate member 47. The filter is sized to remove solid contaminants and air bubbles. As discussed above, compressible air bubbles can prevent a nozzle from operating.

The outlet valve connects to a conduit 52 in the underside of the lid 21 which leads to the downpipe collar 216. When the ink storage assembly 21 is placed into the main body 20, the collar 216 seals over the O-ring seal 29 on the end of the downpipe 30.

The upper plate 47 is fixed to the underside of the lid 21 to hold the valve insert 49 in position. The lower plate 48 slides within the collar 57 and the inside edges of the four struts 19 extending from the underside of the lid 21. The plate 48 slides down the struts 19 as the bag 46 fills and expands. Conversely, it slides back towards the lid 21 as the bag 21 empties. The length of the bag 46 limits the travel of the lower plate 48 before it reaches the retaining bar 55. A constant force spring 54 extends between the retaining bar 55 and the recessed peg 59 to bias the plate 48 towards the retaining bar 55. In turn, this biases the bag 46 to expand and thereby maintains the ink within the bag at a negative pressure. This avoids ink leakage from the printhead nozzles.

Bag Constrictor.

Each ink storage module 45 has a bag constrictor 43 to re-establish the negative pressure in the ink after each refilling operation. The constrictor 43 has a lower collar 57 that abuts the ends of the struts 19 and is held in place by the retaining bar 55; The lower plate 48 slides upwardly within lower collar 57 as the ink bag 46 empties. Four bowed panels 58 extend upwardly from the lower collar 57 to an upper collar 59. The panels 58 bow slightly inwards. The ink refill unit (described below) has four constrictor actuators. When the refill unit docks with the cartridge unit, the constrictor actuators extend through the apertures 60 in the lid 21 to push the upper collar 59 towards the lower collar 57. This causes the panels 58 to bow further inwards to press on each side of the bag 46.

During refilling, the negative pressure in the ink bag 46 draws ink out of the refill unit. The negative pressure is created by the constant force spring 54 biasing the lower plate 48 to wards the retainer bar 55. When the ink bag is full, the negative pressure disappears. Without negative pressure in the ink bag 46, there is a risk of ink leakage from the nozzles. The negative pressure is re-established in the bag 46 when the refill unit is removed from the cartridge. As the four constrictor actuators retract through the apertures 60 in the lid 21, the bowed panels 58 can push the upper collar 59 back towards the upper plate member 47. The panels 58 straighten so that they are not pressing on the sides of the bag 46 as much. This allows the bag 46 to bulge slightly, and as the inlet valve 18 is closed, the slight increase in bag volume restores the negative pressure.

Printhead Assembly

The printhead assembly 22 is shown in more detail in FIGS. 15 to 18E, and is adapted to be attached to the underside of the main body 20 to receive ink from the outlets molding 27 (see FIG. 10).

The printhead assembly 22 generally comprises an elongate upper member 62 which is configured to extends beneath the main body 20, between the posts 26. A plurality of U-shaped clips 63 project from the upper member 62. These pass through the recesses 37 provided in the rigid plate 34 and become captured by lugs (not shown) formed in the main body 20 to secure the printhead assembly 22.

The upper element 62 has a plurality of feed tubes 64 that are received within the outlets in the outlet molding 27 when the printhead assembly 22 secures to the main body 20. The feed tubes 64 may be provided with an outer coating to guard against ink leakage.

The upper member 62 is made from a liquid crystal polymer (LCP) which offers a number of advantages. It can be molded so that its coefficient of thermal expansion (CTE) is similar to that of silicon. It will be appreciated that any significant difference in the CTE's of the printhead integrated circuit 74 (discussed below) and the underlying moldings can cause the entire structure to bow. However, as the CTE of LCP in the mold direction is much less than that in the non-mold direction (~5 ppm/° C. compared to ~20 ppm/° C.), care must be take to ensure that the mold direction of the LCP moldings is unidirectional with the longitudinal extent of the printhead integrated circuit (IC) 74. LCP also has a relatively high stiffness with a modulus that is typically 5 times that of 'normal plastics' such as polycarbonates, styrene, nylon, PET and polypropylene.

As best shown in FIG. 16, upper member 62 has an open channel configuration for receiving a lower member 65, which is bonded thereto, via an adhesive film 66. The lower member 65 is also made from an LCP and has a plurality of ink channels 67 formed along its length. Each of the ink channels 67 receive ink from one of the feed tubes 64, and distribute the ink along the length of the printhead assembly 22. The channels are 1 mm wide and separated by 0.75 mm thick walls.

In the embodiment shown, the lower member 65 has five channels 67 extending along its length. Each channel 67 receives ink from only one of the five feed tubes 64, which in turn receives ink from one of the ink storage modules 45 (see FIG. 10) to reduce the risk of mixing different coloured inks. In this regard, adhesive film 66 also acts to seal the individual ink channels 67 to prevent cross channel mixing of the ink when the lower member 65 is assembled to the upper member 62.

Figure 22A:
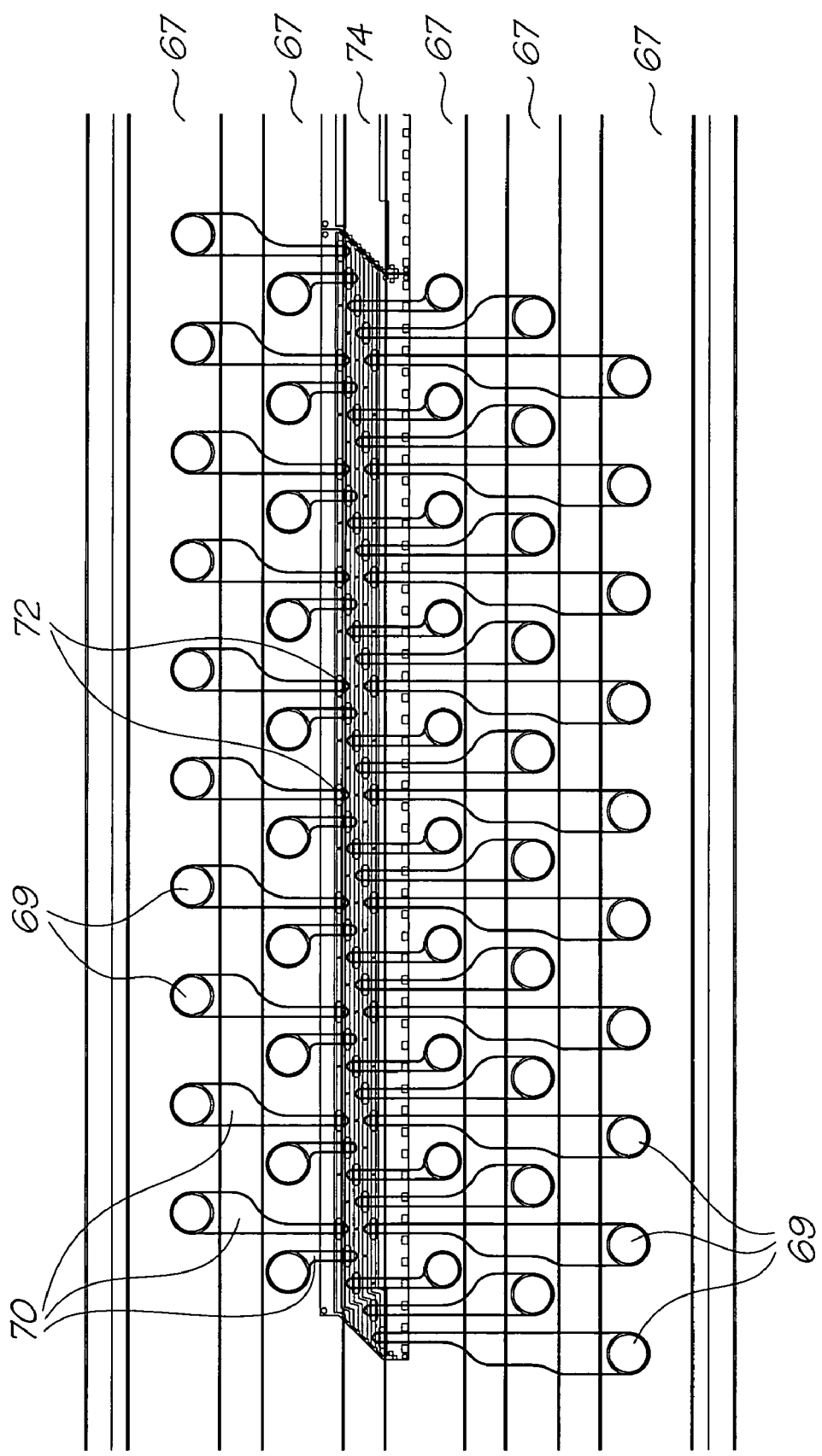
FIG. 22A shows a transparent top view of a printhead assembly of FIG. 15 showing in particular, the ink conduits for supplying ink to the printhead integrated circuits.

In the bottom of each channel 67 are a series of equi-spaced holes 69 (best seen in FIG. 17) to give five rows of holes 69 in the bottom surface of the lower member 65. The middle row of holes 69 extends along the centre-line of the lower member 65, directly above the printhead IC 74. As best seen in FIG. 22A, other rows of holes 69 on either side of the middle row need conduits 70 from each hole 69 to the centre so that ink can be fed to the printhead IC 74.

Figure 18A:
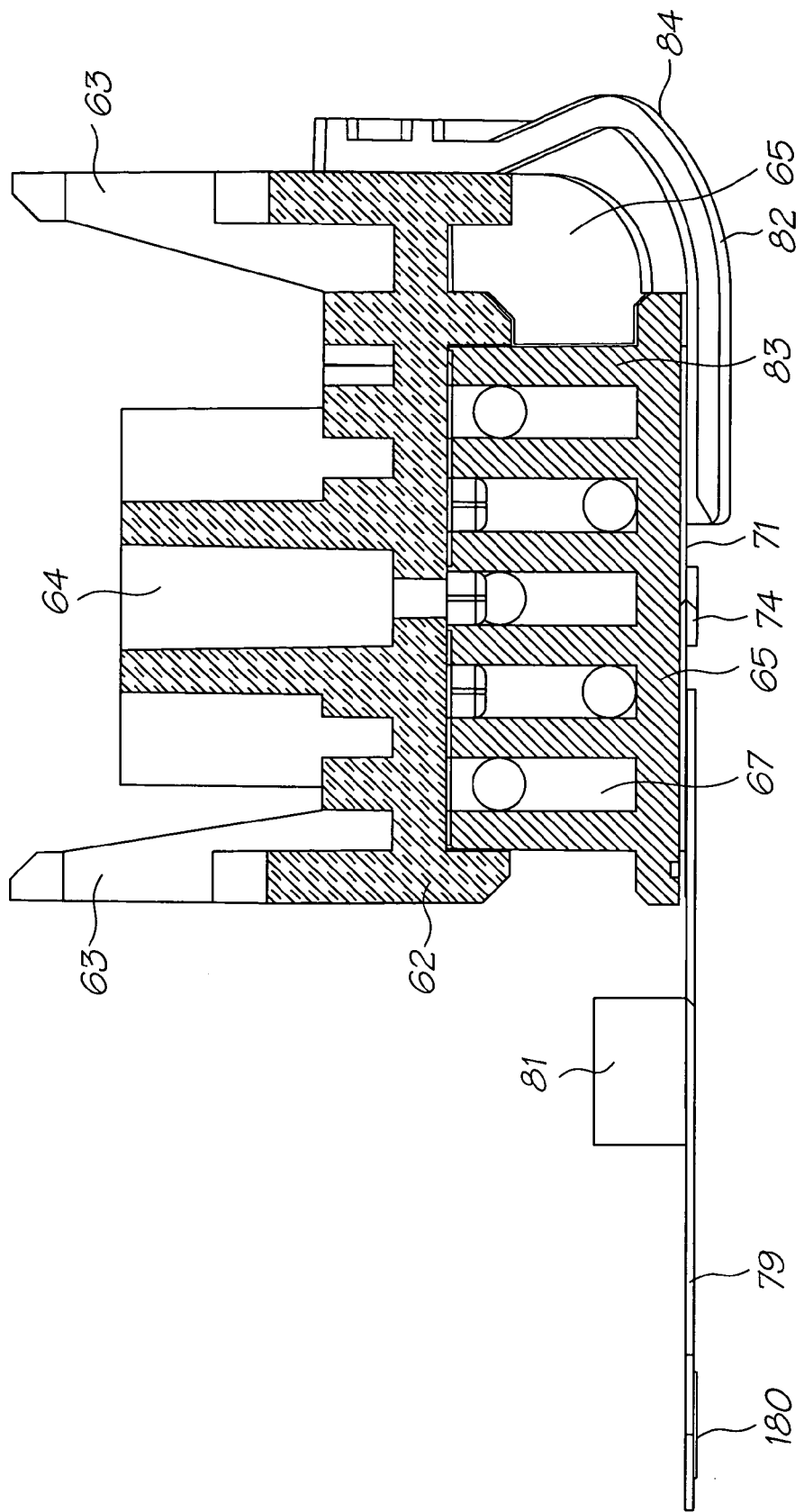
FIG. 18A shows a cross-sectional end view of the printhead assembly of FIG. 15.
Figure 24:
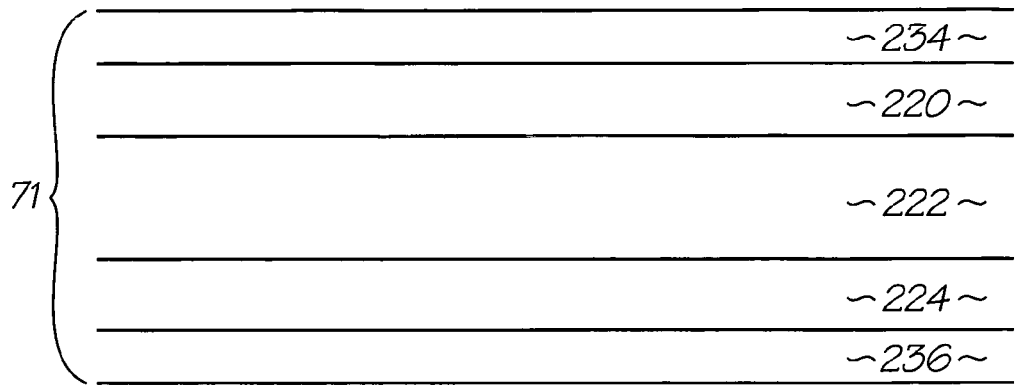
FIG. 24 is a schematic partial section view of the laminate structure of the adhesive film prior to laser drilling.

Referring to FIG. 18A, the printhead IC 74 is mounted to the underside of the lower member 65 by a polymer sealing film 71. This film may be a thermoplastic film such as a PET or Polysulphone film, or it may be in the form of a thermoset film, such as those manufactured by AL Technologies, Rogers Corporation or Ablestik (a subsidiary of Nation Starch & Chemical Company). The polymer sealing film 71 is a laminate with adhesive layers on both sides of a central film, and laminated onto the underside of the lower member 65. A particularly effective film is the Ablestik 5205 SI and its structure is schematically shown in FIG. 24. The central polyimide web 222 is sandwiched between thermosetting adhesive layers 220 and 224. The outer surfaces of the thermosetting adhesive layers are protected by PET liners 234 and 236. Mylar liners would also be suitable.

Figure 22B:
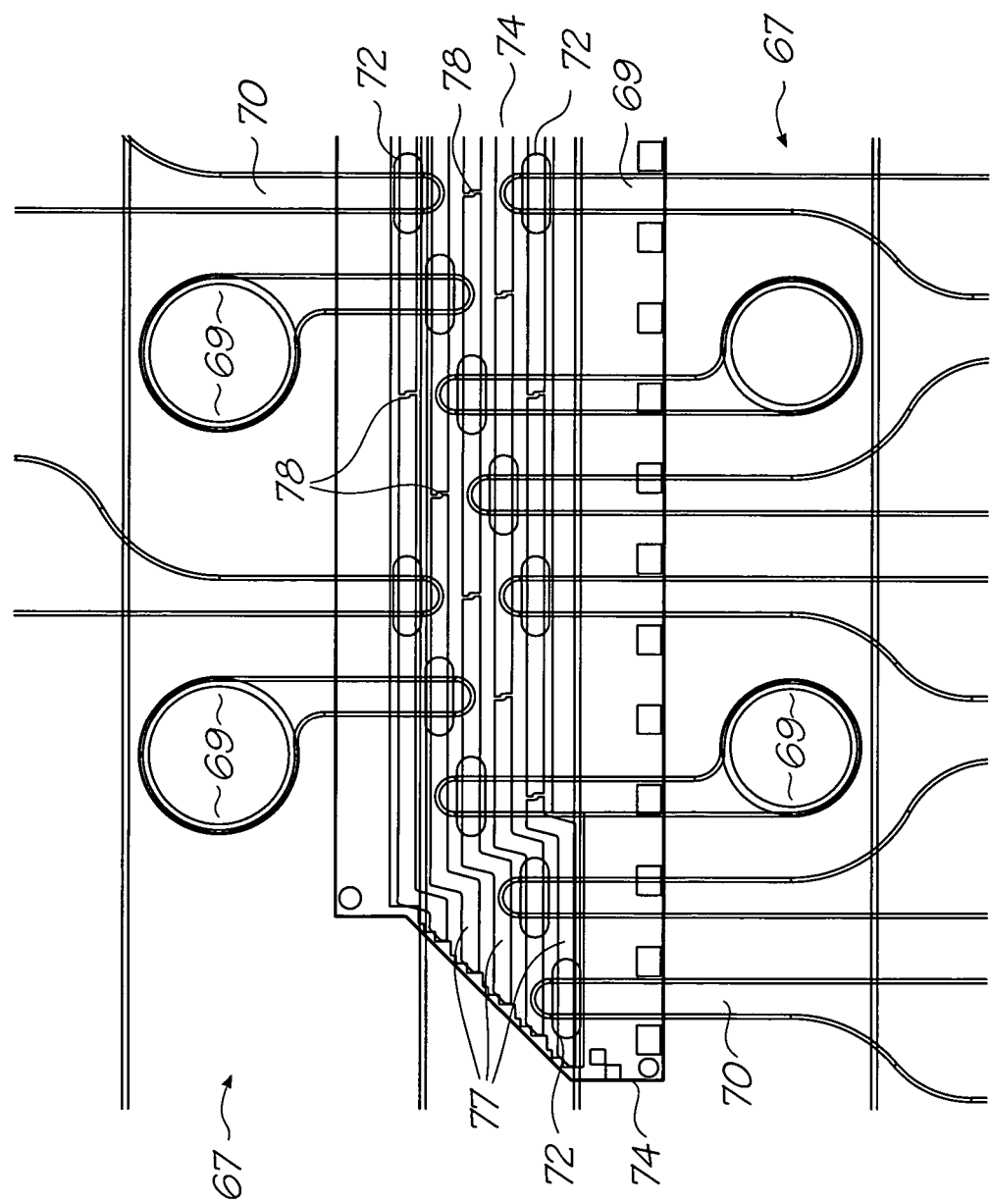
FIG. 22B is a partial enlargement of FIG. 28A.
Figure 25:
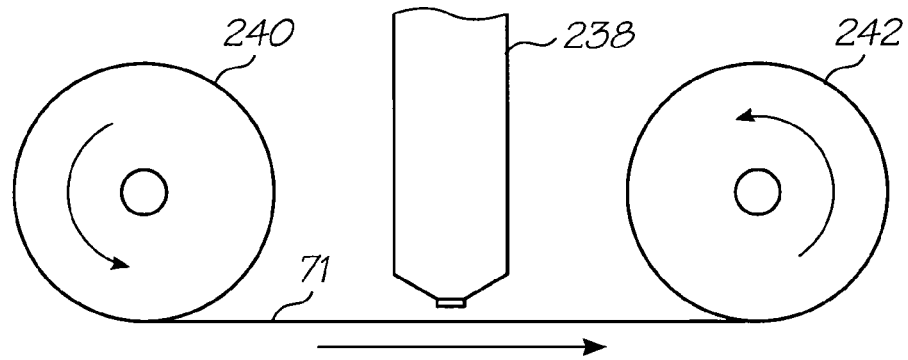
FIG. 25 shows the laser drilling of the film pre-attachment.
Figure 26:
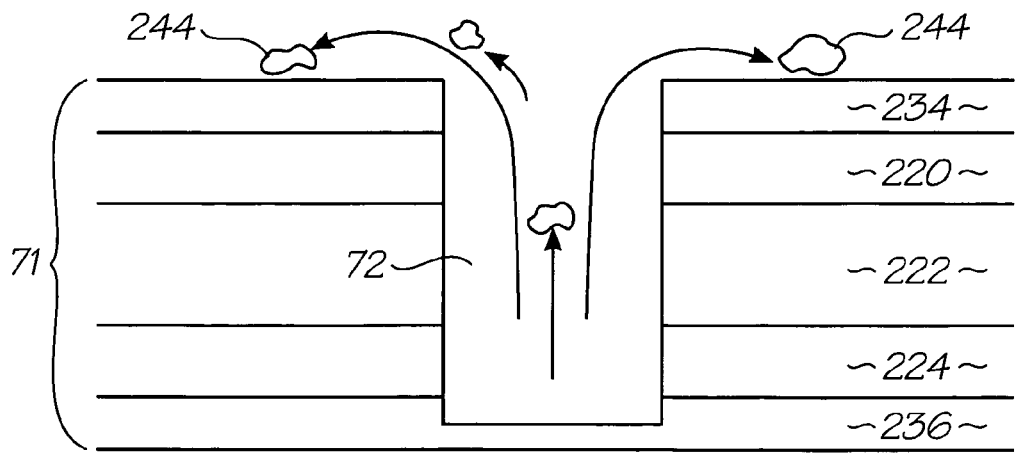
FIG. 26 is a schematic partial section view of the laminate structure of the adhesive film during laser drilling.

FIGS. 17, 22A and 22B, show the pattern of holes 72 laser drilled through the adhesive film 71 to coincide with the centrally disposed ink delivery points (the middle row of holes 69 and the ends of the conduits 70) for fluid communication between the printhead IC 74 and the channels 67. FIGS. 25 and 26 schematically show the laser ablation process in more detail. The laminated film 71 is fed from reel 240, past the laser 238, and spooled onto reel 242. The laser is an excimer laser which uses UV light so that the thermosetting adhesive does not cure and harden. If the adhesive hardens before the printhead IC 74 or the LCP moulding 65 is attached, the seal may be compromised. Lasers that use longer wavelength light are more likely heat the adhesive above its curing temperature. FIG. 26 shows a hole 72 drilled by the laser. The hole 72 is a blind hole that terminates somewhere in the lower PET liner 236. Keeping the lower PET liner unbroken helps to keep contaminants out of the hole 72. The upper PET liner 234 collects some of the ablated material 244 removed from the hole 72 by the laser 238. Removing the liner immediately prior to attaching the film to the LCP moulding 65 removes the ablated material 244 and any other detritus that may affect the fluid seal.

Figure 27:
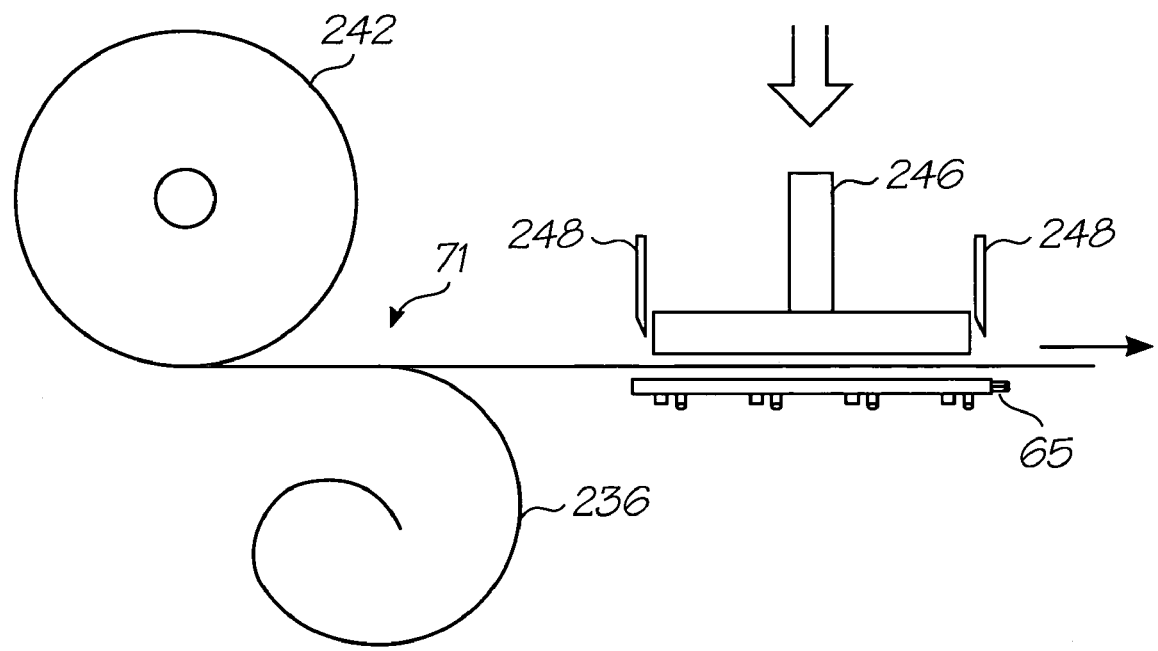
FIG. 27 shows the attachment of the film to the LCP moulding.

FIG. 27 shows the attachment of the film 71 to the LCP moulding 65. The laser drilled film 71 is fed from the reel 242 to the LCP moulding 65. As the LCP moulding is a relatively long polymer moulding, it is not very straight because of the inherent material weakness and the moulding process. The moulding is gripped and held straight while the film is attached. A heated die 246 softens, but does not cure, the thermosetting adhesive so that it tacky. A vision system (not shown) aligns the film 71 so that the appropriate holes 72 are at least partially in registration with the ends of the ink conduits 70 etched into the moulding 65 (see FIG. 22B). This can be done using fiducial markings on both the LCP moulding 65 and the film 71 or by using a vision system that references to predetermined features of both the moulding and/or the film. This can be particularly useful for the film as the heating process can often cause gross deformation or removal of the fiducial marks (typically very small holes). If the vision system looks for one or more predetermined holes 72 in the pattern of drilled holes, the alignment with the ink conduits 70 is more direct and accurate. The relative deformation of the ink holes 72 is less because they are physically much larger but the vision system can use a simple geometric technique to calculate a centre point, and then reference to that. The PET liner 236 is peeled away before attachment, and reciprocating knives 248 trim the film to size after attachment.

Drilling the holes in the film 71 before it is attached to the LCP moulding is faster and more reliable than attaching the film to the moulding and then drilling. Drilling the film when it is attached to the moulding needs to be carefully controlled so that the hole extend completely through the film, but there is no overdrilling where a part of the underlying LCP is ablated by the laser. Ablated LCP easily lodges in the holes 72 and causes flow blockages.

Figure 28:
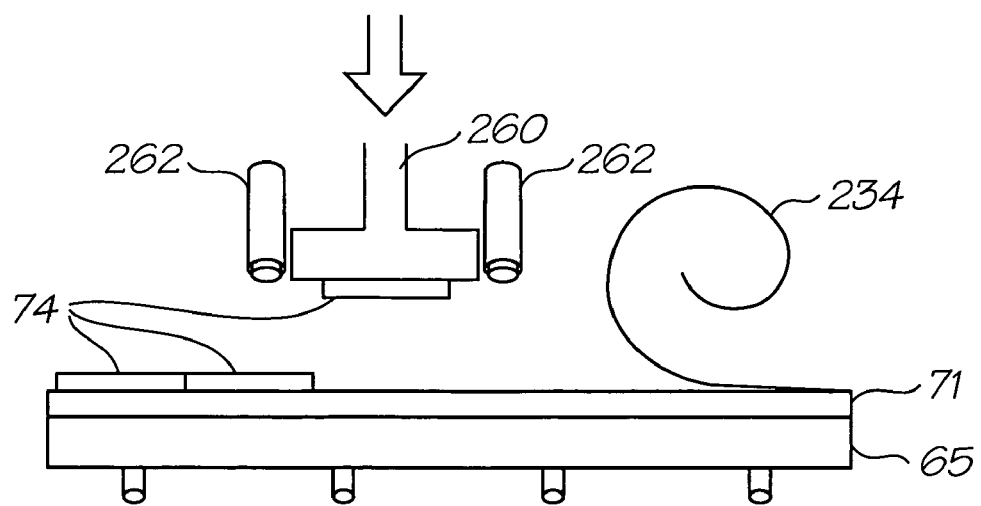
FIG. 28 shows the attachment of the film to the printhead integrated circuits.
Figure 29:
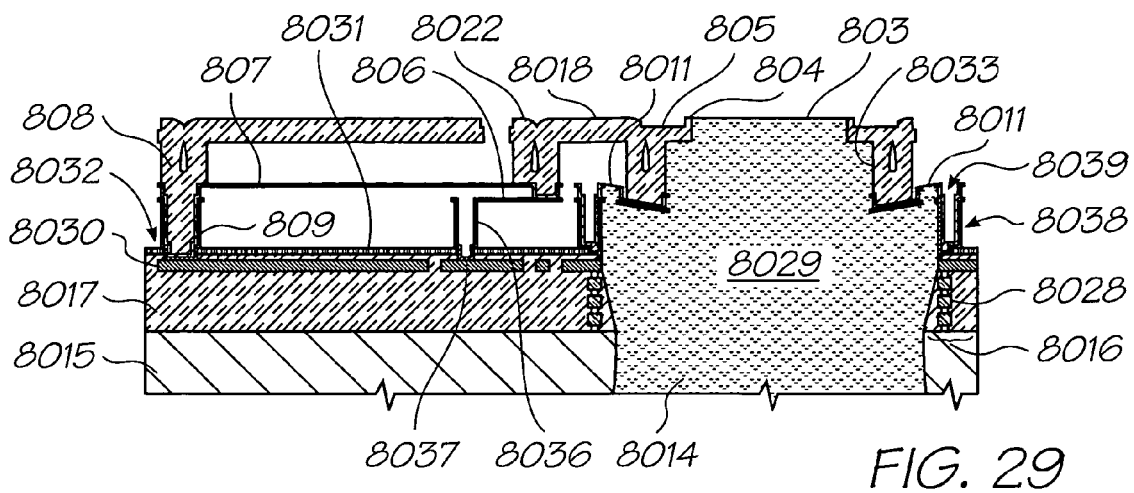
FIG. 29 shows a vertical sectional view of a single nozzle for ejecting ink, for use with the invention, in a quiescent state.
Figure 30:
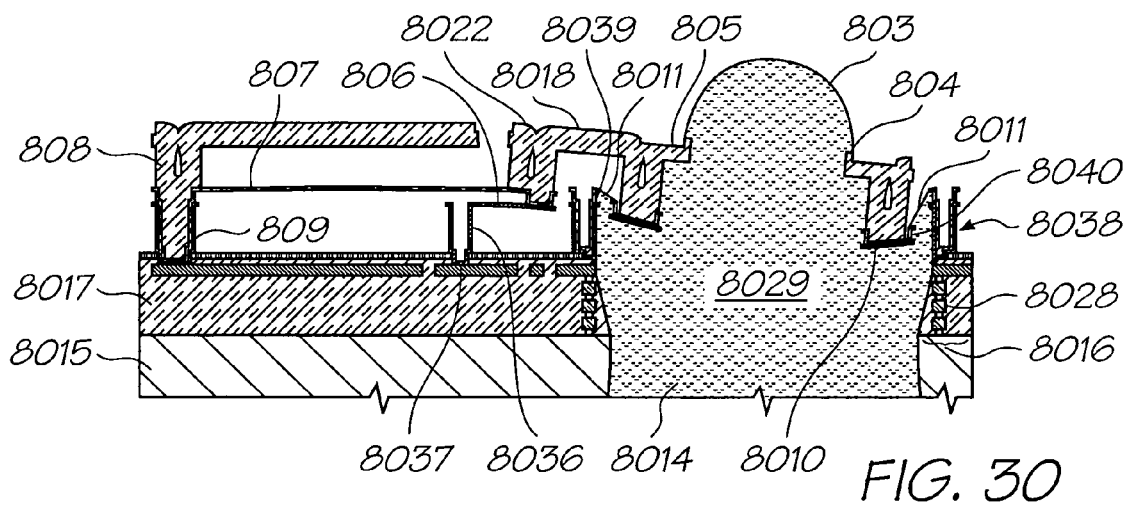
FIG. 30 shows a vertical sectional view of the nozzle of FIG. 35 during an initial actuation phase.
Figure 31:
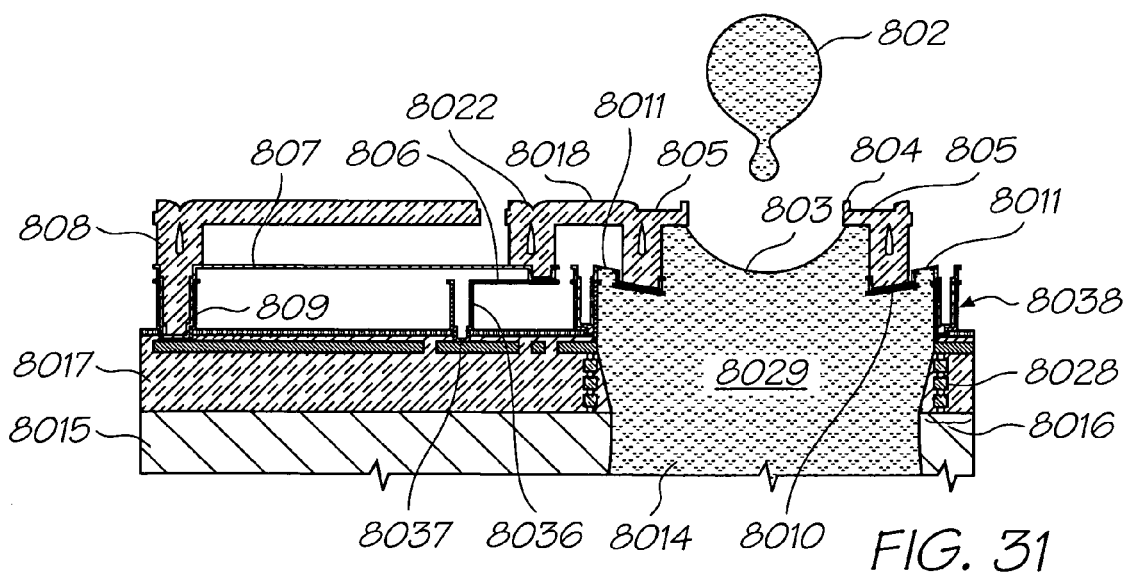
FIG. 31 shows a vertical sectional view of the nozzle of FIG. 36 later in the actuation phase.
Figure 32:
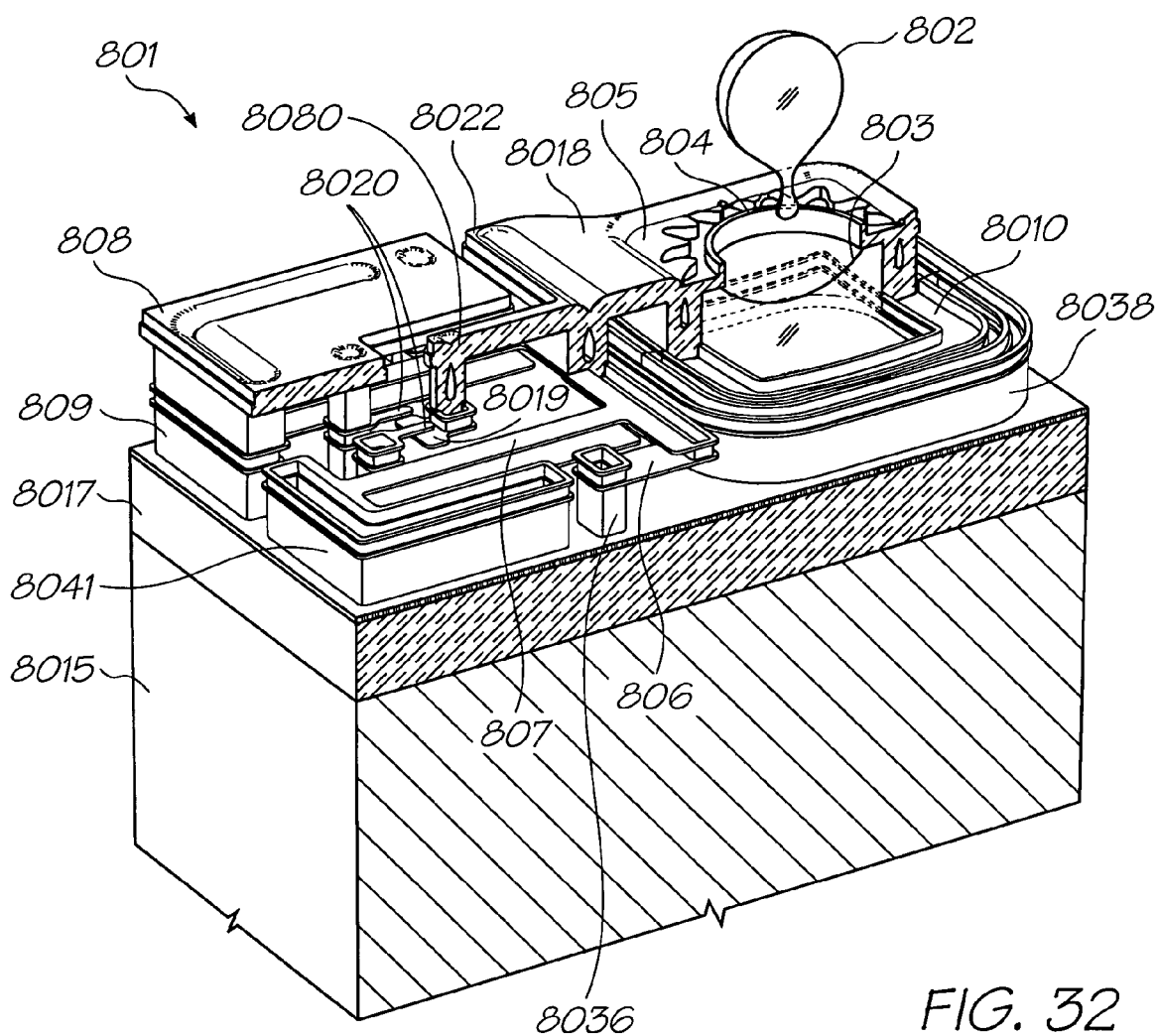
FIG. 32 shows a perspective partial vertical sectional view of the nozzle of FIG. 35, at the actuation state shown in FIG. 31.

Turning to FIG. 28, the individual printhead ICs 74 are sequentially attached to the film 71. Heated die 260 holds each printhead IC 74 and attaches it to the film 71 once the vision system 262 has aligned it with the previously attached printhead IC 74 and the holes 72. The LCP moulding 65 is no longer held straight because the deviation from exactly straight in the LCP moulding between one end of a printhead IC and the other is within acceptable tolerances. As discussed above, the vision system can reference to fiducials or it may reference to predetermined points on one or more of the holes 72 in the film 71. The PET liner 234 is peeled away immediately prior to attachment to avoid contamination. Again the die 260 heats the thermosetting adhesive 220 (through the printhead IC 74) until it is tacky but not cured. Only when the series of printhead ICs 74 are stuck to the LCP moulding 65 via the film 71, is it finally cured by raising the temperature above the known curing temperature.

Alternatively, the film can use thermosetting adhesive layers with different curing temperatures. By giving the layer 224 a lower curing temperature than the layer 220, the film can be attached and cured to the LCP moulding 65 before the printhead ICs 74 are attached and cured. Thermosetting adhesives provide a more reliable fluid seal than a thermoplastic film. A thermoplastic film is heated and softened so the printhead IC and LCP moulding can embed into the surface of the film. After the film cools, it attaches to the LCP with an essentially mechanical bond. This is prone to fail and leak with prolonged thermal fatigue during operation. The thermosetting resin adhesive cures to form a strong bond with the surface of the printhead IC that withstands the differential thermal expansions within the printhead assembly.

Figure 23:
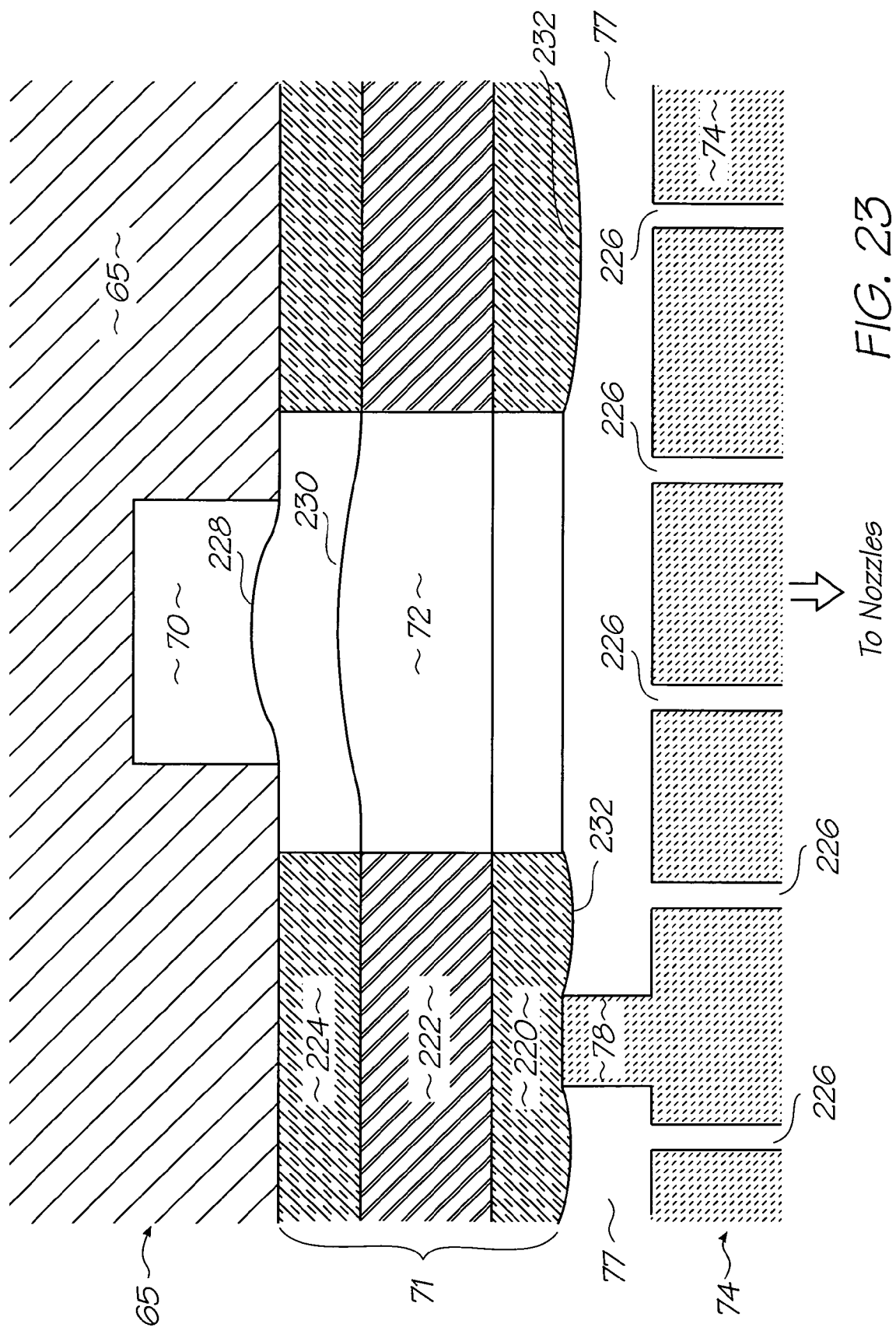
FIG. 23 is a partial schematic section view of the attachment of the printhead integrated circuit to the LCP moulding via the film.

FIG. 23 is a schematic partial section of the LCP moulding attached to the printhead IC via the polymer film as shown in FIG. 22A. Ink flows through the conduits 70 in the underside of the LCP moulding 65. The open channels 70 are sealed by the thermosetting adhesive layer 224 and the inner ends of the channels 70 align with the holes 72 through the film. It is important to get the viscosity of the thermosetting adhesive low enough to allow the printhead IC and the LCP moulding to adequately embed into the film surface, but no so low as to allow the adhesive to bulge into the fluid conduits to the extent that it causes a blockage or harmful constriction. However, a small amount of adhesive sagging or 'tenting' (see 228, 230 and 232 of FIG. 23) into the fluid channels is necessary for proper bonding and is not detrimental to ink flow. Therefore the adhesive viscosity range that provides a reliable seal without flow constriction will also depend on the dimensions and configuration of the apertures in the MST device and the support. Thermosetting adhesives with a viscosity between 100 centiPoise and 10,000,000 centiPoise will seal micron-scale apertures of MST devices. Deeper and wider apertures can use adhesives with viscosities at the lower end of the range and smaller, shallower apertures need adhesives with a higher viscosity.

Figure 21A:
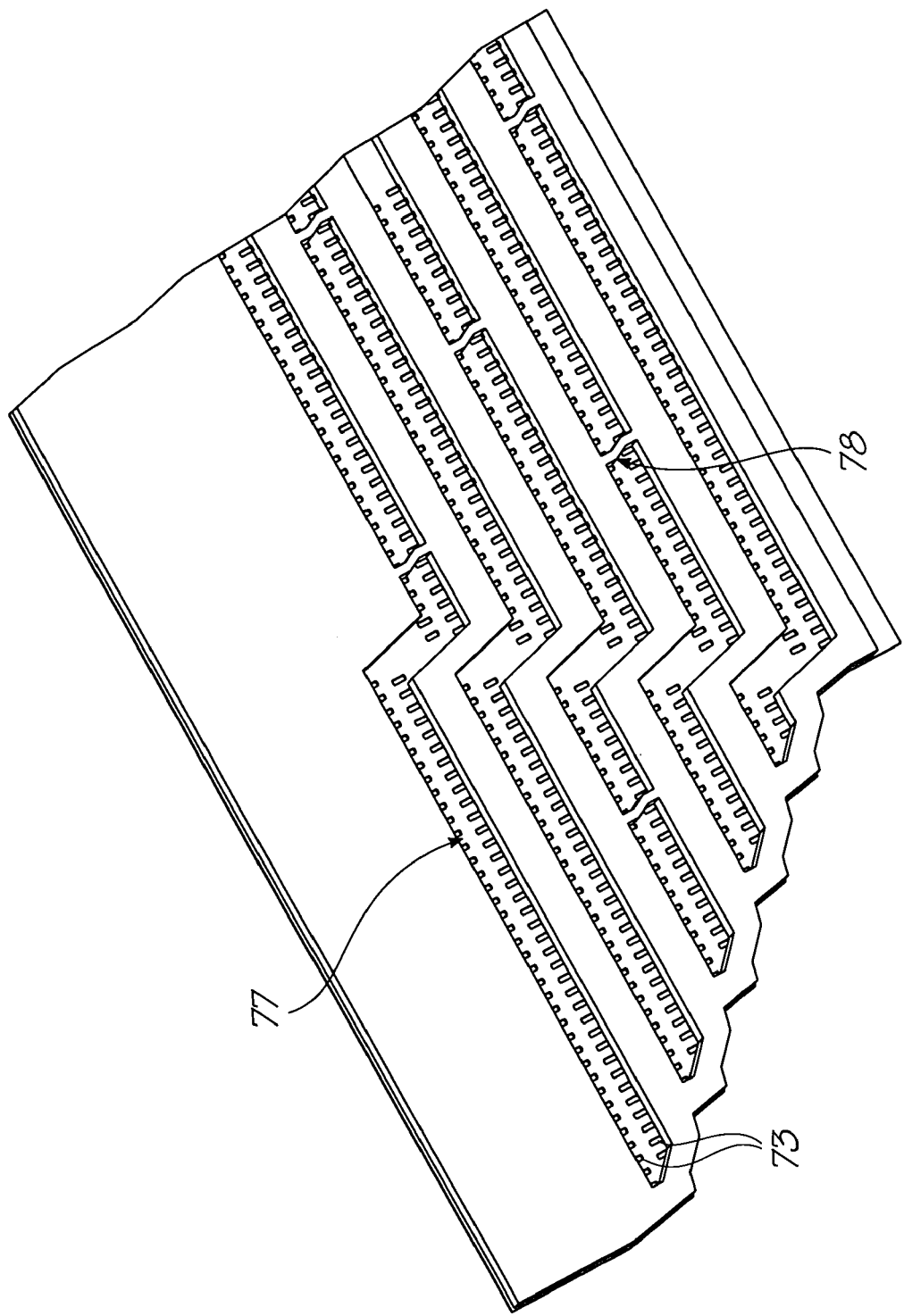
FIG. 21A shows an underside view of the printhead integrated circuit shown in FIG. 19.
Figure 21B:
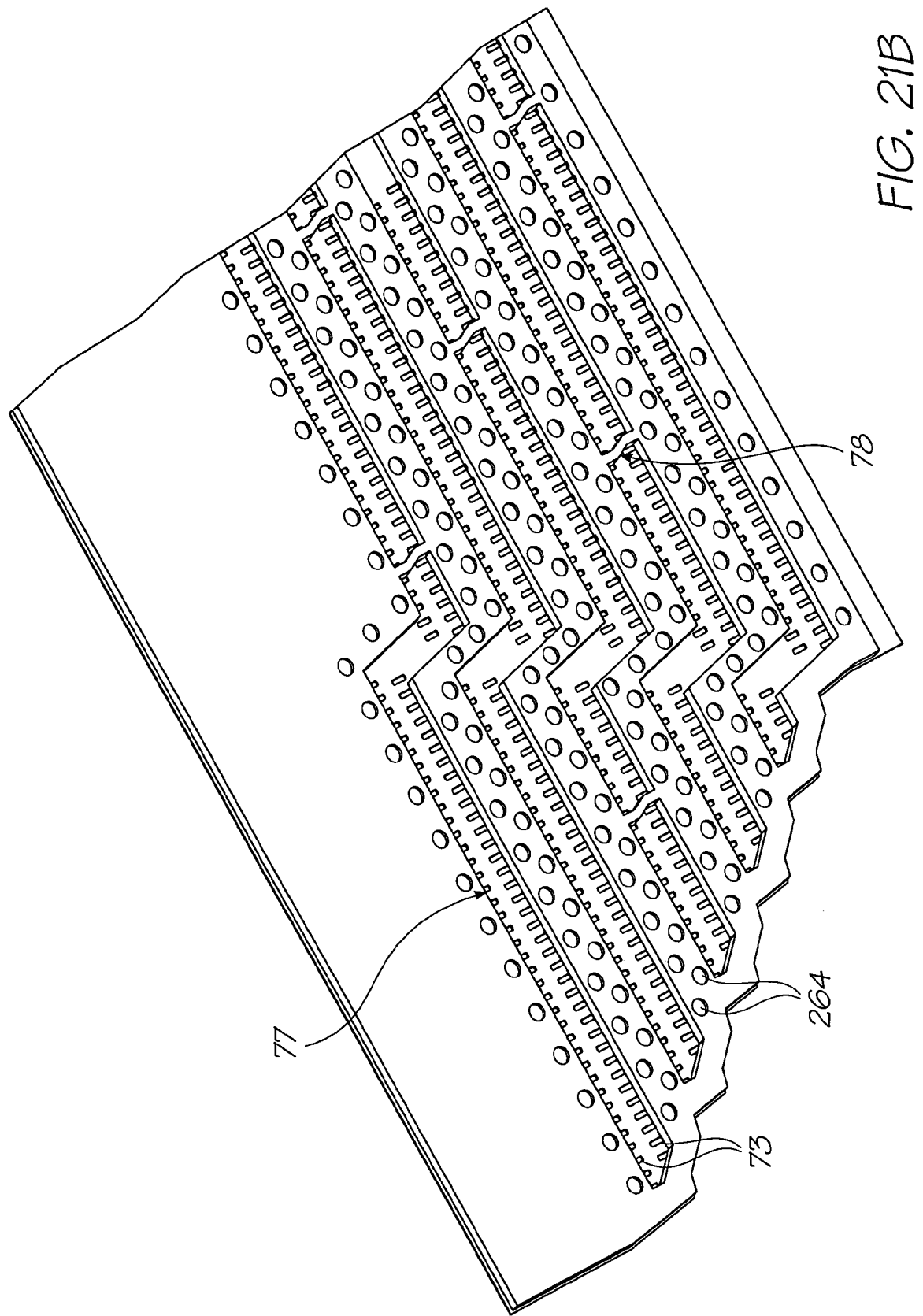
FIG. 21B shows an underside view of the printhead integrated circuit shown in FIG. 19 with a series of recesses in its attachment face.

The printhead IC 74 has inlet apertures in the form of distribution channels 77. These channels distribute ink to the inlets 226 leading to each individual nozzle (not shown). While FIG. 24 is not to scale, it will be appreciated from FIG. 22A that the distribution channels 77 are much smaller than the supply conduits 70 in the LCP moulding 65. Hence the channels 77 are more prone to clogging or constriction by adhesive displaced from between the carrier web 22 and upper face of the IC 74. To avoid this, recesses can be formed in the attachment surface of the printhead IC to hold ink that would otherwise be squeezed into the channels 77. As shown in FIG. 21B, these recesses may be a series of pits 264 about 10 microns in diameter and 5 microns deep extending along both sides of the 80 micron wide channels, spaced apart by 80 microns. The added texture and relief they give the attachment surface also aids the adhesion to the film 71.

The thickness of the polymer sealing film 71 is critical to the effectiveness of the ink seal it provides. As best seen in FIGS. 21A to 22B, the polymer sealing film seals the etched channels 77 on the reverse side of the printhead IC 74, as well as the conduits 70 on the other side of the film. However, as the film 71 seals across the open end of the conduits 70, it can also bulge or sag into the conduit. The section of film that sags into a conduit 70 runs across several of the etched channels 77 in the printhead IC 74. The sagging may cause a gap between the walls separating each of the etched channels 77. Obviously, this breaches the seal and allows ink to leak out of the printhead IC 74 and or between etched channels 77.

To guard against this, the polymer sealing film 71 should be thick enough to account for any sagging into the conduits 70 while maintaining the seal over the etched channels 77. The minimum thickness of the polymer sealing film 71 will depend on:

the width of the conduit into which it sags;

the thickness of the adhesive layers in the film's laminate structure;

the 'stiffness' of the adhesive layer as the printhead IC 74 is being pushed into it; and, the modulus of the central film material of the laminate.

A polymer sealing film 71 thickness of 25 microns is adequate for the printhead assembly 22 shown. However, increasing the thickness to 50, 100 or even 200 microns will correspondingly increase the reliability of the seal provided. In the Ablestik laminate described above, the thermosetting layers are 25 microns thick and the polyimide carrier web is 50 microns thick. The PET or mylar liners are typically one 12 microns thick.

Ink delivery inlets 73 are formed in the 'front' surface of a printhead IC 74. The inlets 73 supply ink to respective nozzles 801 (described below with reference to FIGS. 35 to 36) positioned on the inlets. The ink must be delivered to the IC's so as to supply ink to each and every individual inlet 73. Accordingly, the inlets 73 within an individual printhead IC 74 are physically grouped to reduce ink supply complexity and wiring complexity. They are also grouped logically to minimize power consumption and allow a variety of printing speeds.

Figure 19:
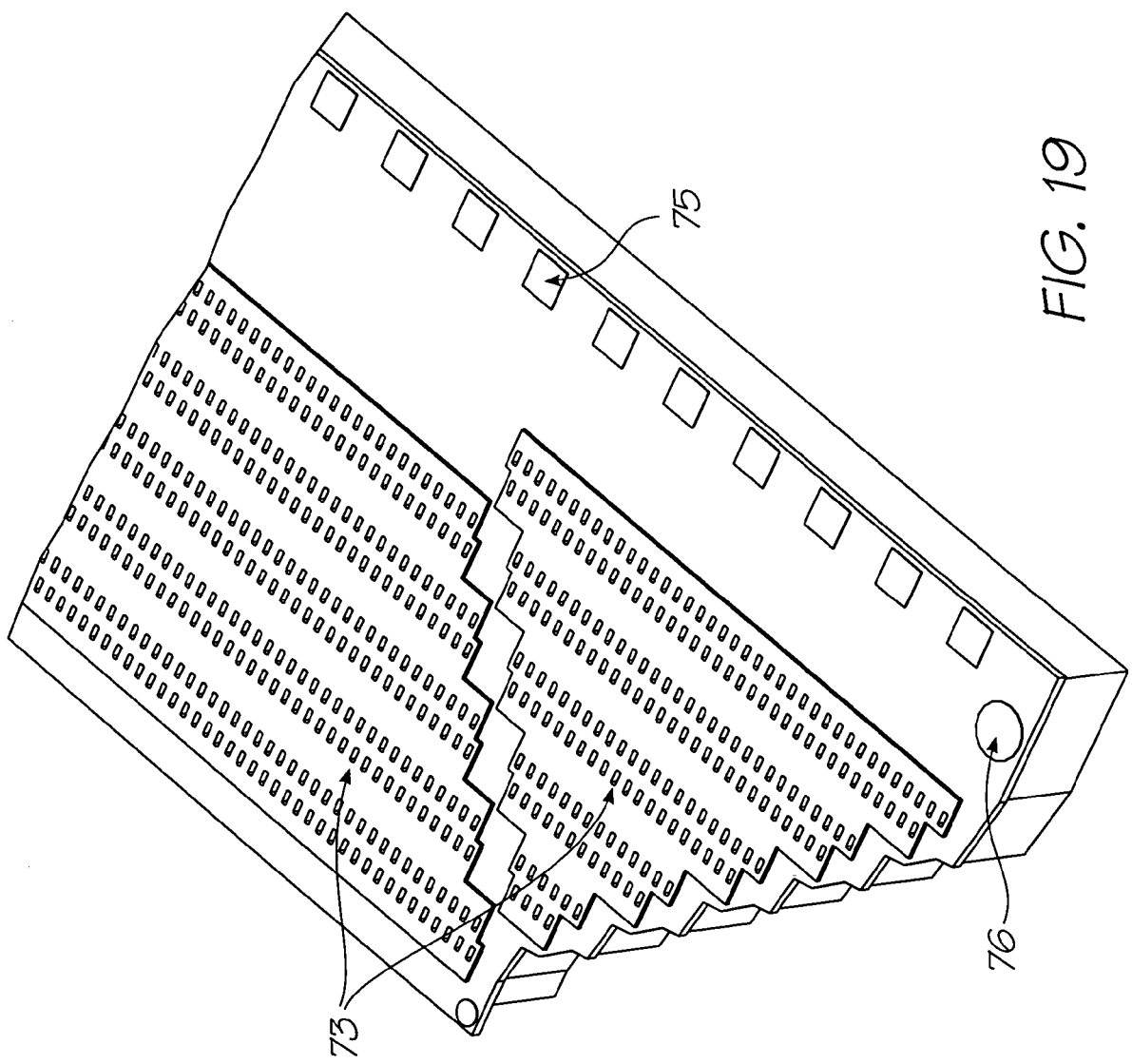
FIG. 19 shows a magnified partial perspective view of the drop triangle end of a printhead integrated circuit module as shown in FIGS. 16 to 18.

Each printhead IC 74 is configured to receive and print five different colours of ink (C, M, Y, K and IR) and contains 1280 ink inlets per colour, with these nozzles being divided into even and odd nozzles (640 each). Even and odd nozzles for each colour are provided on different rows on the printhead IC 74 and are aligned vertically to perform true 1600 dpi printing, meaning that nozzles 801 are arranged in 10 rows, as clearly shown in FIG. 19. The horizontal distance between two adjacent nozzles 801 on a single row is 31.75 microns, whilst the vertical distance between rows of nozzles is based on the firing order of the nozzles, but rows are typically separated by an exact number of dot lines, plus a fraction of a dot line corresponding to the distance the paper will move between row firing times. Also, the spacing of even and odd rows of nozzles for a given colour must be such that they can share an ink channel, as will be described below.

Production Method

Various aspects of the production process discussed below with reference to the schematic sectional views shown in FIGS. 18B-18E. One known technique is shown in FIG. 18B. The polyimide film is removed from one end of the flex PCB 79 to expose the conductive tracks 200. The tracks 200 are spaced so that they are in registration with a line of bond pads on the printhead IC 74. The tracks 74 are then directly connected to the bond pads. This technique is commonly known as 'TAB bonding' and requires the flex PCB to be very accurate as well as a high degree of precision when aligning the flex PCB and the bond pads. Consequently, this can be a time consuming stage of the overall printhead production process. It also requires the support molding 65 to have a stepped section 204 to support the flex PCB 79 at the height of the printhead IC 74. The stepped section 204 is an added design complexity.

This aspect of the present invention attaches both the printhead IC 74 and the flex PCB 79 (or at least the conductive tracks 200) to the support molding 65 with the polymer film 71 before wiring 206 the conductive tracks 200 to the printhead IC 74. Attaching both the printhead IC and the flex PCB to the support member with a polymer film is a relatively quick and simple step as the highly precise alignment of the tracks and the bond pads is not critical. The subsequent wiring of the flex PCB to the bond pads can be done by automated equipment that optically locates the tracks and their corresponding bond pad on the printhead IC. Small inaccuracies in the registration of the tracks and the bond pads will not prevent the flex PCB from connecting to the printhead IC, especially long IC's used in pagewidth printhead. As a result the overall process is more time efficient and commercially practical.

Figure 18C:
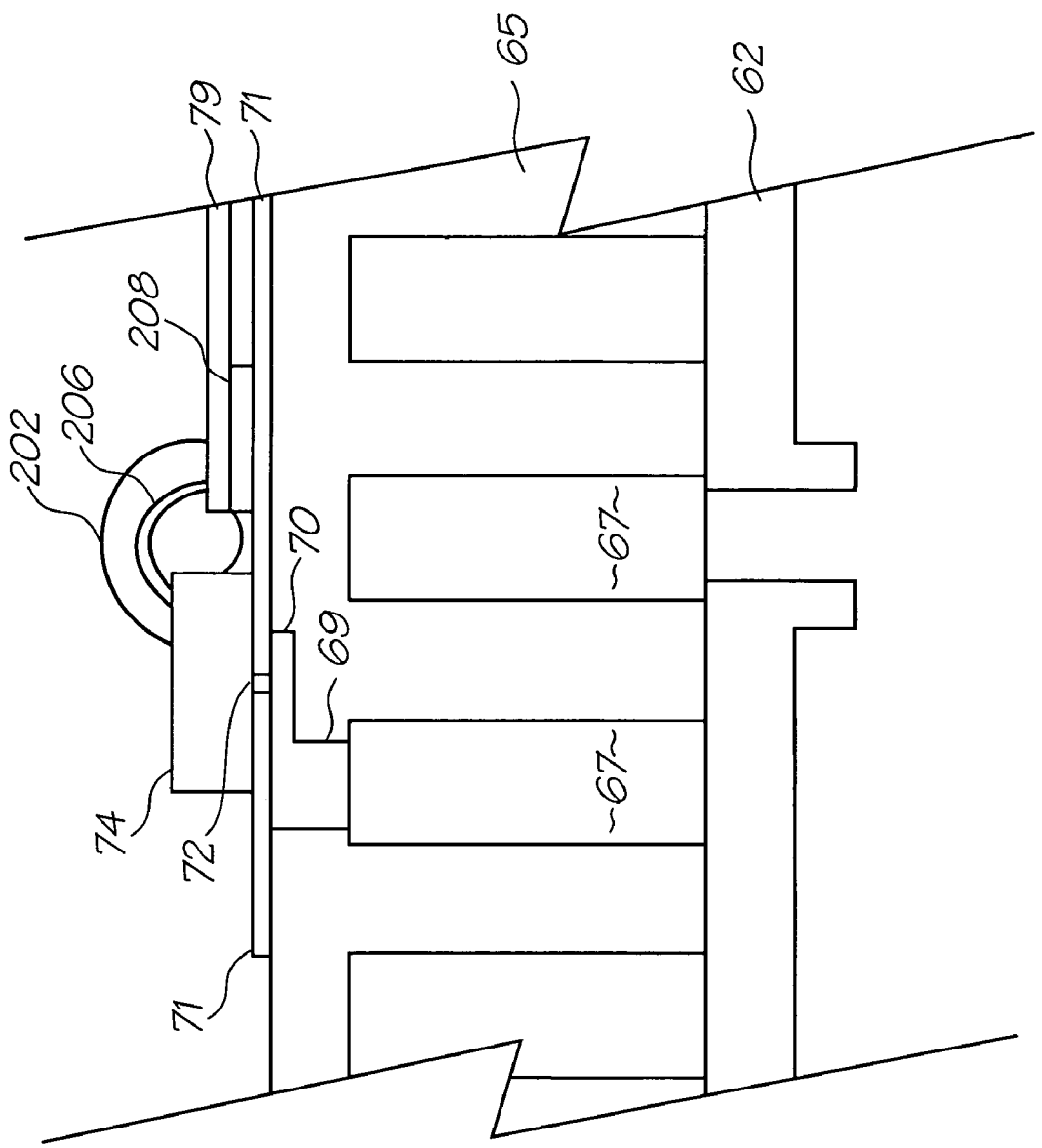
FIGS. 18C-18E are schematic sectional views showing three embodiments of the printhead IC attached to the LCP molding in accordance with one aspect of the present invention.
Figure 18D:
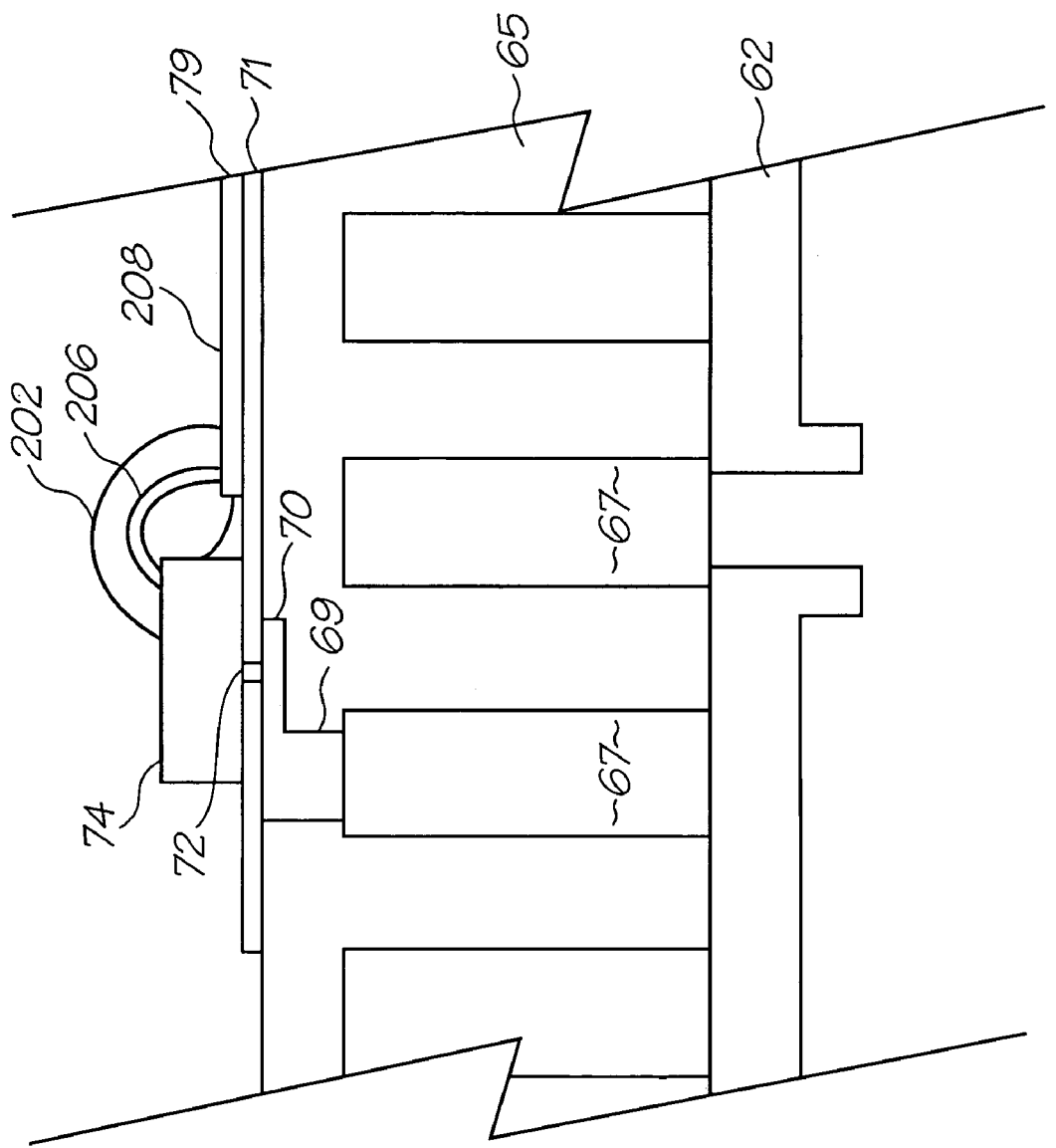
Figure 18E:
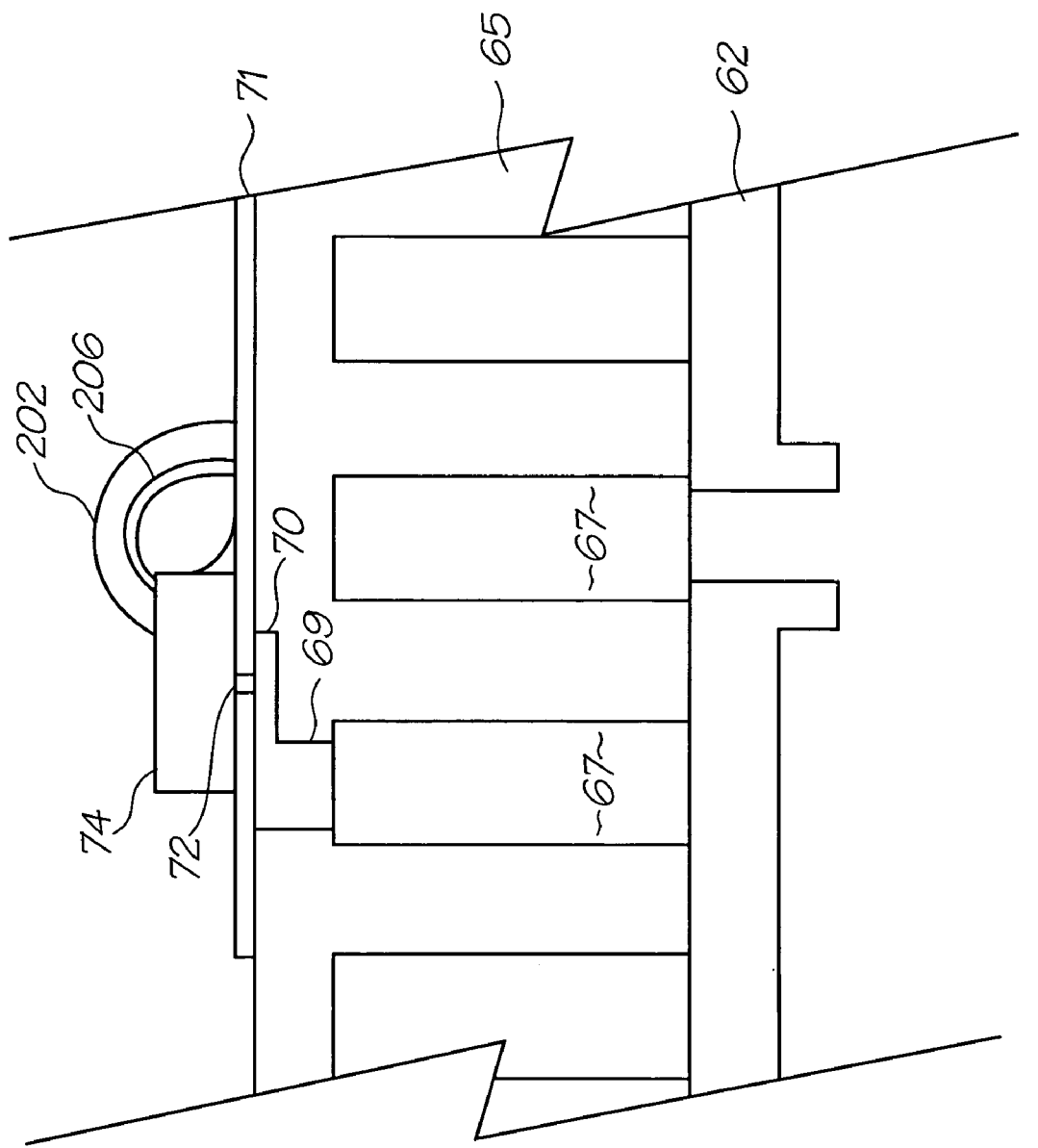

FIG. 18C-18E show different options for the flex PCB and IC attachment that all use the same basic technique of the present invention. In FIG. 18C, the flex PCB 79 is attached to the polymer film 71 after the printhead IC 74 is attached. To do this, the flex PCB 79 has an adhesive area 208 to attach to the polymer film 71 because the polymer film 71 cools, hardens and loses its own adhesive qualities after the printhead IC 74 attachment process. With the flex PCB and the IC attached, the wire connections 206 are made and the protective encapsulator 202 added.

In FIG. 18D, the printhead IC 74 and the flex PCB 79 are simultaneously attached to the support molding 65 via the polymer film 71. This is quicker than attaching the flex and IC separately, but more complex. FIG. 18E shows a much simpler version where the conductive tracks are incorporated into the polymer film 71. As discussed above, the polymer film 71 is a laminate so the tracks can be positioned between the layers. In this form, the polymer film effectively becomes the flex PCB. This option is quick and simple but the polymer film with incorporated tracks is not an 'off the shelf' product.

For context, FIGS. 18C-18E show the upper member 62 and lower member 65 of the LCP molding, the individual ink channels 67, the ink holes 69, the conduits 70 and the laser drilled holes 72 discussed in detail above.

As alluded to previously, the present invention is related to page-width printing and as such the printhead ICs 74 are arranged to extend horizontally across the width of the printhead assembly 22. To achieve this, individual printhead ICs 74 are linked together in abutting arrangement across the surface of the polymer film 71, as shown in FIGS. 16 and 17. The printhead IC's 74 may be attached to the polymer sealing film 71 by heating the IC's above the melting point of the adhesive layer and then pressing them into the sealing film 71, or melting the adhesive layer of the film 71 under the IC with a laser before pressing it into the film. Another option is to both heat the IC (not above the adhesive melting point) and the adhesive layer, before pressing it into the film 71.

As discussed above, the flex PCB can have an adhesive area for attachment to the polymer film 71, or a heated bar can press the flex onto the polymer film for a predetermine time.

Printhead Linking

The length of an individual printhead IC 74 is around 20-22 mm. To print an A4/US letter sized page, 11-12 individual printhead ICs 74 are contiguously linked together. The number of individual printhead ICs 74 may be varied to accommodate sheets of other widths.

Figure 20:
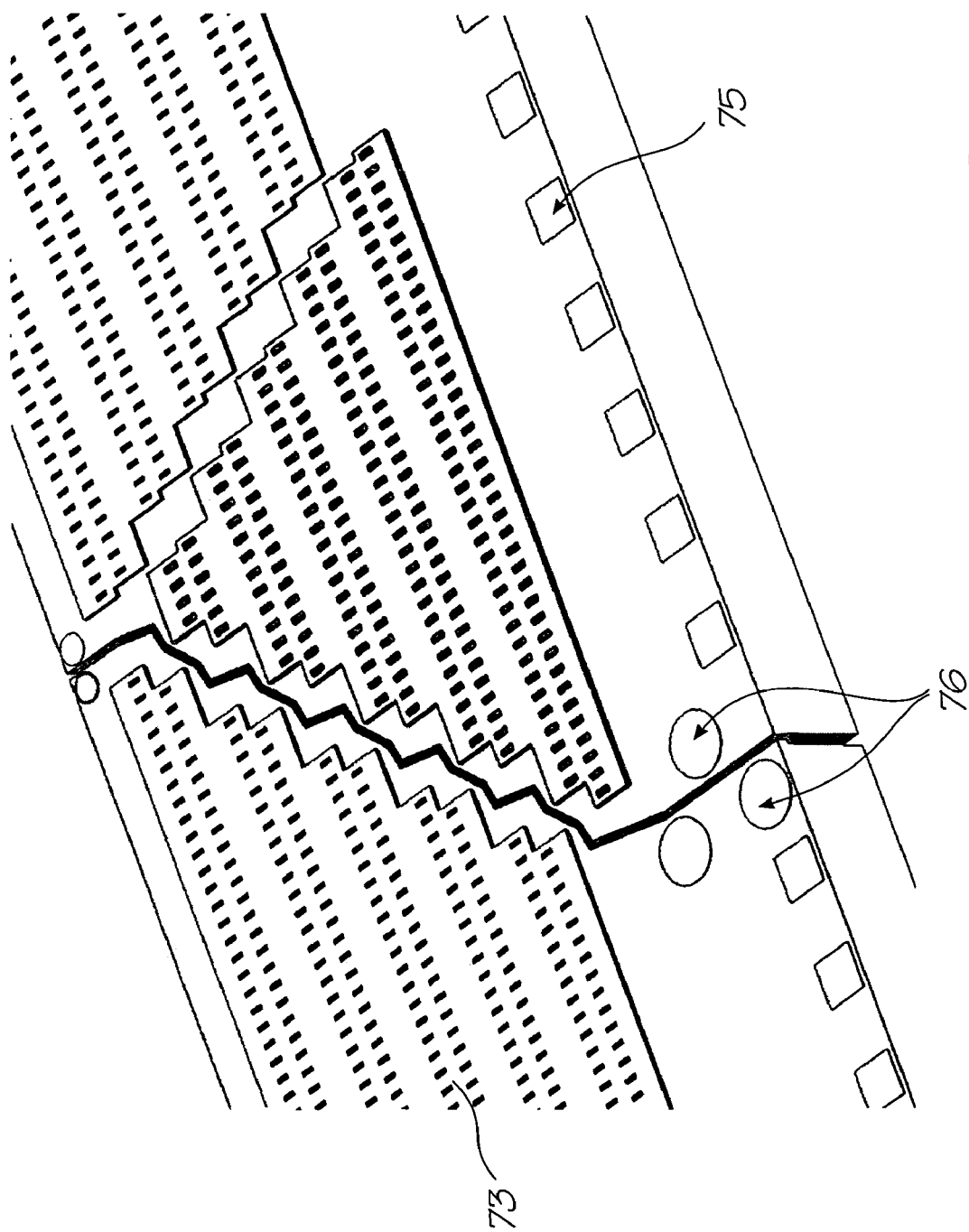
FIG. 20 shows a magnified perspective view of the join between two printhead integrated circuit modules shown in FIGS. 16 to 19.

The printhead ICs 74 may be linked together in a variety of ways. One particular manner for linking the ICs 74 is shown in FIG. 20. In this arrangement, the ICs 74 are shaped at their ends to link together to form a horizontal line of ICs, with no vertical offset between neighboring ICs. A sloping join is provided between the ICs having substantially a 45° angle. The joining edge is not straight and has a sawtooth profile to facilitate positioning, and the ICs 74 are intended to be spaced about 11 microns apart, measured perpendicular to the joining edge. In this arrangement, the left most ink delivery nozzles 73 on each row are dropped by 10 line pitches and arranged in a triangle configuration. This arrangement provides a degree of overlap of nozzles at the join and maintains the pitch of the nozzles to ensure that the drops of ink are delivered consistently along the printing zone. This arrangement also ensures that more silicon is provided at the edge of the IC 74 to ensure sufficient linkage. Whilst control of the operation of the nozzles is performed by the SoPEC device (discussed later in the description), compensation for the nozzles may be performed in the printhead, or may also be performed by the SoPEC device, depending on the storage requirements. In this regard it will be appreciated that the dropped triangle arrangement of nozzles disposed at one end of the IC 74 provides the minimum on-printhead storage requirements. However where storage requirements are less critical, shapes other than a triangle can be used, for example, the dropped rows may take the form of a trapezoid.

The upper surface of the printhead ICs have a number of bond pads 75 provided along an edge thereof which provide a means for receiving data and or power to control the operation of the nozzles 73 from the SoPEC device. To aid in positioning the ICs 74 correctly on the surface of the adhesive layer 71 and aligning the ICs 74 such that they correctly align with the holes 72 formed in the adhesive layer 71, fiducials 76 are also provided on the surface of the ICs 74. The fiducials 76 are in the form of markers that are readily identifiable by appropriate positioning equipment to indicate the true position of the IC 74 with respect to a neighbouring IC and the surface of the adhesive layer 71, and are strategically positioned at the edges of the ICs 74, and along the length of the adhesive layer 71.

In order to receive the ink from the holes 72 formed in the polymer sealing film 71 and to distribute the ink to the ink inlets 73, the underside of each printhead IC 74 is configured as shown in FIG. 21. A number of etched channels 77 are provided, with each channel 77 in fluid communication with a pair of rows of inlets 73 dedicated to delivering one particular colour or type of ink. The channels 77 are about 80 microns wide, which is equivalent to the width of the holes 72 in the polymer sealing film 71, and extend the length of the IC 74. The channels 77 are divided into sections by silicon walls 78. Each sections is directly supplied with ink, to reduce the flow path to the inlets 73 and the likelihood of ink starvation to the individual nozzles 801. In this regard, each section feeds approximately 128 nozzles 801 via their respective inlets 73.

FIG. 22B shows more clearly how the ink is fed to the etched channels 77 formed in the underside of the ICs 74 for supply to the nozzles 73. As shown, holes 72 formed through the polymer sealing film 71 are aligned with one of the channels 77 at the point where the silicon wall 78 separates the channel 77 into sections. The holes 72 are about 80 microns in width which is substantially the same width of the channels 77 such that one hole 72 supplies ink to two sections of the channel 77. It will be appreciated that this halves the density of holes 72 required in the polymer sealing film 71.

Following attachment and alignment of each of the printhead ICs 74 to the surface of the polymer sealing film 71, a flex PCB 79 (see FIG. 18) is attached along an edge of the ICs 74 so that control signals and power can be supplied to the bond pads 75 to control and operate the nozzles 801. As shown more clearly in FIG. 15, the flex PCB 79 extends from the printhead assembly 22 and folds around the printhead assembly 22.

The flex PCB 79 may also have a plurality of decoupling capacitors 81 arranged along its length for controlling the power and data signals received. As best shown in FIG. 16, the flex PCB 79 has a plurality of electrical contacts 180 formed along its length for receiving power and or data signals from the control circuitry of the cradle unit 12. A plurality of holes 80 are also formed along the distal edge of the flex PCB 79 which provide a means for attaching the flex PCB to the flange portion 40 of the rigid plate 34 of the main body 20. The manner in which the electrical contacts of the flex PCB 79 contact the power and data contacts of the cradle unit 12 will be described later.

As shown in FIG. 18A, a media shield 82 protects the printhead ICs 74 from damage which may occur due to contact with the passing media. The media shield 82 is attached to the upper member 62 upstream of the printhead ICs 74 via an appropriate clip-lock arrangement or via an adhesive. When attached in this manner, the printhead ICs 74 sit below the surface of the media shield 82, out of the path of the passing media.

A space 83 is provided between the media shield 82 and the upper 62 and lower 65 members which can receive pressurized air from an air compressor or the like. As this space 83 extends along the length of the printhead assembly 22, compressed air can be supplied to the space 56 from either end of the printhead assembly 22 and be evenly distributed along the assembly. The inner surface of the media shield 82 is provided with a series of fins 84 which define a plurality of air outlets evenly distributed along the length of the media shield 82 through which the compressed air travels and is directed across the printhead ICs 74 in the direction of the media delivery. This arrangement acts to prevent dust and other particulate matter carried with the media from settling on the surface of the printhead ICs, which could cause blockage and damage to the nozzles.

Ink Delivery Nozzles

One example of a type of ink delivery nozzle arrangement suitable for the present invention, comprising a nozzle and corresponding actuator, will now be described with reference to FIGS. 35 to 38. FIG. 38 shows an array of ink delivery nozzle arrangements 801 formed on a silicon substrate 8015. Each of the nozzle arrangements 801 are identical, however groups of nozzle arrangements 801 are arranged to be fed with different colored inks or fixative. In this regard, the nozzle arrangements are arranged in rows and are staggered with respect to each other, allowing closer spacing of ink dots during printing than would be possible with a single row of nozzles. Such an arrangement makes it possible to provide a high density of nozzles, for example, more than 5000 nozzles arrayed in a plurality of staggered rows each having an interspacing of about 32 microns between the nozzles in each row and about 80 microns between the adjacent rows. The multiple rows also allow for redundancy (if desired), thereby allowing for a predetermined failure rate per nozzle.

Each nozzle arrangement 801 is the product of an integrated circuit fabrication technique. In particular, the nozzle arrangement 801 defines a micro-electromechanical system (MST).

For clarity and ease of description, the construction and operation of a single nozzle arrangement 801 will be described with reference to FIGS. 35 to 37.

The ink jet printhead integrated circuit 74 includes a silicon wafer substrate 8015 having 0.35 micron 1 P4M 12 volt CMOS microprocessing electronics is positioned thereon.

A silicon dioxide (or alternatively glass) layer 8017 is positioned on the substrate 8015. The silicon dioxide layer 8017 defines CMOS dielectric layers. CMOS top-level metal defines a pair of aligned aluminium electrode contact layers 8030 positioned on the silicon dioxide layer 8017. Both the silicon wafer substrate 8015 and the silicon dioxide layer 8017 are etched to define an ink inlet channel 8014 having a generally circular cross section (in plan). An aluminium diffusion barrier 8028 of CMOS metal 1, CMOS metal 2/3 and CMOS top level metal is positioned in the silicon dioxide layer 8017 about the ink inlet channel 8014. The diffusion barrier 8028 serves to inhibit the diffusion of hydroxyl ions through CMOS oxide layers of the drive electronics layer 8017.

A passivation layer in the form of a layer of silicon nitride 8031 is positioned over the aluminium contact layers 8030 and the silicon dioxide layer 8017. Each portion of the passivation layer 8031 positioned over the contact layers 8030 has an opening 8032 defined therein to provide access to the contacts 8030.

The nozzle arrangement 801 includes a nozzle chamber 8029 defined by an annular nozzle wall 8033, which terminates at an upper end in a nozzle roof 8034 and a radially inner nozzle rim 804 that is circular in plan. The ink inlet channel 8014 is in fluid communication with the nozzle chamber 8029. At a lower end of the nozzle wall, there is disposed a moving rim 8010, that includes a moving seal lip 8040. An encircling wall 8038 surrounds the movable nozzle, and includes a stationary seal lip 8039 that, when the nozzle is at rest as shown in FIG. 38, is adjacent the moving rim 8010. A fluidic seal 8011 is formed due to the surface tension of ink trapped between the stationary seal lip 8039 and the moving seal lip 8040. This prevents leakage of ink from the chamber whilst providing a low-resistance coupling between the encircling wall 8038 and the nozzle wall 8033.

Figure 36:
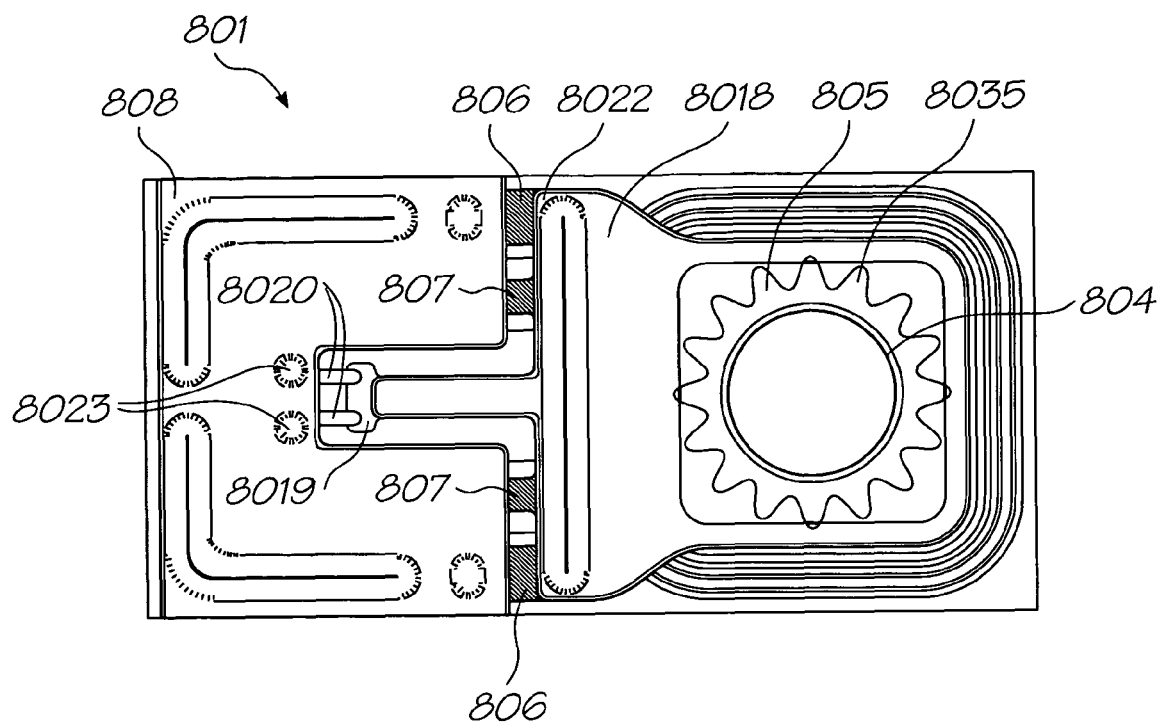
FIG. 36 shows a plan view of the nozzle of FIG. 35.

As best shown in FIG. 36, a plurality of radially extending recesses 8035 is defined in the roof 8034 about the nozzle rim 804. The recesses 8035 serve to contain radial ink flow as a result of ink escaping past the nozzle rim 804.

The nozzle wall 8033 forms part of a lever arrangement that is mounted to a carrier 8036 having a generally U-shaped profile with a base 8037 attached to the layer 8031 of silicon nitride.

The lever arrangement also includes a lever arm 8018 that extends from the nozzle walls and incorporates a lateral stiffening beam 8022. The lever arm 8018 is attached to a pair of passive beams 806, formed from titanium nitride (TiN) and positioned on either side of the nozzle arrangement, as best shown in FIGS. 38 and 37. The other ends of the passive beams 806 are attached to the carrier 8036.

The lever arm 8018 is also attached to an actuator beam 807, which is formed from TiN. It will be noted that this attachment to the actuator beam is made at a point a small but critical distance higher than the attachments to the passive beam 806.

Figure 35:
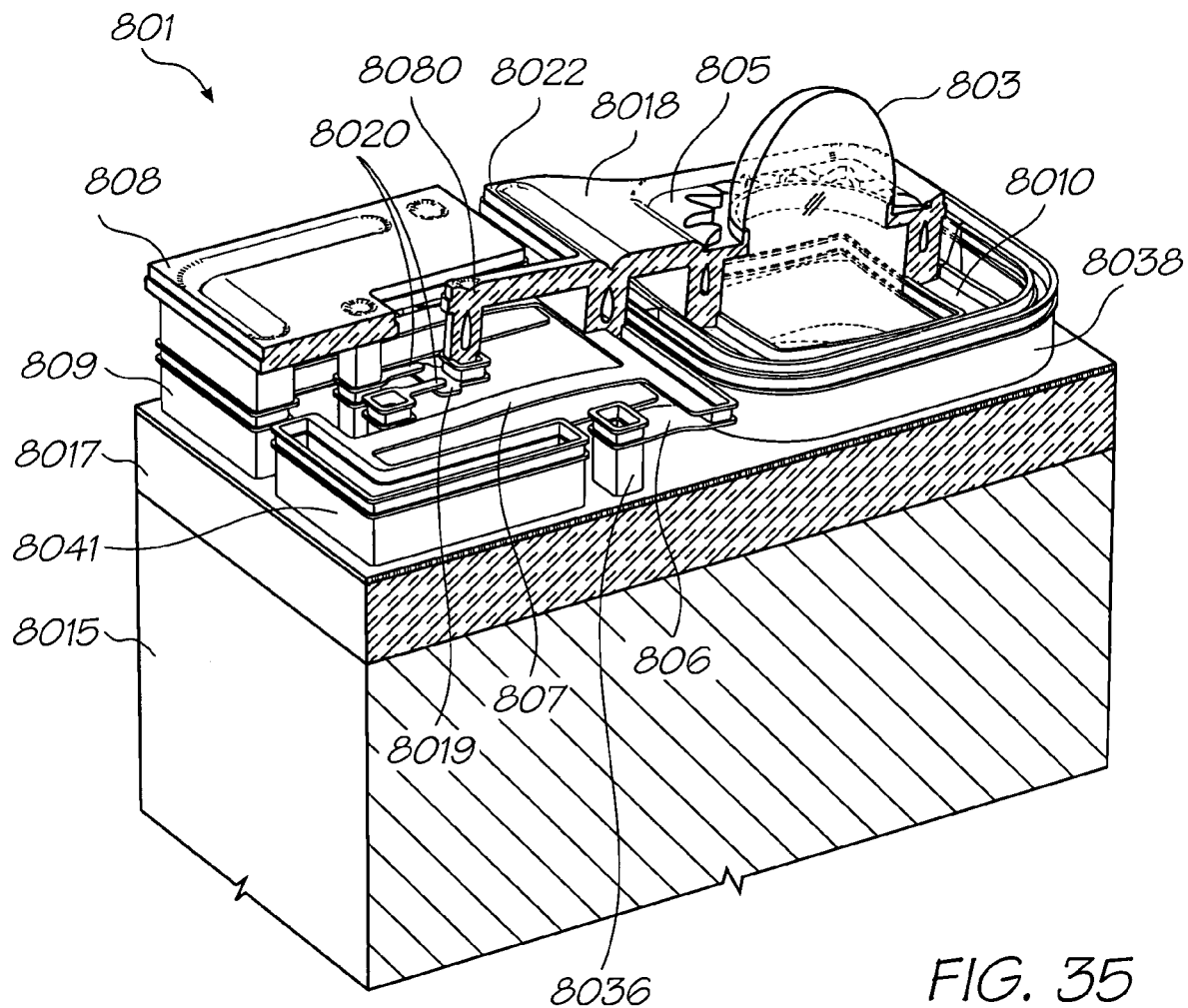
FIG. 35 shows a perspective partial vertical sectional view of the nozzle of FIG. 35, at the actuation state shown in FIG. 36.

As best shown in FIGS. 35 and 35, the actuator beam 807 is substantially U-shaped in plan, defining a current path between the electrode 809 and an opposite electrode 8041. Each of the electrodes 809 and 8041 are electrically connected to respective points in the contact layer 8030. As well as being electrically coupled via the contacts 809, the actuator beam is also mechanically anchored to anchor 808. The anchor 808 is configured to constrain motion of the actuator beam 807 to the left of FIGS. 38 to 28 when the nozzle arrangement is in operation.

The TiN in the actuator beam 807 is conductive, but has a high enough electrical resistance that it undergoes self-heating when a current is passed between the electrodes 809 and 8041. No current flows through the passive beams 806, so they do not expand.

In use, the device at rest is filled with ink 8013 that defines a meniscus 803 under the influence of surface tension. The ink is retained in the chamber 8029 by the meniscus, and will not generally leak out in the absence of some other physical influence.

As shown in FIG. 36, to fire ink from the nozzle, a current is passed between the contacts 809 and 8041, passing through the actuator beam 807. The self-heating of the beam 807 due to its resistance causes the beam to expand. The dimensions and design of the actuator beam 807 mean that the majority of the expansion in a horizontal direction with respect to FIGS. 35 to 37. The expansion is constrained to the left by the anchor 808, so the end of the actuator beam 807 adjacent the lever arm 8018 is impelled to the right.

The relative horizontal inflexibility of the passive beams 806 prevents them from allowing much horizontal movement the lever arm 8018. However, the relative displacement of the attachment points of the passive beams and actuator beam respectively to the lever arm causes a twisting movement that causes the lever arm 8018 to move generally downwards. The movement is effectively a pivoting or hinging motion. However, the absence of a true pivot point means that the rotation is about a pivot region defined by bending of the passive beams 806.

The downward movement (and slight rotation) of the lever arm 8018 is amplified by the distance of the nozzle wall 8033 from the passive beams 806. The downward movement of the nozzle walls and roof causes a pressure increase within the chamber 8029, causing the meniscus to bulge as shown in FIG. 36. It will be noted that the surface tension of the ink means the fluid seal 8011 is stretched by this motion without allowing ink to leak out.

Figure 37:
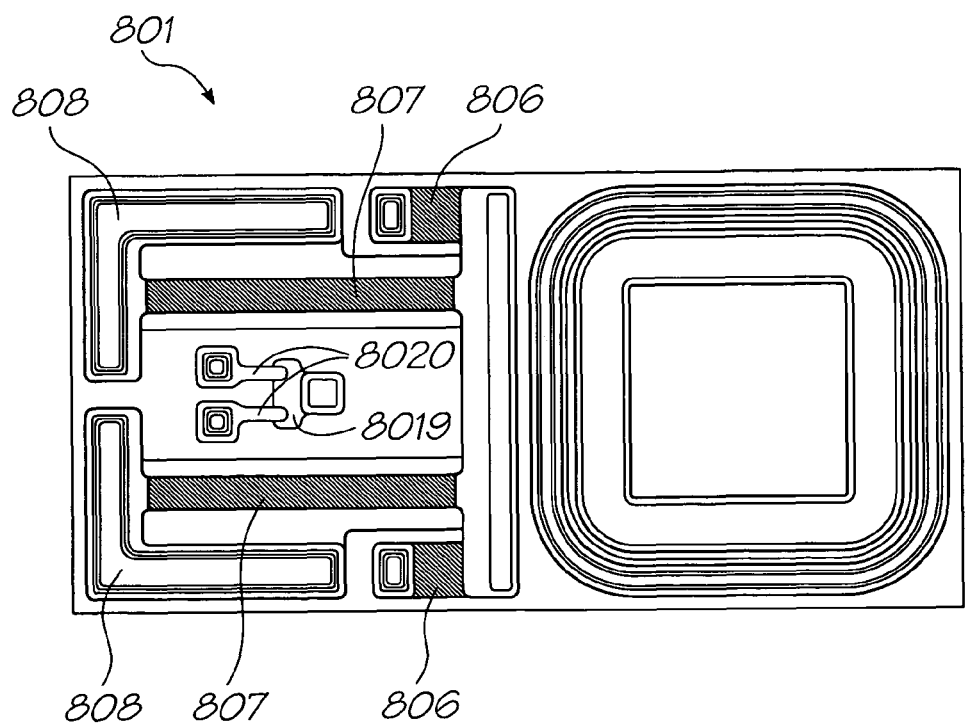
FIG. 37 shows a plan view of the nozzle of FIG. 35 with the lever arm and movable nozzle removed for clarity.
Figure 38:
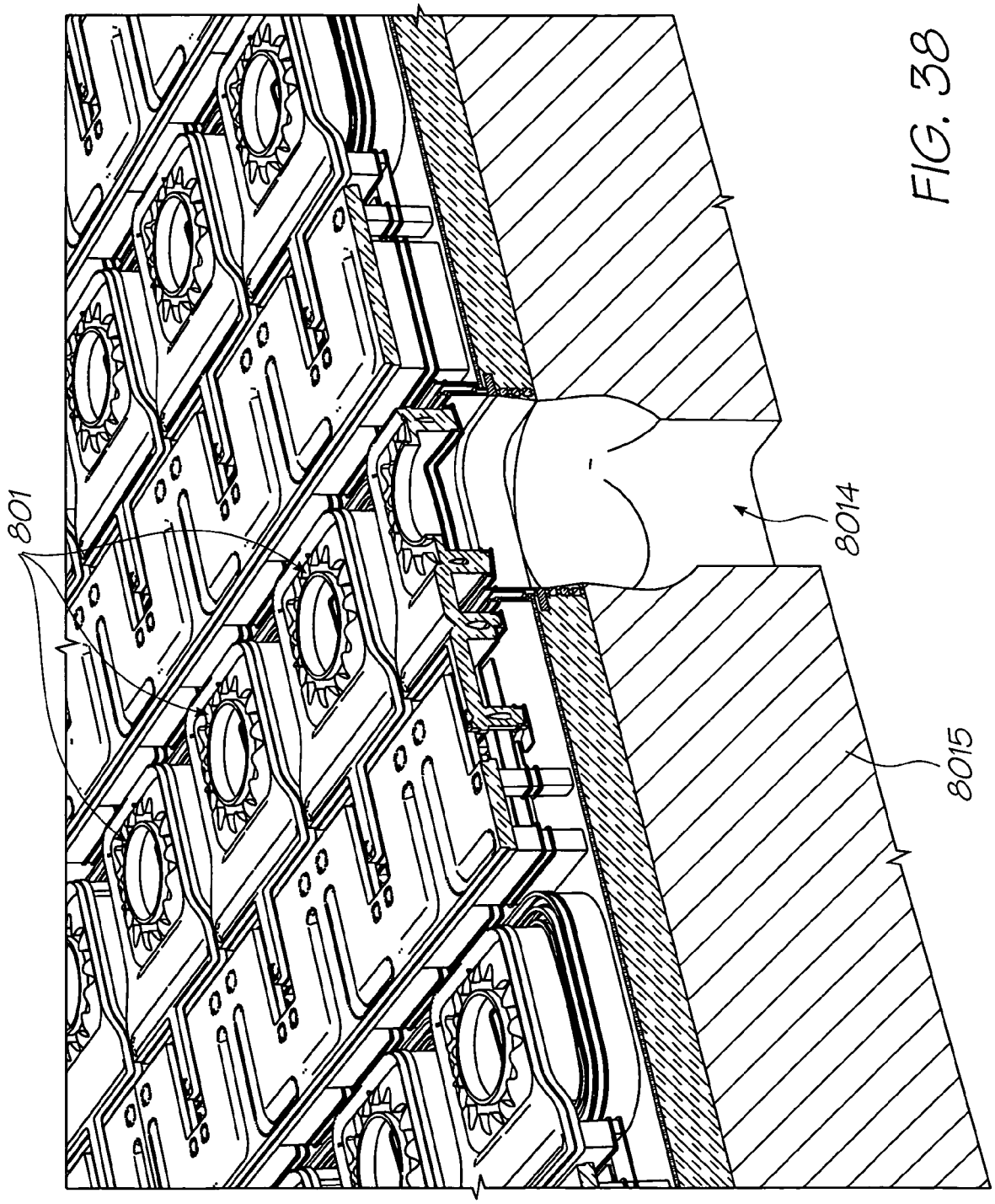
FIG. 38 shows a perspective vertical sectional view of a part of a printhead chip incorporating a plurality of the nozzle arrangements of the type shown in FIG. 35.

As shown in FIG. 37, at the appropriate time, the drive current is stopped and the actuator beam 807 quickly cools and contracts. The contraction causes the lever arm to commence its return to the quiescent position, which in turn causes a reduction in pressure in the chamber 8029. The interplay of the momentum of the bulging ink and its inherent surface tension, and the negative pressure caused by the upward movement of the nozzle chamber 8029 causes thinning, and ultimately snapping, of the bulging meniscus to define an ink drop 802 that continues upwards until it contacts adjacent print media.

Immediately after the drop 802 detaches, meniscus 803 forms the concave shape shown in FIG. 37. Surface tension causes the pressure in the chamber 8029 to remain relatively low until ink has been sucked upwards through the inlet 8014, which returns the nozzle arrangement and the ink to the quiescent situation shown in FIG. 35.

Figure 33:
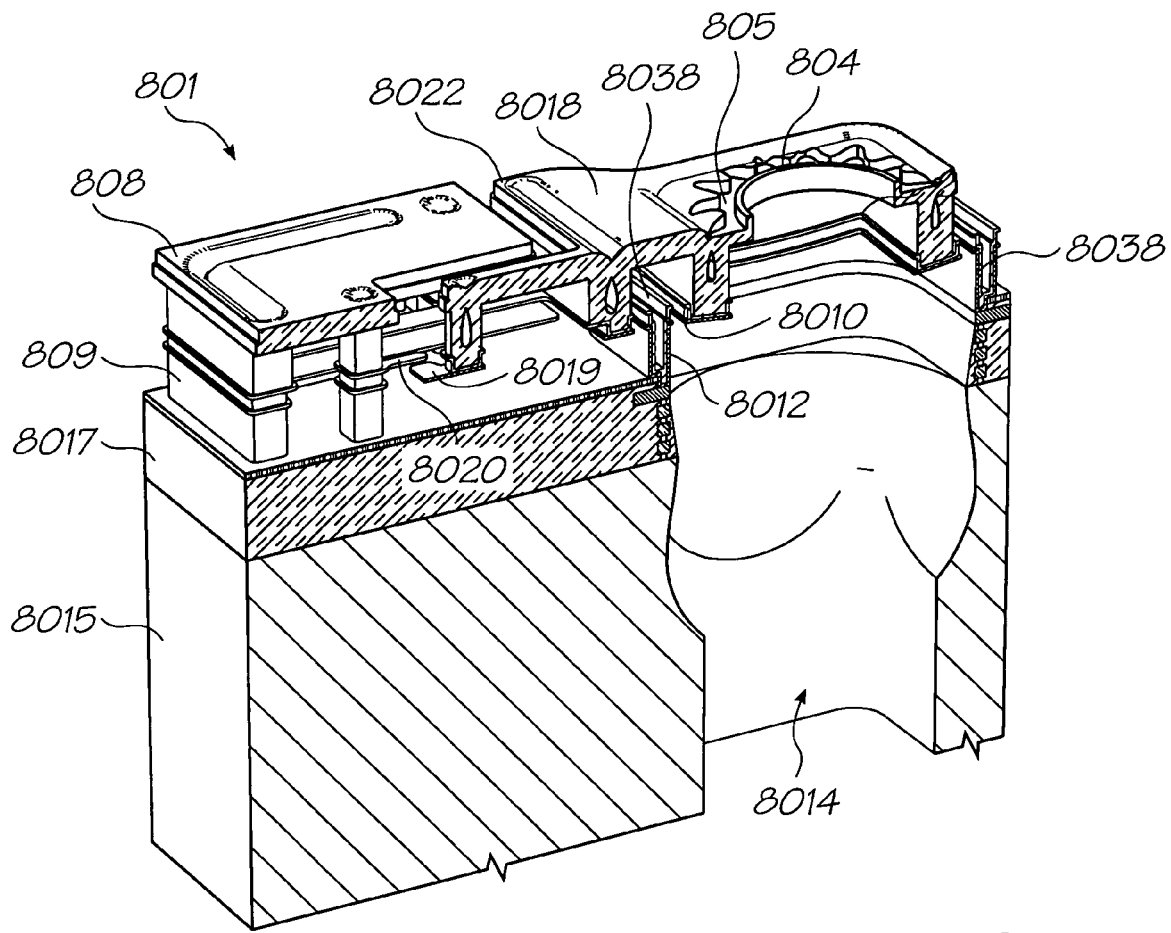
FIG. 33 shows a perspective vertical section of the nozzle of FIG. 29, with ink omitted.

Another type of printhead nozzle arrangement suitable for the present invention will now be described with reference to FIG. 33. Once again, for clarity and ease of description, the construction and operation of a single nozzle arrangement 1001 will be described.

The nozzle arrangement 1001 is of a bubble forming heater element actuator type which comprises a nozzle plate 1002 with a nozzle 1003 therein, the nozzle having a nozzle rim 1004, and aperture 1005 extending through the nozzle plate. The nozzle plate 1002 is plasma etched from a silicon nitride structure which is deposited, by way of chemical vapour deposition (CVD), over a sacrificial material which is subsequently etched.

The nozzle arrangement includes, with respect to each nozzle 1003, side walls 1006 on which the nozzle plate is supported, a chamber 1007 defined by the walls and the nozzle plate 1002, a multi-layer substrate 1008 and an inlet passage 1009 extending through the multi-layer substrate to the far side (not shown) of the substrate. A looped, elongate heater element 1010 is suspended within the chamber 1007, so that the element is in the form of a suspended beam. The nozzle arrangement as shown is a micro system technologies (MST) structure, which is formed by a lithographic process.

When the nozzle arrangement is in use, ink 1011 from a reservoir (not shown) enters the chamber 1007 via the inlet passage 1009, so that the chamber fills. Thereafter, the heater element 1010 is heated for somewhat less than 1 micro second, so that the heating is in the form of a thermal pulse. It will be appreciated that the heater element 1010 is in thermal contact with the ink 1011 in the chamber 1007 so that when the element is heated, this causes the generation of vapor bubbles in the ink. Accordingly, the ink 1011 constitutes a bubble forming liquid.

The bubble 1012, once generated, causes an increase in pressure within the chamber 1007, which in turn causes the ejection of a drop 1016 of the ink 1011 through the nozzle 1003. The rim 1004 assists in directing the drop 1016 as it is ejected, so as to minimize the chance of a drop misdirection.

The reason that there is only one nozzle 1003 and chamber 1007 per inlet passage 1009 is so that the pressure wave generated within the chamber, on heating of the element 1010 and forming of a bubble 1012, does not effect adjacent chambers and their corresponding nozzles.

The increase in pressure within the chamber 1007 not only pushes ink 1011 out through the nozzle 1003, but also pushes some ink back through the inlet passage 1009. However, the inlet passage 1009 is approximately 200 to 300 microns in length, and is only approximately 16 microns in diameter. Hence there is a substantial viscous drag. As a result, the predominant effect of the pressure rise in the chamber 1007 is to force ink out through the nozzle 1003 as an ejected drop 1016, rather than back through the inlet passage 1009.

Figure 39:
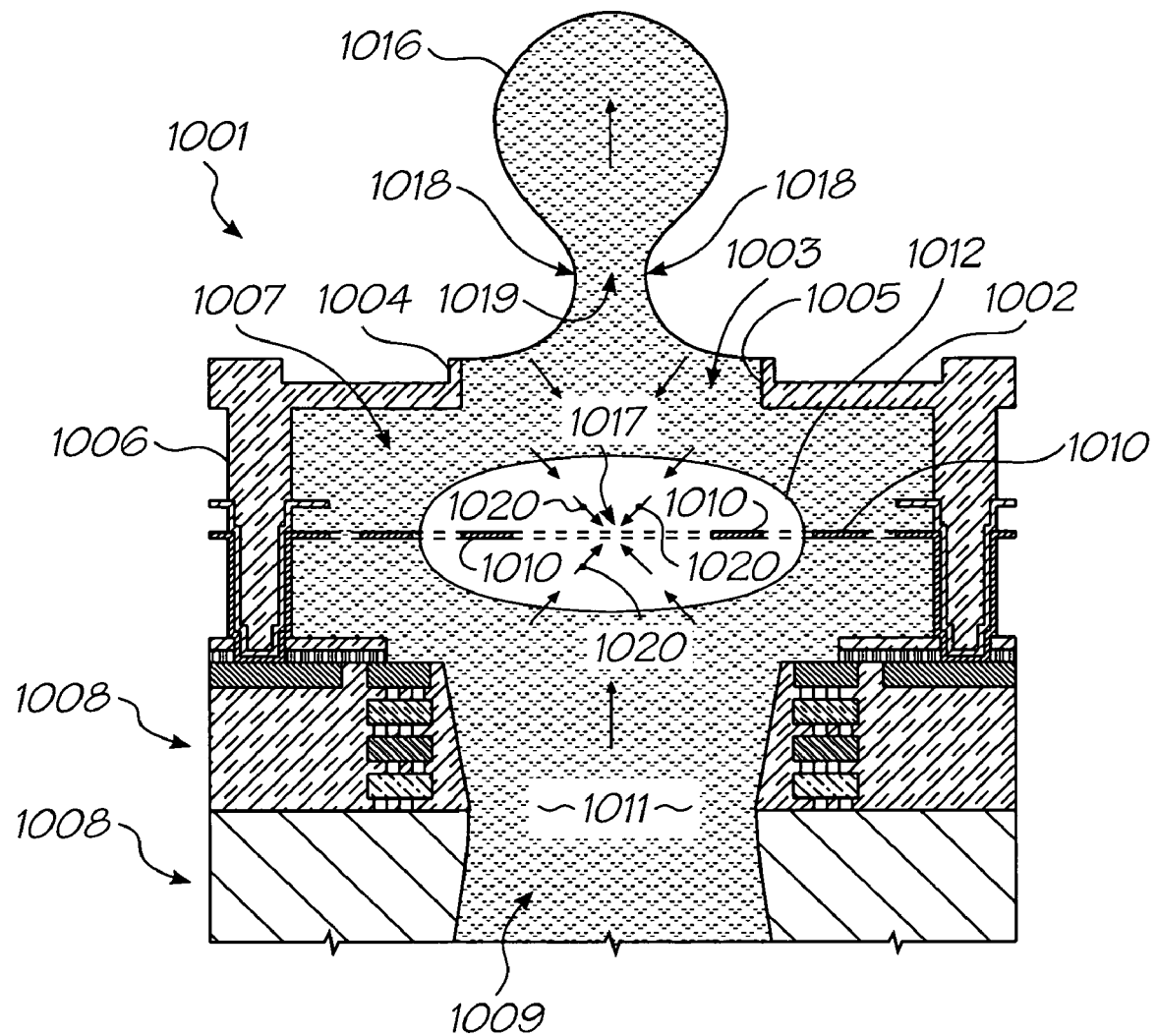
FIG. 39 shows a schematic cross-sectional view through an ink chamber of a single nozzle for injecting ink of a bubble forming heater element actuator type.
Figure 40A:
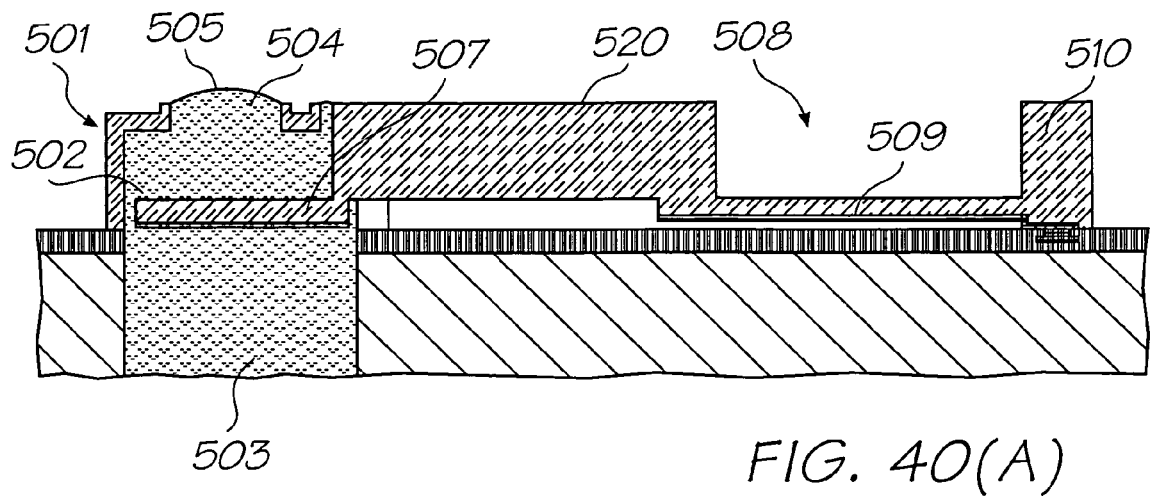
FIGS. 40A to 40C show the basic operational principles of a thermal bend actuator.
Figure 40B:
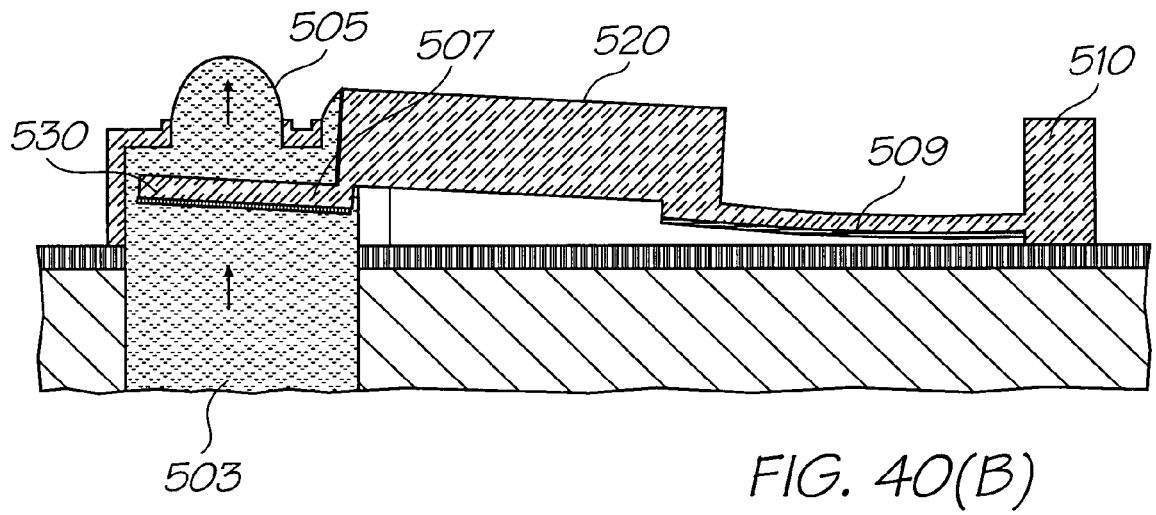
Figure 40C:
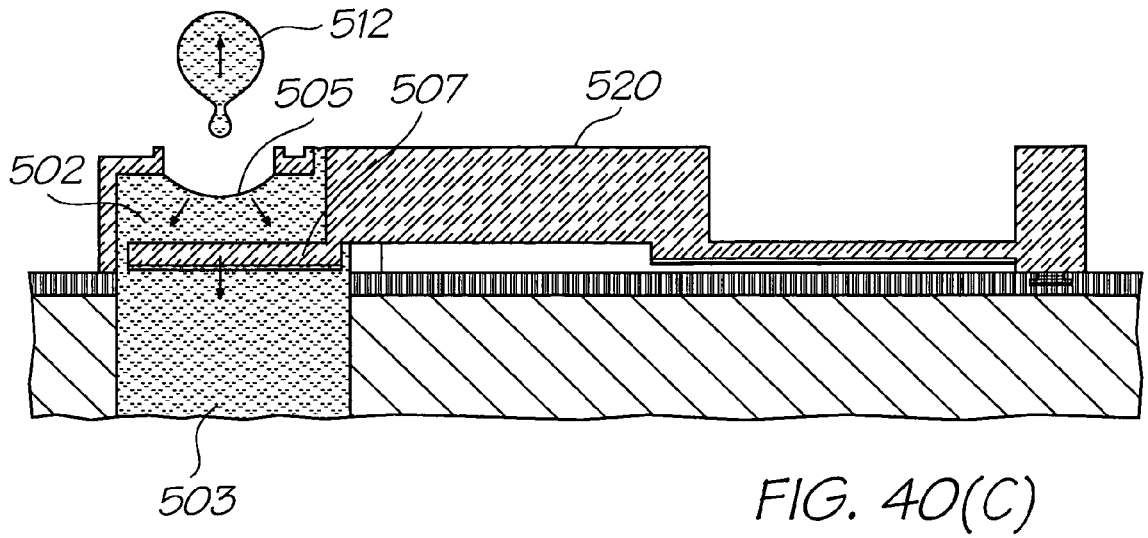
Figure 42:
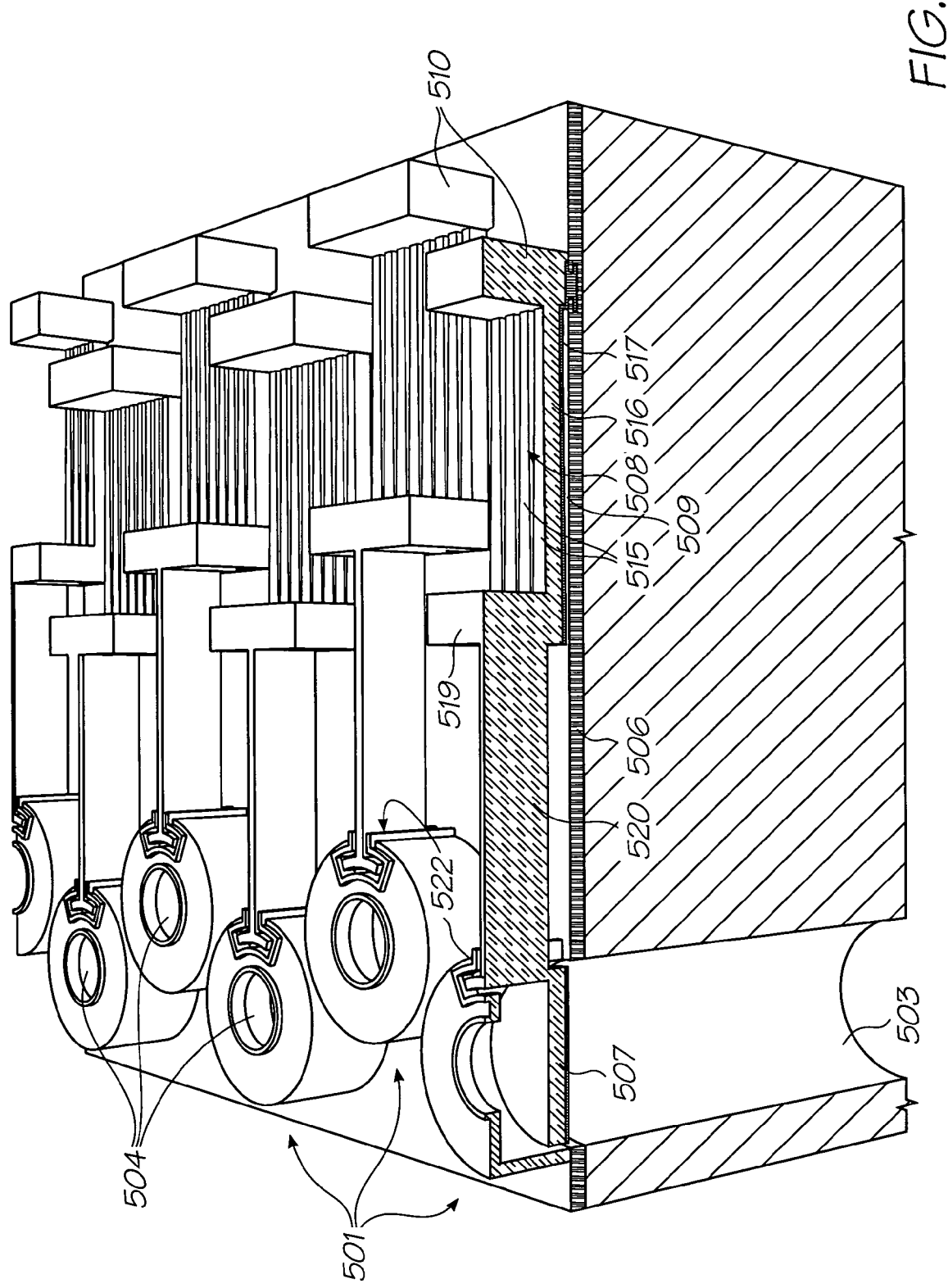
FIG. 42 shows an array of the nozzle arrangements shown in FIG. 41.
Figure 43:
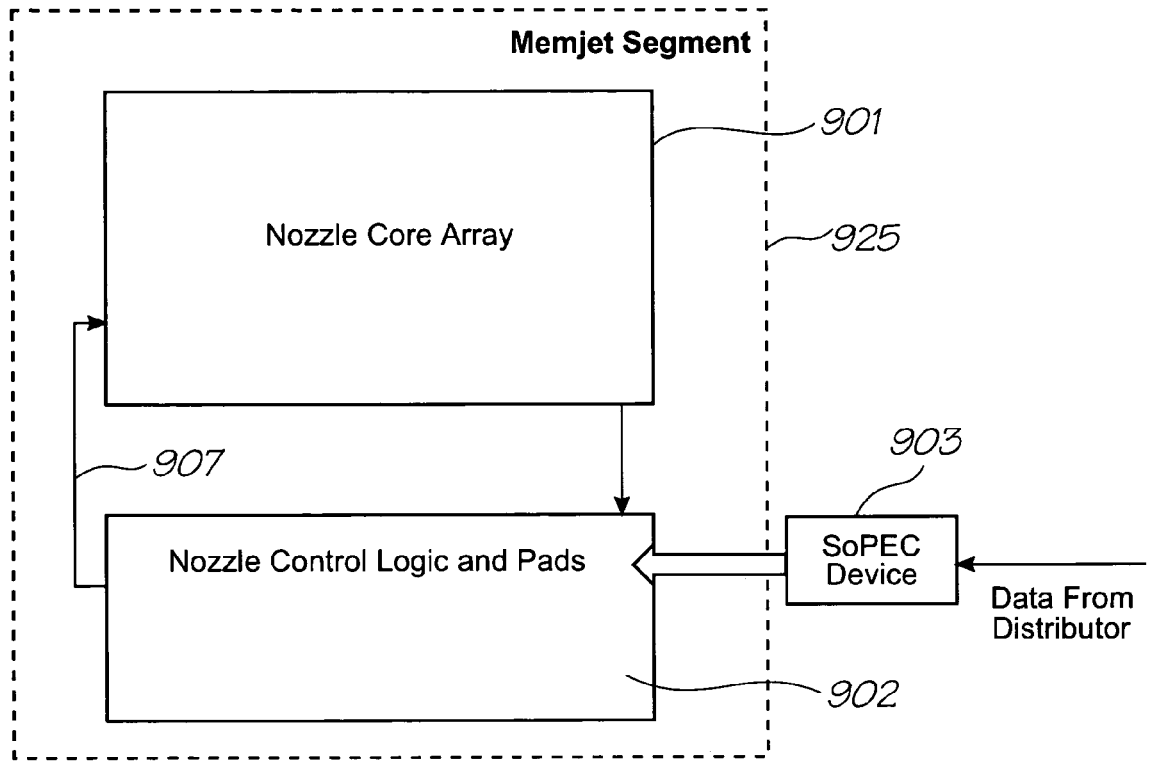
FIG. 43 shows a schematic showing CMOS drive and control blocks for use with the printer of the present invention.
Figure 44:
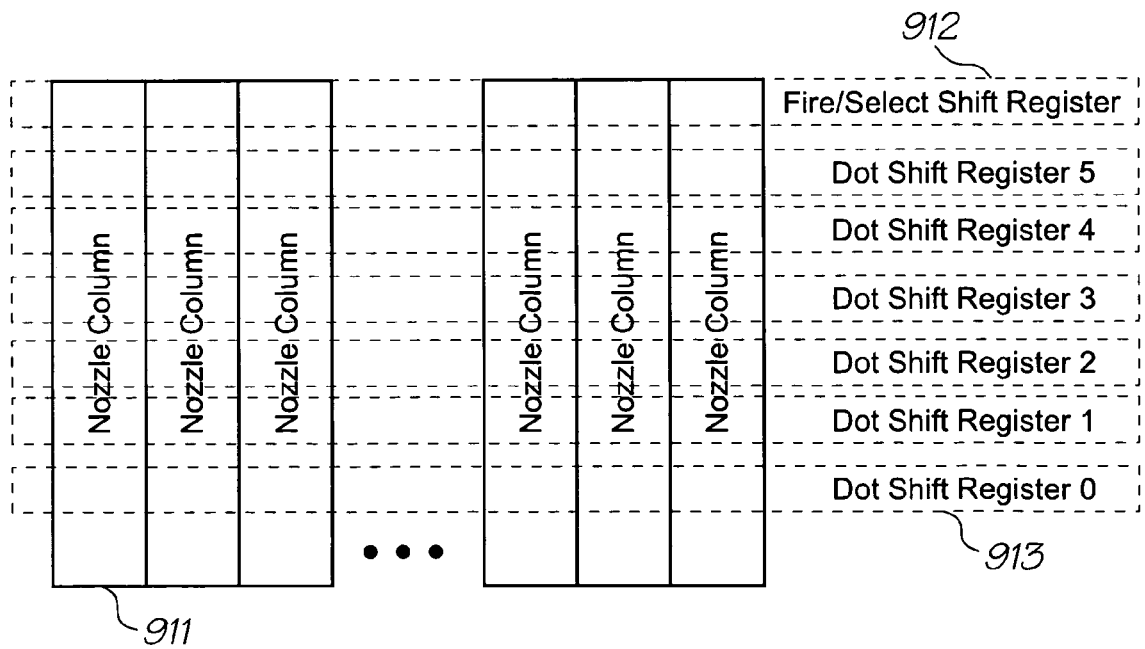
FIG. 44 shows a schematic showing the relationship between nozzle columns and dot shift registers in the CMOS blocks of FIG. 43.
Figure 45:
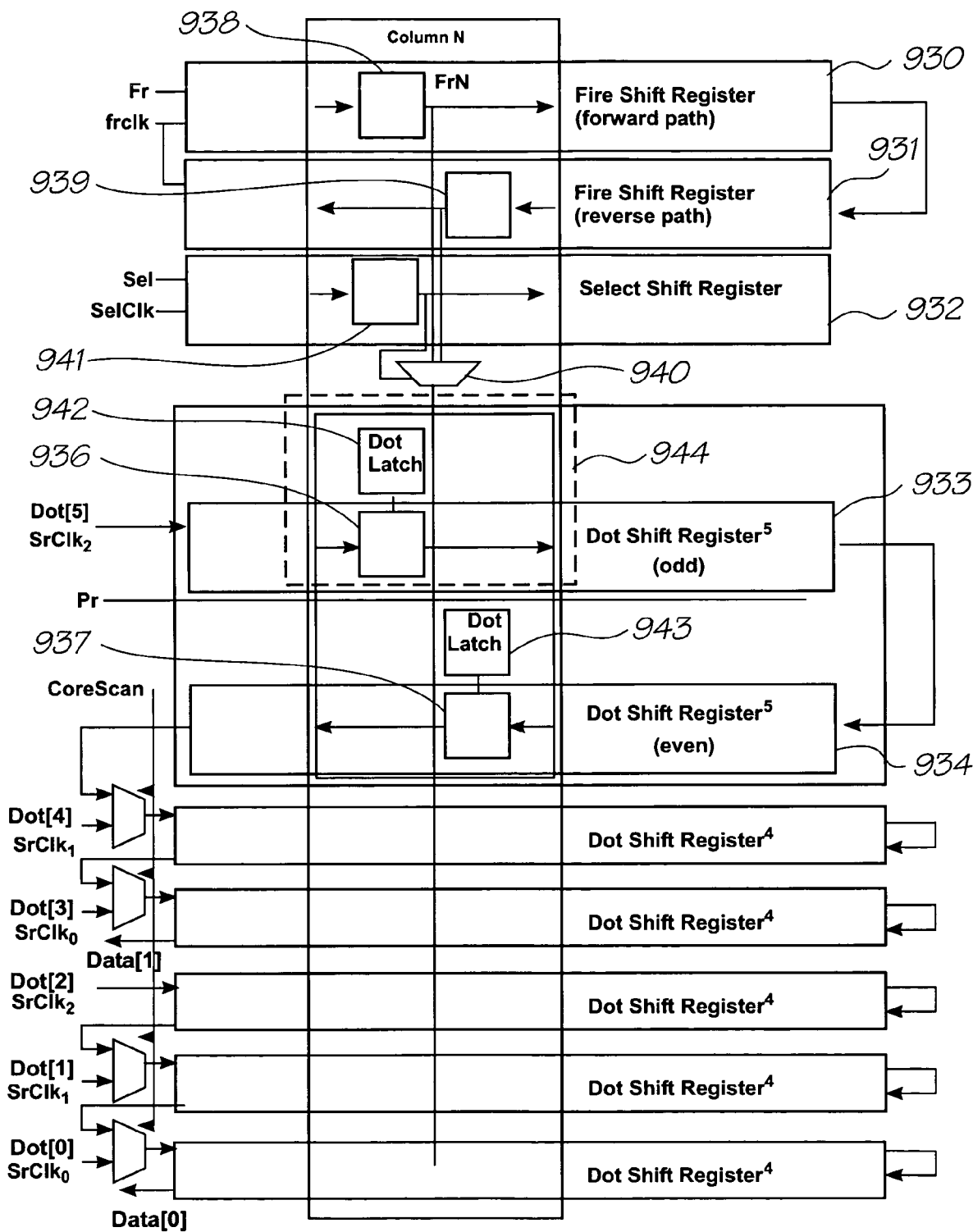
FIG. 45 shows a more detailed schematic showing a unit cell and its relationship to the nozzle columns and dot shift registers of FIG. 44.

As shown in FIG. 39, the ink drop 1016 is being ejected is shown during its "necking phase" before the drop breaks off. At this stage, the bubble 1012 has already reached its maximum size and has then begun to collapse towards the point of collapse 1017.

The collapsing of the bubble 1012 towards the point of collapse 1017 causes some ink 1011 to be drawn from within the nozzle 1003 (from the sides 1018 of the drop), and some to be drawn from the inlet passage 1009, towards the point of collapse. Most of the ink 1011 drawn in this manner is drawn from the nozzle 1003, forming an annular neck 1019 at the base of the drop 1016 prior to its breaking off.

The drop 1016 requires a certain amount of momentum to overcome surface tension forces, in order to break off. As ink 1011 is drawn from the nozzle 1003 by the collapse of the bubble 1012, the diameter of the neck 1019 reduces thereby reducing the amount of total surface tension holding the drop, so that the momentum of the drop as it is ejected out of the nozzle is sufficient to allow the drop to break off.

When the drop 1016 breaks off, cavitation forces are caused as reflected by the arrows 1020, as the bubble 1012 collapses to the point of collapse 1017. It will be noted that there are no solid surfaces in the vicinity of the point of collapse 1017 on which the cavitation can have an effect.

Yet another type of printhead nozzle arrangement suitable for the present invention will now be described with reference to FIGS. 34-36. This type typically provides an ink delivery nozzle arrangement having a nozzle chamber containing ink and a thermal bend actuator connected to a paddle positioned within the chamber. The thermal actuator device is actuated so as to eject ink from the nozzle chamber. The preferred embodiment includes a particular thermal bend actuator which includes a series of tapered portions for providing conductive heating of a conductive trace. The actuator is connected to the paddle via an arm received through a slotted wall of the nozzle chamber. The actuator arm has a mating shape so as to mate substantially with the surfaces of the slot in the nozzle chamber wall.

Figure 34:
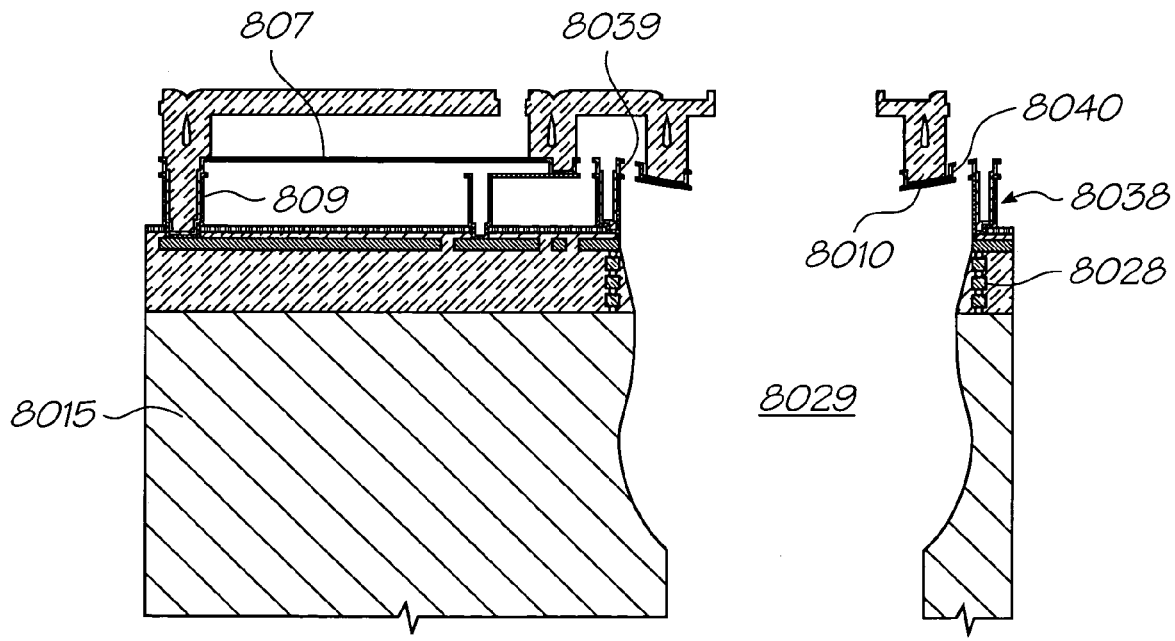
FIG. 34 shows a vertical sectional view of the of the nozzle of FIG. 39.

Turning initially to FIGS. 34(*a*)-(*c*), there is provided schematic illustrations of the basic operation of a nozzle arrangement of this embodiment. A nozzle chamber 501 is provided filled with ink 502 by means of an ink inlet channel 503 which can be etched through a wafer substrate on which the nozzle chamber 501 rests. The nozzle chamber 501 further includes an ink ejection port 504 around which an ink meniscus forms.

Inside the nozzle chamber 501 is a paddle type device 507 which is interconnected to an actuator 508 through a slot in the wall of the nozzle chamber 501. The actuator 508 includes a heater means e.g. 509 located adjacent to an end portion of a post 510. The post 510 is fixed to a substrate.

When it is desired to eject a drop from the nozzle chamber 501, as illustrated in FIG. 34(*b*), the heater means 509 is heated so as to undergo thermal expansion. Preferably, the heater means 509 itself or the other portions of the actuator 508 are built from materials having a high bend efficiency where the bend efficiency is defined as:

$$\text{bend efficiency} = \frac{\text{Young's Modulus} \times (\text{Coefficient of thermal Expansion})}{\text{Density} \times \text{Specific Heat Capacity}}$$

A suitable material for the heater elements is a copper nickel alloy which can be formed so as to bend a glass material.

The heater means 509 is ideally located adjacent the end portion of the post 510 such that the effects of activation are magnified at the paddle end 507 such that small thermal expansions near the post 510 result in large movements of the paddle end.

The heater means 509 and consequential paddle movement causes a general increase in pressure around the ink meniscus 505 which expands, as illustrated in FIG. 34(*b*), in a rapid manner. The heater current is pulsed and ink is ejected out of the port 504 in addition to flowing in from the ink channel 503.

Subsequently, the paddle 507 is deactivated to again return to its quiescent position. The deactivation causes a general reflow of the ink into the nozzle chamber. The forward momentum of the ink outside the nozzle rim and the corresponding backflow results in a general necking and breaking off of the drop 512 which proceeds to the print media. The collapsed meniscus 505 results in a general sucking of ink into the nozzle chamber 502 via the ink flow channel 503. In time, the nozzle chamber 501 is refilled such that the position in FIG. 34(*a*) is again reached and the nozzle chamber is subsequently ready for the ejection of another drop of ink.

FIG. 35 illustrates a side perspective view of the nozzle arrangement. FIG. 36 illustrates sectional view through an array of nozzle arrangement of FIG. 35. In these figures, the numbering of elements previously introduced has been retained.

Firstly, the actuator 508 includes a series of tapered actuator units e.g. 515 which comprise an upper glass portion (amorphous silicon dioxide) 516 formed on top of a titanium nitride layer 517. Alternatively a copper nickel alloy layer (hereinafter called cupronickel) can be utilized which will have a higher bend efficiency.

The titanium nitride layer 517 is in a tapered form and, as such, resistive heating takes place near an end portion of the post 510. Adjacent titanium nitride/glass portions 515 are interconnected at a block portion 519 which also provides a mechanical structural support for the actuator 508.

The heater means 509 ideally includes a plurality of the tapered actuator unit 515 which are elongate and spaced apart such that, upon heating, the bending force exhibited along the axis of the actuator 508 is maximized. Slots are defined between adjacent tapered units 515 and allow for slight differential operation of each actuator 508 with respect to adjacent actuators 508.

The block portion 519 is interconnected to an arm 520. The arm 520 is in turn connected to the paddle 507 inside the nozzle chamber 501 by means of a slot e.g. 522 formed in the side of the nozzle chamber 501. The slot 522 is designed generally to mate with the surfaces of the arm 520 so as to minimize opportunities for the outflow of ink around the arm 520. The ink is held generally within the nozzle chamber 501 via surface tension effects around the slot 522.

When it is desired to actuate the arm 520, a conductive current is passed through the titanium nitride layer 517 within the block portion 519 connecting to a lower CMOS layer 506 which provides the necessary power and control circuitry for the nozzle arrangement. The conductive current results in heating of the nitride layer 517 adjacent to the post 510 which results in a general upward bending of the arm 20 and consequential ejection of ink out of the nozzle 504. The ejected drop is printed on a page in the usual manner for an inkjet printer as previously described.

An array of nozzle arrangements can be formed so as to create a single printhead. For example, in FIG. 36 there is illustrated a partly sectioned various array view which comprises multiple ink ejection nozzle arrangements laid out in interleaved lines so as to form a printhead array. Of course, different types of arrays can be formulated including full color arrays etc.

The construction of the printhead system described can proceed utilizing standard MST techniques through suitable modification of the steps as set out in U.S. Pat. No. 6,243,113 entitled "Image Creation Method and Apparatus (IJ 41)" to the present applicant, the contents of which are fully incorporated by cross reference.

The integrated circuits 74 may be arranged to have between 5000 to 100,000 of the above described ink delivery nozzles arranged along its surface, depending upon the length of the integrated circuits and the desired printing properties required. For example, for narrow media it may be possible to only require 5000 nozzles arranged along the surface of the printhead assembly to achieve a desired printing result, whereas for wider media a minimum of 10,000, 20,000 or 50,000 nozzles may need to be provided along the length of the printhead assembly to achieve the desired printing result. For full colour photo quality images on A4 or US letter sized media at or around 1600 dpi, the integrated circuits 74 may have 13824 nozzles per color. Therefore, in the case where the printhead assembly 22 is capable of printing in 4 colours (C, M, Y, K), the integrated circuits 74 may have around 53396 nozzles disposed along the surface thereof. Further, in a case where the printhead assembly 22 is capable of printing 6 printing fluids (C, M, Y, K, IR and a fixative) this may result in 82944 nozzles being provided on the surface of the integrated circuits 74. In all such arrangements, the electronics supporting each nozzle is the same.

The manner in which the individual ink delivery nozzle arrangements may be controlled within the printhead assembly 22 will now be described with reference to FIGS. 37-46.

FIG. 37 shows an overview of the integrated circuit 74 and its connections to the SoPEC device (discussed above) provided within the control electronics of the print engine 1. As discussed above, integrated circuit 74 includes a nozzle core array 901 containing the repeated logic to fire each nozzle, and nozzle control logic 902 to generate the timing signals to fire the nozzles. The nozzle control logic 902 receives data from the SoPEC device via a high-speed link.

The nozzle control logic 902 is configured to send serial data to the nozzle array core for printing, via a link 907, which may be in the form of an electrical connector. Status and other operational information about the nozzle array core 901 is communicated back to the nozzle control logic 902 via another link 908, which may be also provided on the electrical connector.

The nozzle array core 901 is shown in more detail in FIGS. 38 and 39. In FIG. 38, it will be seen that the nozzle array core 901 comprises an array of nozzle columns 911. The array includes a fire/select shift register 912 and up to 6 color channels, each of which is represented by a corresponding dot shift register 913.

As shown in FIG. 39, the fire/select shift register 912 includes forward path fire shift register 930, a reverse path fire shift register 931 and a select shift register 932. Each dot shift register 913 includes an odd dot shift register 933 and an even dot shift register 934. The odd and even dot shift registers 933 and 934 are connected at one end such that data is clocked through the odd shift register 933 in one direction, then through the even shift register 934 in the reverse direction. The output of all but the final even dot shift register is fed to one input of a multiplexer 935. This input of the multiplexer is selected by a signal (corescan) during post-production testing. In normal operation, the corescan signal selects dot data input Dot[x] supplied to the other input of the multiplexer 935. This causes Dot[x] for each color to be supplied to the respective dot shift registers 913.

A single column N will now be described with reference to FIG. 46. In the embodiment shown, the column N includes 12 data values, comprising an odd data value 936 and an even data value 937 for each of the six dot shift registers. Column N also includes an odd fire value 938 from the forward fire shift register 930 and an even fire value 939 from the reverse fire shift register 931, which are supplied as inputs to a multiplexer 940. The output of the multiplexer 940 is controlled by the select value 941 in the select shift register 932. When the select value is zero, the odd fire value is output, and when the select value is one, the even fire value is output.

Each of the odd and even data values 936 and 937 is provided as an input to corresponding odd and even dot latches 942 and 943 respectively.

Each dot latch and its associated data value form a unit cell, such as unit cell 944. A unit cell is shown in more detail in FIG. 46. The dot latch 942 is a D-type flip-flop that accepts the output of the data value 936, which is held by a D-type flip-flop 944 forming an element of the odd dot shift register 933. The data input to the flip-flop 944 is provided from the output of a previous element in the odd dot shift register (unless the element under consideration is the first element in the shift register, in which case its input is the Dot[x] value). Data is clocked from the output of flip-flop 944 into latch 942 upon receipt of a negative pulse provided on LsyncL.

The output of latch 942 is provided as one of the inputs to a three-input AND gate 945. Other inputs to the AND gate 945 are the Fr signal (from the output of multiplexer 940) and a pulse profile signal Pr. The firing time of a nozzle is controlled by the pulse profile signal Pr, and can be, for example, lengthened to take into account a low voltage condition that arises due to low power supply (in a removable power supply embodiment). This is to ensure that a relatively consistent amount of ink is efficiently ejected from each nozzle as it is fired. In the embodiment described, the profile signal Pr is the same for each dot shift register, which provides a balance between complexity, cost and performance. However, in other embodiments, the Pr signal can be applied globally (ie, is the same for all nozzles), or can be individually tailored to each unit cell or even to each nozzle.

Once the data is loaded into the latch 942, the fire enable Fr and pulse profile Pr signals are applied to the AND gate 945, combining to the trigger the nozzle to eject a dot of ink for each latch 942 that contains a logic 1.

The signals for each nozzle channel are summarized in the following table:

| Name | Direction | Description |
|---|---|---|
| D | Input | Input dot pattern to shift register bit |
| Q | Output | Output dot pattern from shift register bit |
| SrClk | Input | Shift register clock in - d is captured on rising edge of this clock |

-continued

| Name | Direction | Description |
|---|---|---|
| LsyncL | Input | Fire enable - needs to be asserted for nozzle to fire |
| Pr | Input | Profile - needs to be asserted for nozzle to fire |

Figure 46:
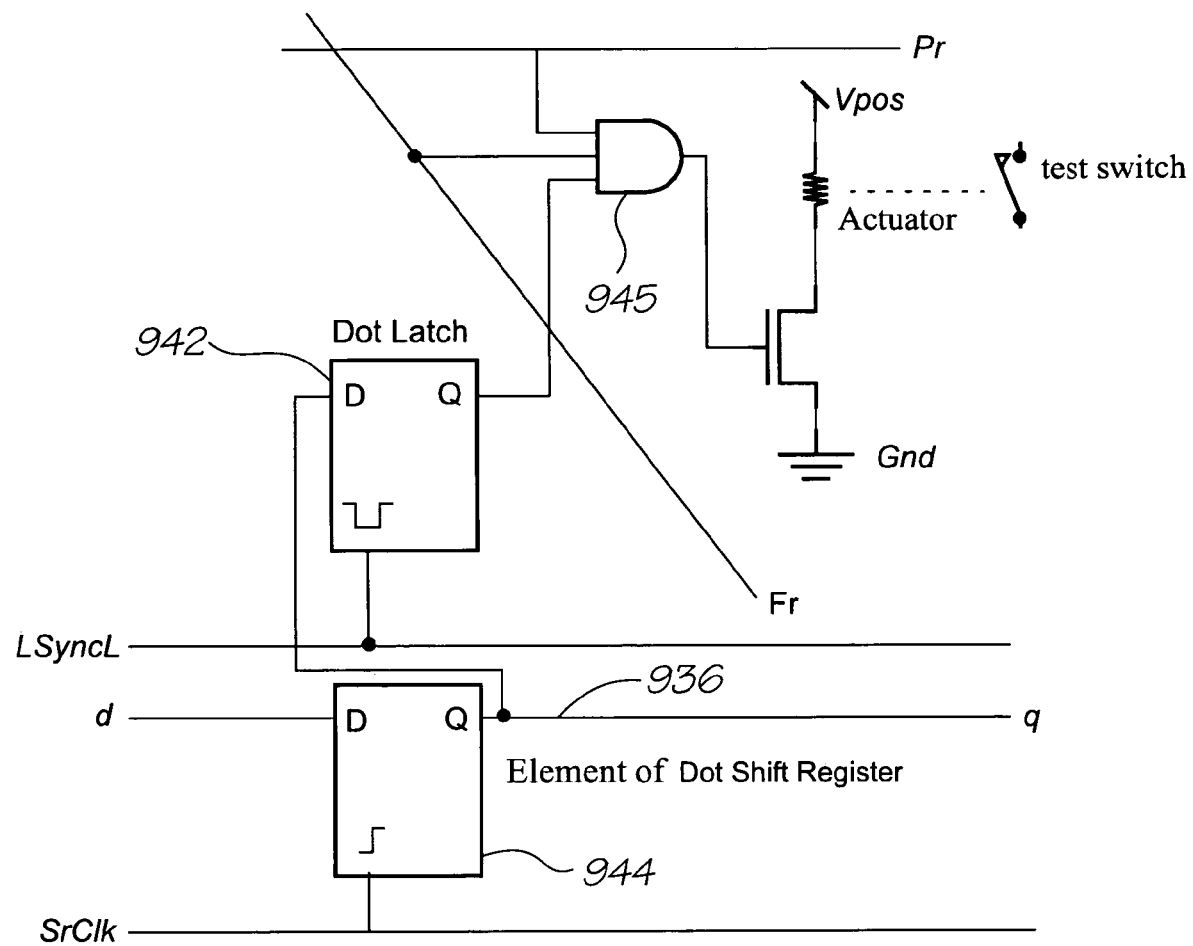
FIG. 46 shows a circuit diagram showing logic for a single printer nozzle in the printer of the present invention.

As shown in FIG. 46, the fire signals Fr are routed on a diagonal, to enable firing of one color in the current column, the next color in the following column, and so on. This averages the current demand by spreading it over 6 columns in time-delayed fashion.

The dot latches and the latches forming the various shift registers are fully static in this embodiment, and are CMOS-based. The design and construction of latches is well known to those skilled in the art of integrated circuit engineering and design, and so will not be described in detail in this document.

The nozzle speed may be as much as 20 kHz for the printer unit 2 capable of printing at about 60 ppm, and even more for higher speeds. At this range of nozzle speeds the amount of ink than can be ejected by the entire printhead assembly 22 is at least 50 million drops per second. However, as the number of nozzles is increased to provide for higher-speed and higher-quality printing at least 100 million drops per second, preferably at least 500 million drops per second and more preferably at least 1 billion drops per second may be delivered. At such speeds, the drops of ink are ejected by the nozzles with a maximum drop ejection energy of about 250 nanojoules per drop.

Consequently, in order to accommodate printing at these speeds, the control electronics must be able to determine whether a nozzle is to eject a drop of ink at an equivalent rate. In this regard, in some instances the control electronics must be able to determine whether a nozzle ejects a drop of ink at a rate of at least 50 million determinations per second. This may increase to at least 100 million determinations per second or at least 500 million determinations per second, and in many cases at least 1 billion determinations per second for the higher-speed, higher-quality printing applications.

For the printer unit 2 of the present invention, the above-described ranges of the number of nozzles provided on the printhead assembly 22 together with the nozzle firing speeds and print speeds results in an area print speed of at least 50 cm$^2$ per second, and depending on the printing speed, at least 100 cm$^2$ per second, preferably at least 200 cm$^2$ per second, and more preferably at least 500 cm$^2$ per second at the higher-speeds. Such an arrangement provides a printer unit 2 that is capable of printing an area of media at speeds not previously attainable with conventional printer units.

Maintenance Assembly

The maintenance assembly 23 is shown in detail in FIGS. 47-50, and as previously shown in FIG. 8, it is mounted between the posts 26 of the main body 20, so as to be positioned adjacent the printhead assembly 22.

The maintenance assembly 23 generally consists of a maintenance chassis 88 which receives the various components of the assembly therein. The maintenance chassis 88 is in the form of an open ended channel having a pair of upwardly extending tongue portions 89 at its ends which are shaped to fit over the posts 26 of the main body 20 and engage with the retaining projections provided thereon to secure the maintenance assembly 23 in position. The maintenance chassis 88 is made from a suitable metal material, having rigidity and resilience, such as a pressed steel plate.

Figure 49:
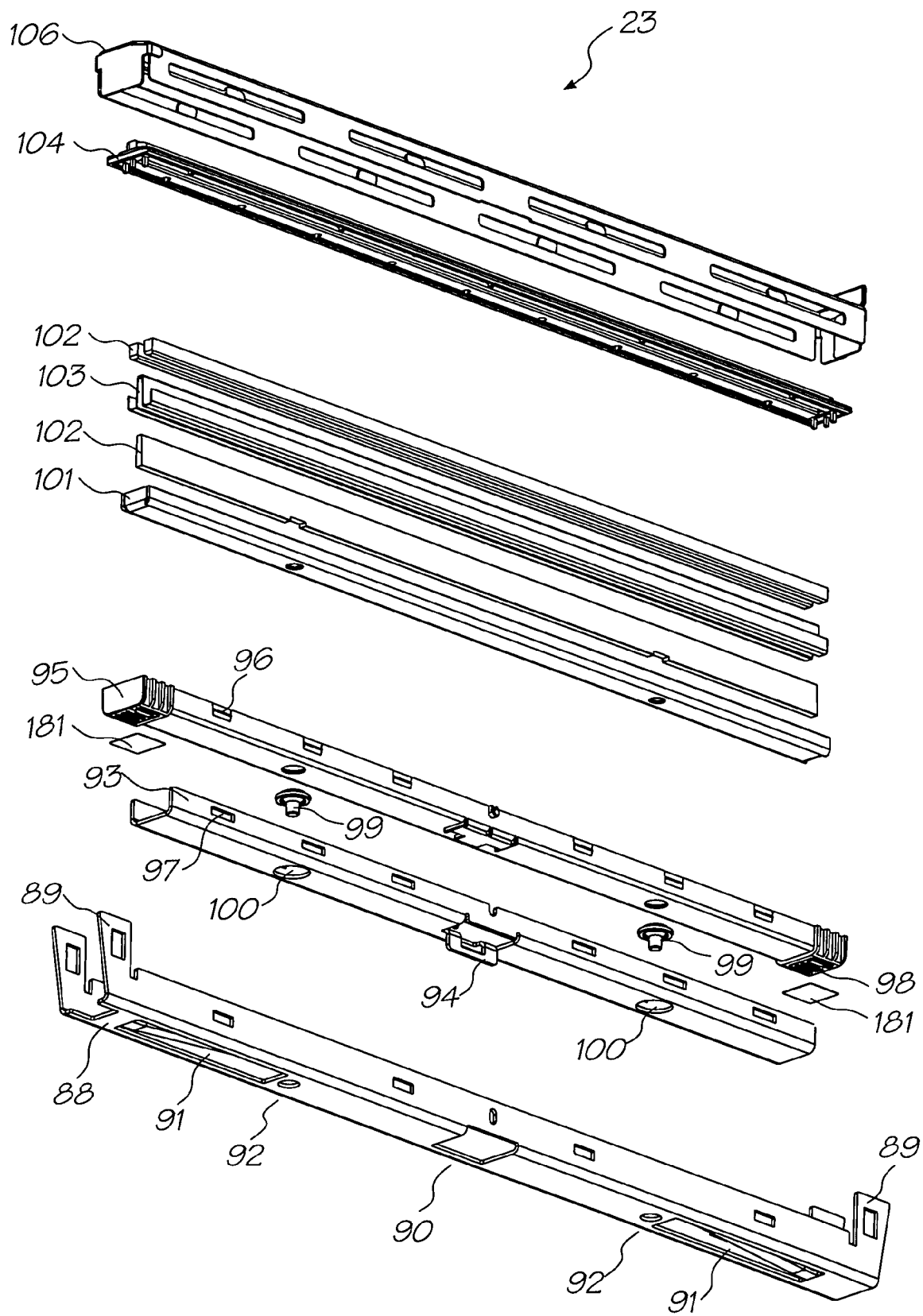
FIG. 49 shows an exploded front perspective view of the underside of the maintenance assembly of FIG. 47.

The base of the maintenance chassis 88 is shown more clearly in FIG. 49 and includes a centrally located removed portion 90, window portions 92 and spring arms 91 extending from either side of the window portions 92. The integral spring arms 91 are angled internally of the chassis 88 and formed by pressing the sheet metal of the chassis. Of course the spring arms 91 could equally be a separate insert placed into the open channel of the chassis 88.

A rigid insert 93 is provided to fit within the chassis 88 to provide added rigidity to the maintenance assembly 23. A catch element 94 projects from the base of the rigid insert and extends into the centrally located removed portion 90 of the chassis 88 when the rigid insert 93 is located within the chassis 88. The catch element 94 is provided to move the maintenance assembly between a capped and an uncapped state, as will be described below. A lower maintenance molding 95 is located within the insert 93 and retained within the insert via engagement of a number of lugs 96 formed along the sides of the lower maintenance molding 95 with corresponding slots 97 provided along the sides of the insert 93. The lower maintenance molding 95 is made from a suitable plastic material and forms a body having closed ends and an open top. The ends of the lower maintenance molding 93 are provided with air vents 98. Air from the vents 98 flows through filters 181 to ventilate the maintenance assembly.

Two pin elements 99 extend from the base of the lower maintenance molding 95. The pin elements 99 are connected to the base via a flexible web, such as rubber, to allow multi-directional relative movement of the pin elements 99 with respect to the base of the lower maintenance molding. The pin elements 99 pass through two circular openings 100 in the base of the rigid insert 93 and into the window portions 92 of the maintenance chassis 88.

A retainer insert 101 is supported on the pin elements 99 within the lower maintenance molding 95. The retainer insert 101 is coated steel and provides rigid support for the strips of absorbent media 102 retained therein. The absorbent media 102 is a generally an inverted T-shaped assembly of separate portions—a thin vertical portion which extends upwardly from between two substantially horizontal portions. The absorbent media 102 may be made from any type of material capable of absorbing and retaining ink such as urethane foam or the like.

A microfibre fabric 103 fits over the thin vertical portion, around the two horizontal portions, and then attaches to the retainer insert 101 to retain the absorbent media 102. The microfibre fabric 103 draws into the absorbent media 102.

An upper maintenance molding 104 fits over the lower maintenance molding 95 to enclose the microfibre fabric 103, absorbent media 102 and retainer insert 101 therebetween. The upper maintenance molding 104 is attached along its bottom surface to the surface of the lower maintenance molding 95 via an appropriate adhesive. An upwardly projecting rim portion 105 extends beyond the thin vertical portion of the absorbent media 102 covered with microfibre fabric 103. The rim portion 105 defines an open perimeter seal for sealing the nozzles of the printhead assembly 22 when the upper maintenance molding 104 is brought into capping contact with the printhead assembly.

In this arrangement, the upper maintenance molding 104, microfibre fabric 103, absorbent media 102, retainer insert 101, lower maintenance molding 95 and the rigid insert 93 form a capping unit which is adapted to fit within the maintenance chassis 88 and is supported on the spring arms thereof. Within this unit, the microfibre fabric 103, absorbent media 102 and the retainer insert 101 form a sub-unit supported on the pin elements 99 and movable within the space defined by the lower maintenance molding 95 and the upper maintenance molding 104.

Figure 47:
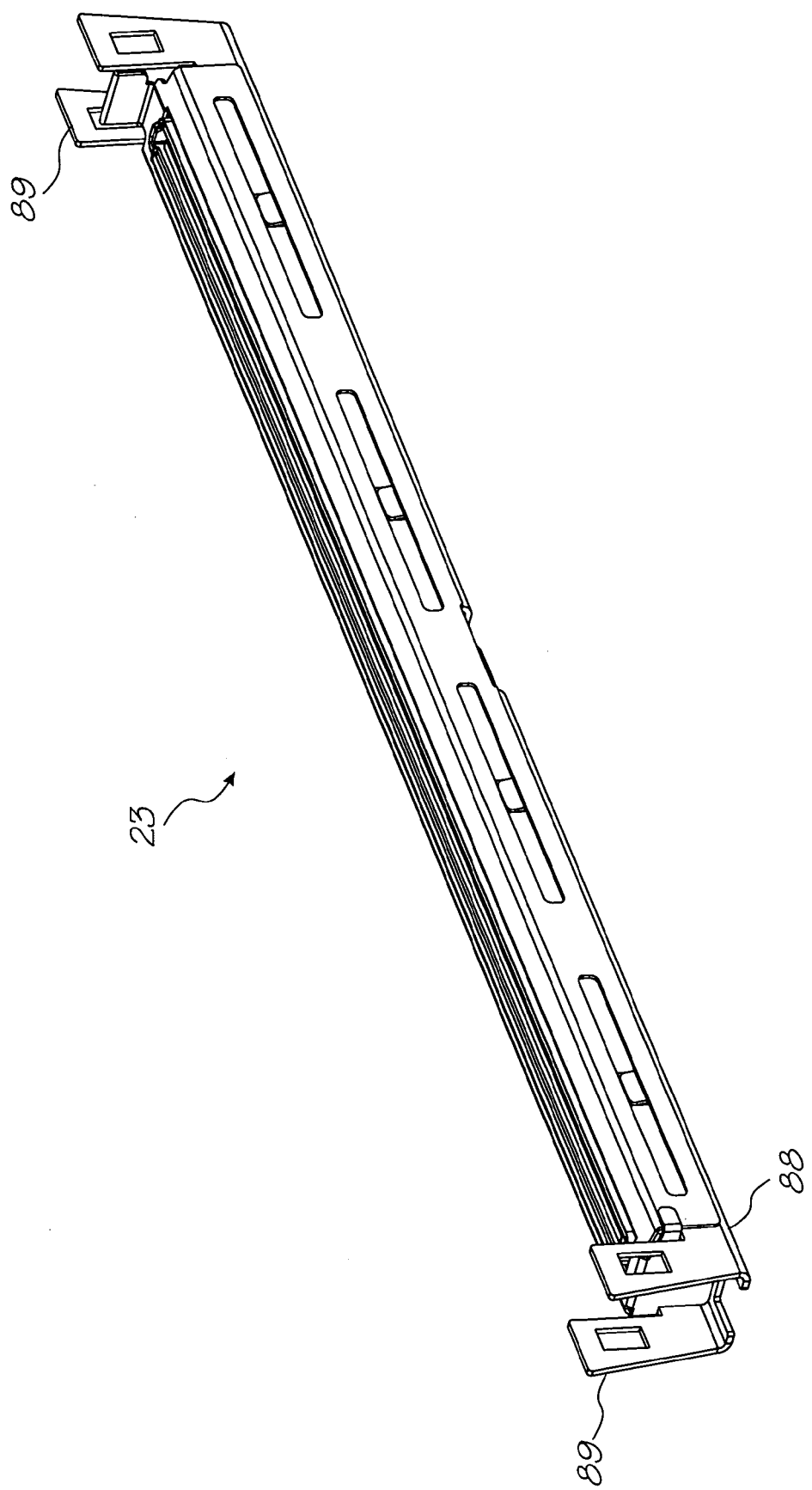
FIG. 47 shows a front perspective view of the maintenance assembly of the cartridge unit shown in FIG. 9.
Figure 48:
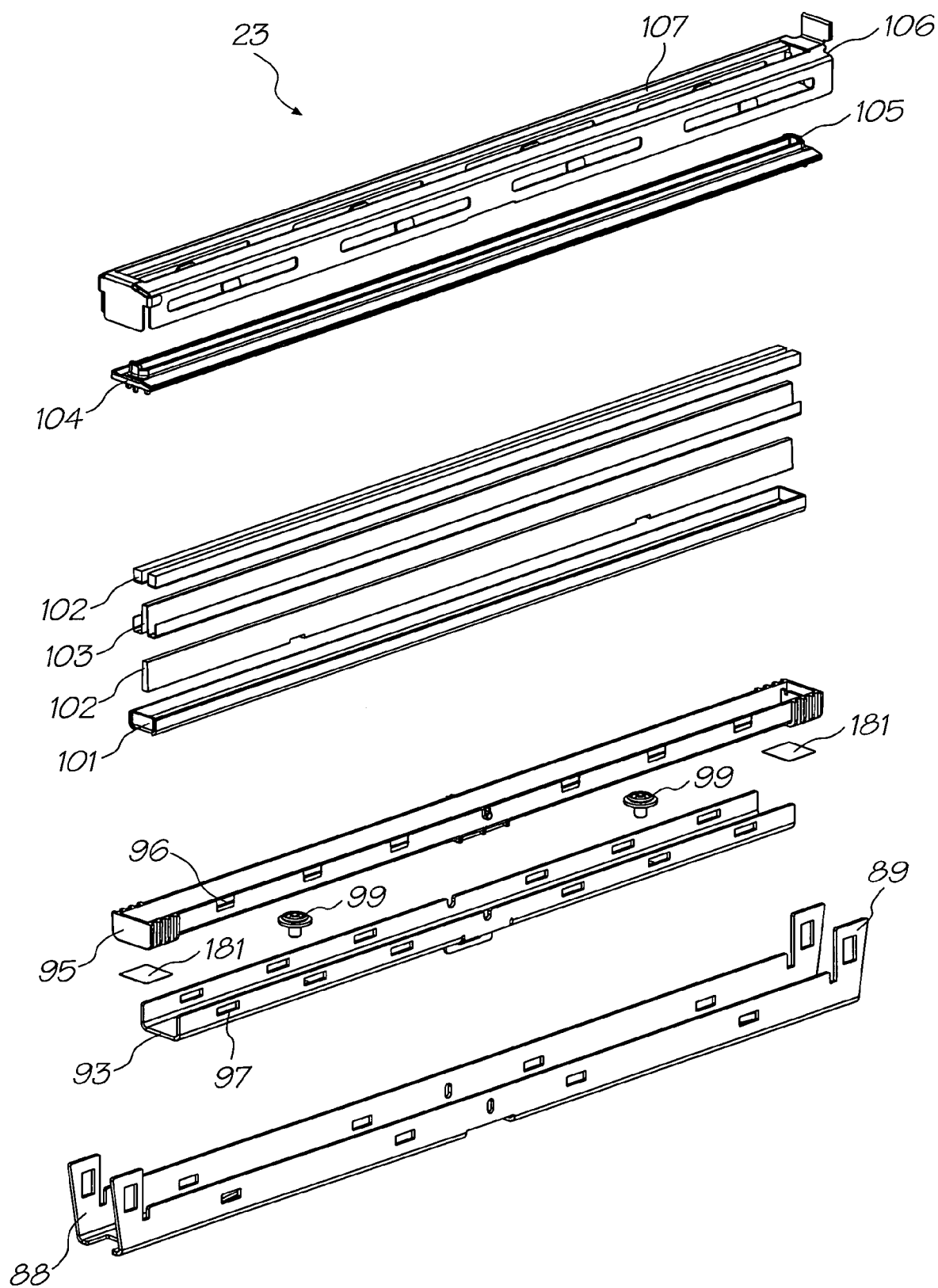
FIG. 48 shows an exploded front perspective view of the maintenance assembly of FIG. 47.

As shown in FIG. 47, the capping unit is held in place with a retainer element 106 that fits over the upper maintenance molding 104 and secures to the chassis 88. The retainer element 106 is essentially in the form of an open ended channel having a slot 107 formed along the upper surface thereof, through which the rim portion 105 of the upper maintenance molding 104 can protrude and cappingly engage with the printhead assembly 22. The upper surface of the retainer element 106 is curved and acts as a media guide during printing.

When assembled in this manner, the components of the maintenance assembly 23 are contained within the retainer element 106 and the chassis 88, such that both the upper maintenance molding 104 can move with respect to the retainer element 106 to cap the printhead assembly 22, and the microfibre fabric 103 and absorbent media 102 can move with respect to the upper maintenance molding to contact and wipe the surface of the nozzles of the printhead assembly 22.

Figure 50:
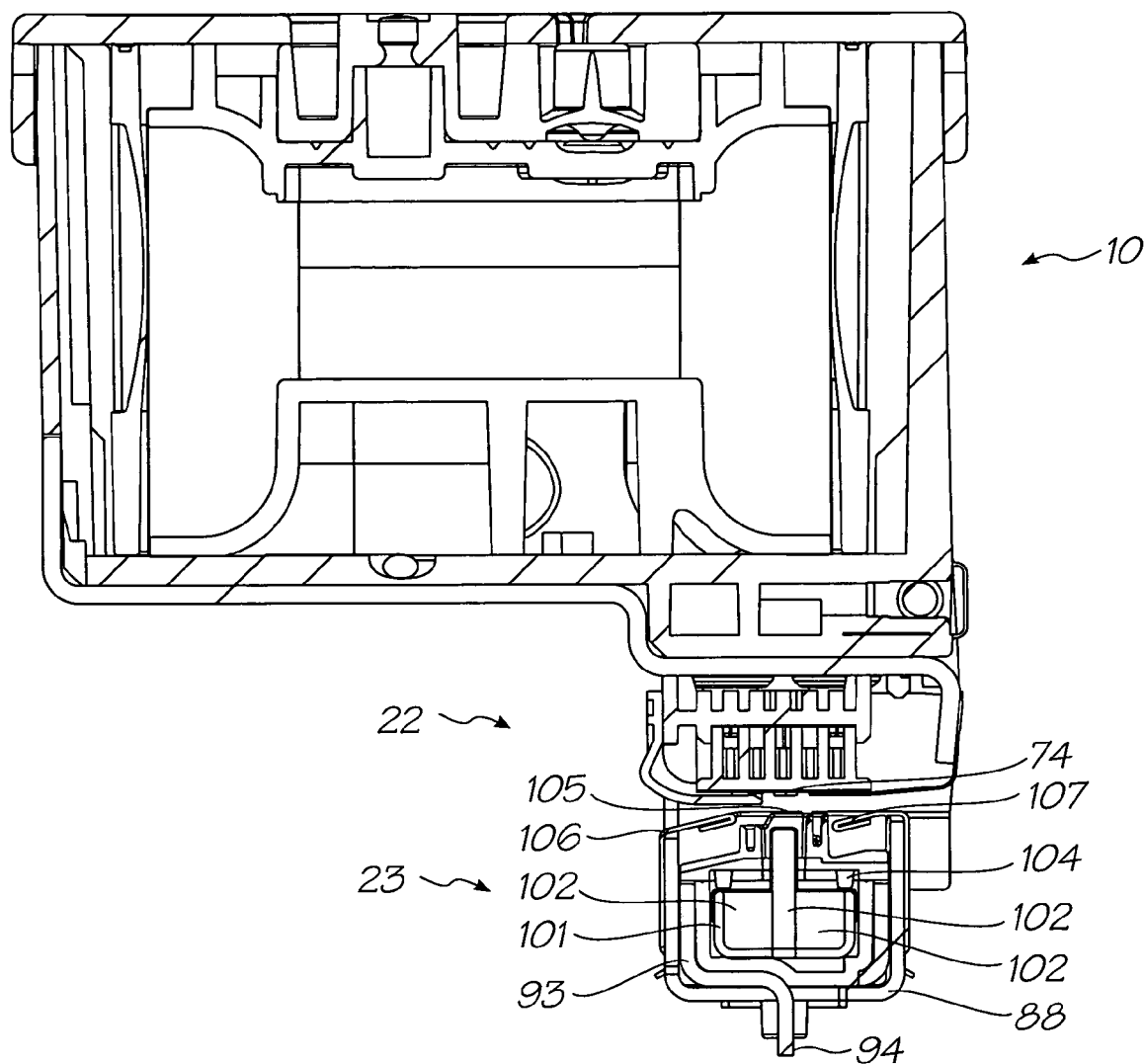
FIG. 50 shows a sectional view of the maintenance assembly operationally mounted to the cartridge unit of the present invention in a capped state.

Upon assembly and attachment of the maintenance assembly 23 to the posts 26 of the main body 20, the catch element 94 of the rigid insert extends from the central removed portion 90 of the chassis 88. Due to the action of the spring arms 91, the maintenance unit 23 (as previously defined) is raised from the base of the chassis 88 such that the rim portion 105 of the upper maintenance molding 104 extends through the slot 107 of the retainer element 106 and is in capping contact with the printhead assembly 22. This state is shown in FIG. 50 and is referred to as the capping state, whereby the nozzles of the printhead are sealed in an almost closed environment within the rim portion 105 and are less likely to dry out and clog with ink. The environment is almost closed and not fully closed, so that the maintenance assembly is not prevented from moving to the uncapped state because of a mild vacuum created within the rim 105.

To remove any paper dust or other particulate matter present in the vicinity of the nozzles of the printhead assembly 22, the surface of the printhead may be wiped by the microfibre fabric 103. To perform this, a wiper actuator present in the cradle unit extends into the window portions 92 of the chassis 88 and contacts the pin elements 99 provided in the base of the lower maintenance molding 95. Any upward force provided by the wiper actuator on the pins 99 causes them to project further against the retainer insert 101, thereby causing the vertical portion of the absorbent media 102, which is coated with the microfibre fabric 103, to extend into and beyond the rim portion 105 of the upper maintenance molding 104, until it contacts the surface of the printhead assembly 22 proximal the nozzles. The presence of the microfibre fabric 103 ensures that contact is minimised and attracts any ink or moisture present on the surface of the printhead assembly 22 to be retained within the absorbent media 102. As the pins 99 are free to move in any direction, any lateral motion of the wiper actuator will cause the microfibre fabric 103 to move laterally across the surface of the nozzles hence performing a wiping or cleaning function. Removal of the wiper actuator will then cause the arrangement to return to a position whereby the microfibre fabric 103 and the absorbent media 102 are below the surface of the rim portion 105.

In order to perform printing, the maintenance assembly 23 must be moved from the capping state to a printing state. This is achieved by a maintenance actuator gripping the catch element 94 projecting through the central removed portion 90 of the chassis 88 and applying a downward force thereto. This downward force causes the rigid insert 93 to move against the spring arms 91 of the chassis 88, towards the base of the chassis. This movement causes the upper rim portion 105 of the upper capping molding 104 to retract into the slot 107 formed in the retainer element 106 such that it is flush with the outer surface of the retainer element 106 and does not protrude therefrom. It will be appreciated that the retainer element 106 does not move and is fixed in position. This creates a gap between the retainer element 106 and the printhead assembly 22 through which the media can pass for printing. In the printing or uncapped state, the retainer element 106 acts as a media guide and the media contacts the retainer element and is supported on the surface of the retainer element 106 as it passes the printhead assembly for printing.

Cradle Unit

The cradle unit 12 is shown in relation to FIGS. 6 and 7 and generally consists of a main body 13 which defines an opening 14 for receiving the cartridge unit 10, and a cover assembly 11 adapted to close the opening to secure the cartridge unit 10 in place within the cradle unit 12.

Figure 51A:
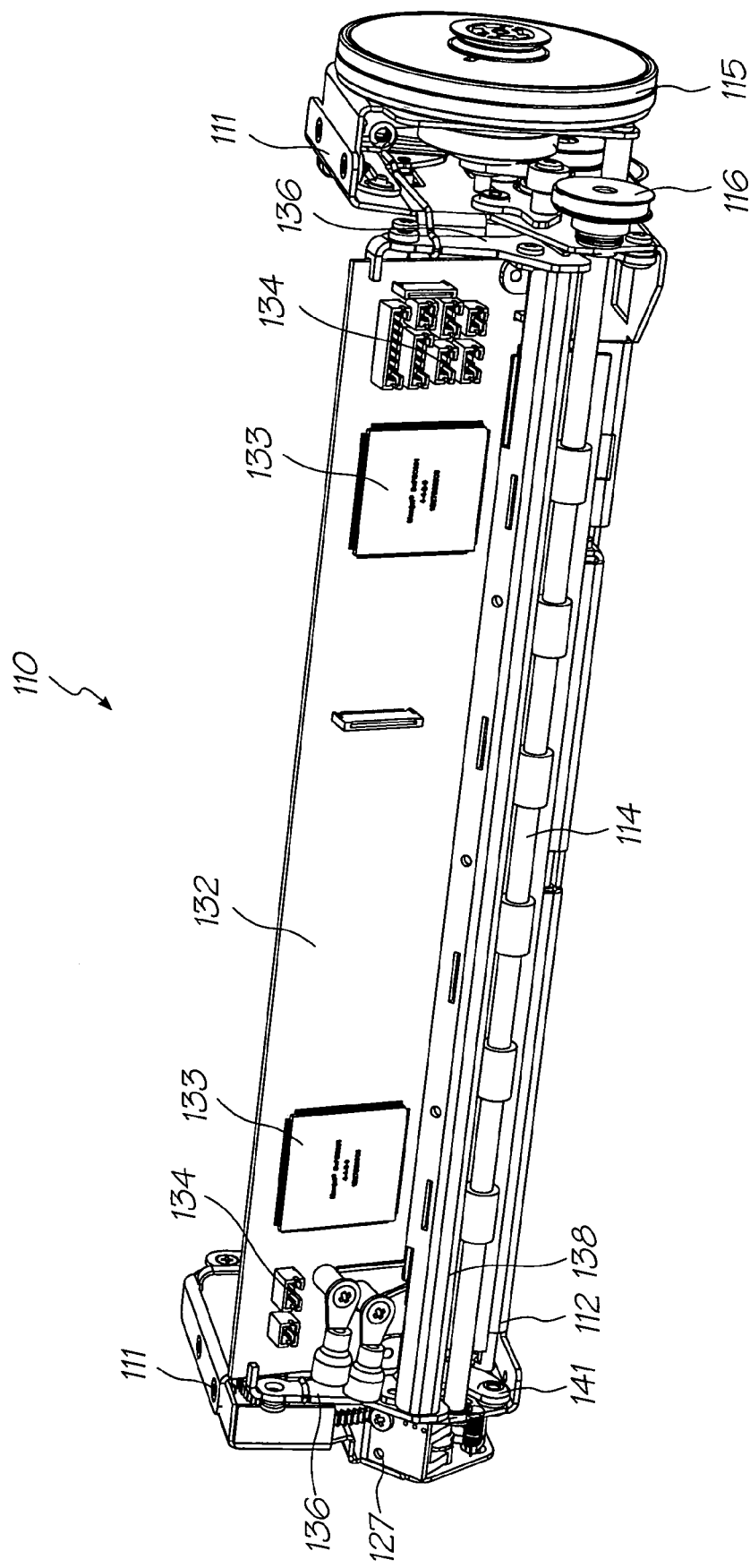
FIGS. 51A and 51B show front and rear perspective views of the frame structure of the cradle unit according to one embodiment of the present invention.
Figure 51B:
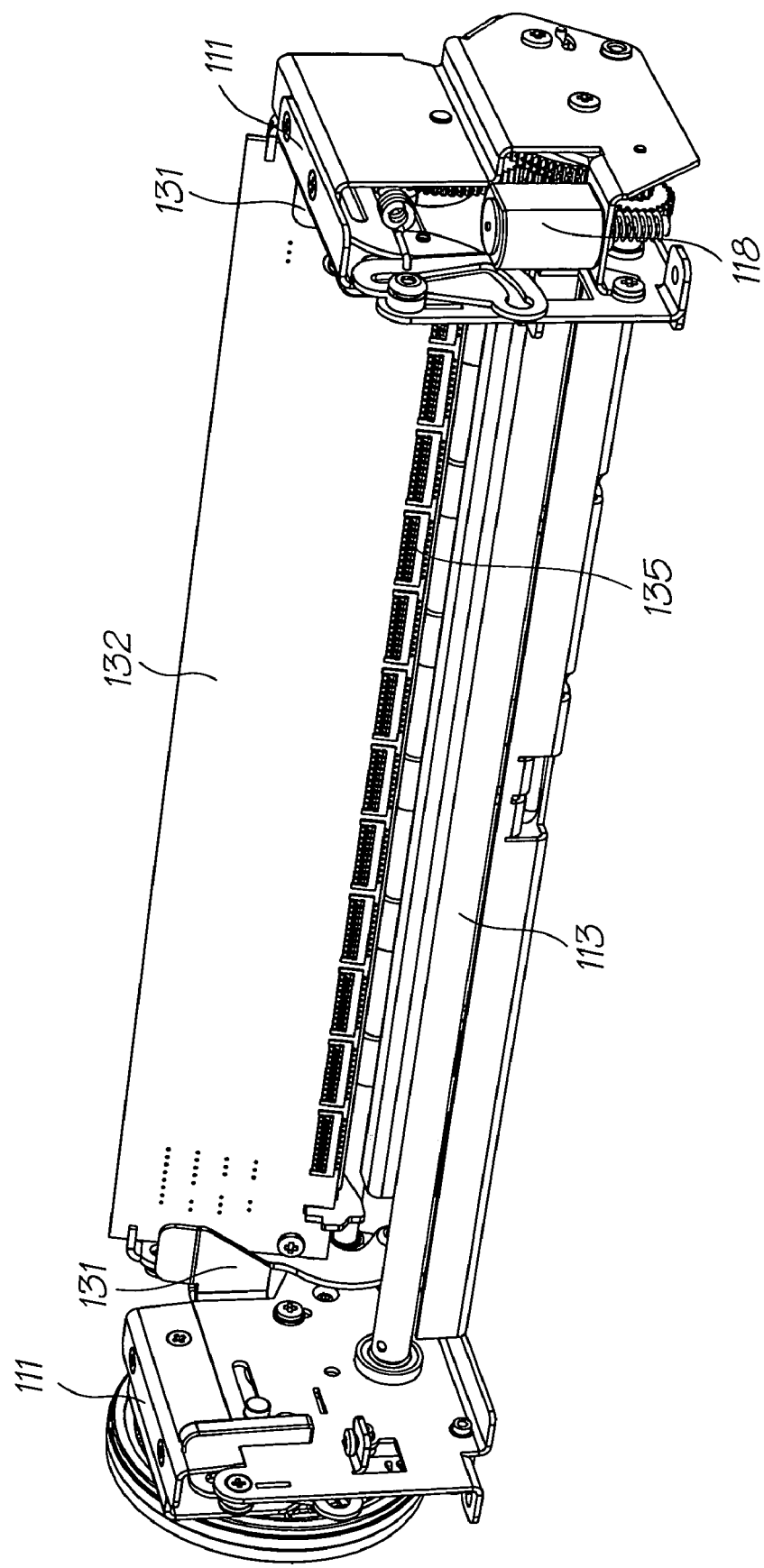

The main body 13 of the cradle unit 12 includes a frame structure 110 as shown in FIGS. 51A and 51B. The frame structure 110 generally comprises two end plates 111 and a base plate 112 connecting each of the end plates 111. A drive roller 113 and an exit roller 114 are mounted between the end plates 111 at opposing ends thereof, such that when the cartridge unit 10 is retained within the main body 13, it sets between the drive roller 113 and exit roller 114. The drive roller 113 and the exit roller 114 are each driven by a brushless DC motor 115 which is mounted to one of the end plates 111 and drives each of the drive and exit rollers via a drive mechanism 116, such as a drive belt. Such a system ensures that both the drive roller 113 and the exit roller 114 are driven at the same speed to ensure a smooth and consistent passage of the media through the print engine 1 and past the printhead assembly 22 of the cartridge unit 10.

A maintenance drive assembly 117 is mounted to the other end plate 111, opposite the DC motor 107. The maintenance drive assembly 117 comprises a motor 118 which is operatively connected to a maintenance gear 119 and a wiper gear 120. The maintenance gear 119 is in turn connected to a maintenance actuator 121 which is in the form of a rod having a hooked end that extends a distance within the base plate 112. The hooked end of the maintenance actuator 121 is shaped to be received within the catch element 94 of the maintenance assembly 23 so as to raise/lower the upper rim portion 105 between the capping state and the printing state. The wiper gear 120 is similarly connected to a wiper actuator 122 in the form of a rod having a pair of projections extending therefrom. The wiper actuator 122 similarly extends within the base plate 112, and the projections are positioned along the wiper actuator 122 so that they are aligned with the window portions 92 formed in the base of the maintenance chassis 88 so as to contact the pin elements 99 of the maintenance assembly 23.

Figure 52A:
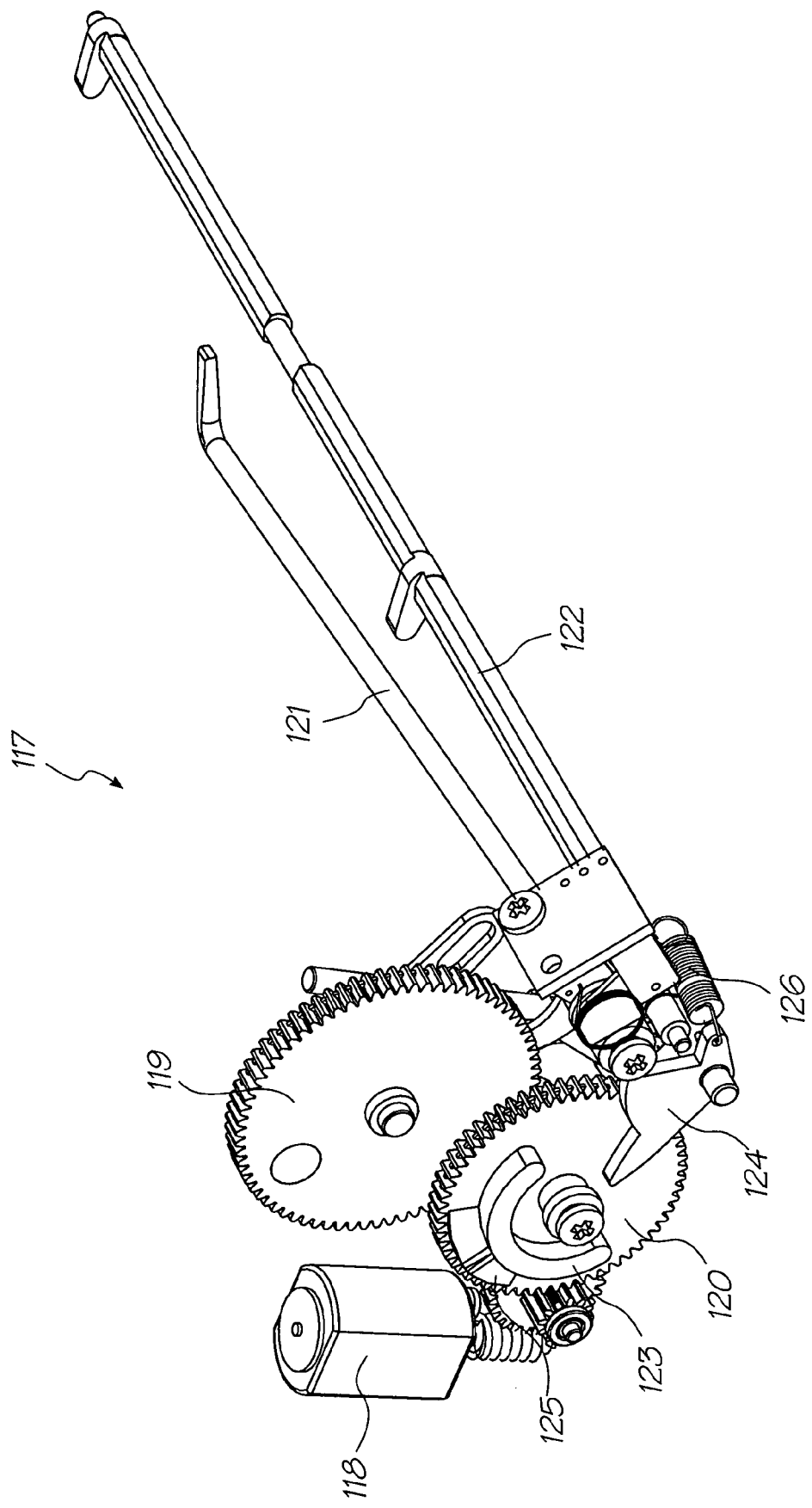
FIGS. 52A-52B show left and right perspective views of the maintenance drive assembly of the present invention remote from the frame structure of FIGS. 51A and 51B.
Figure 52B:
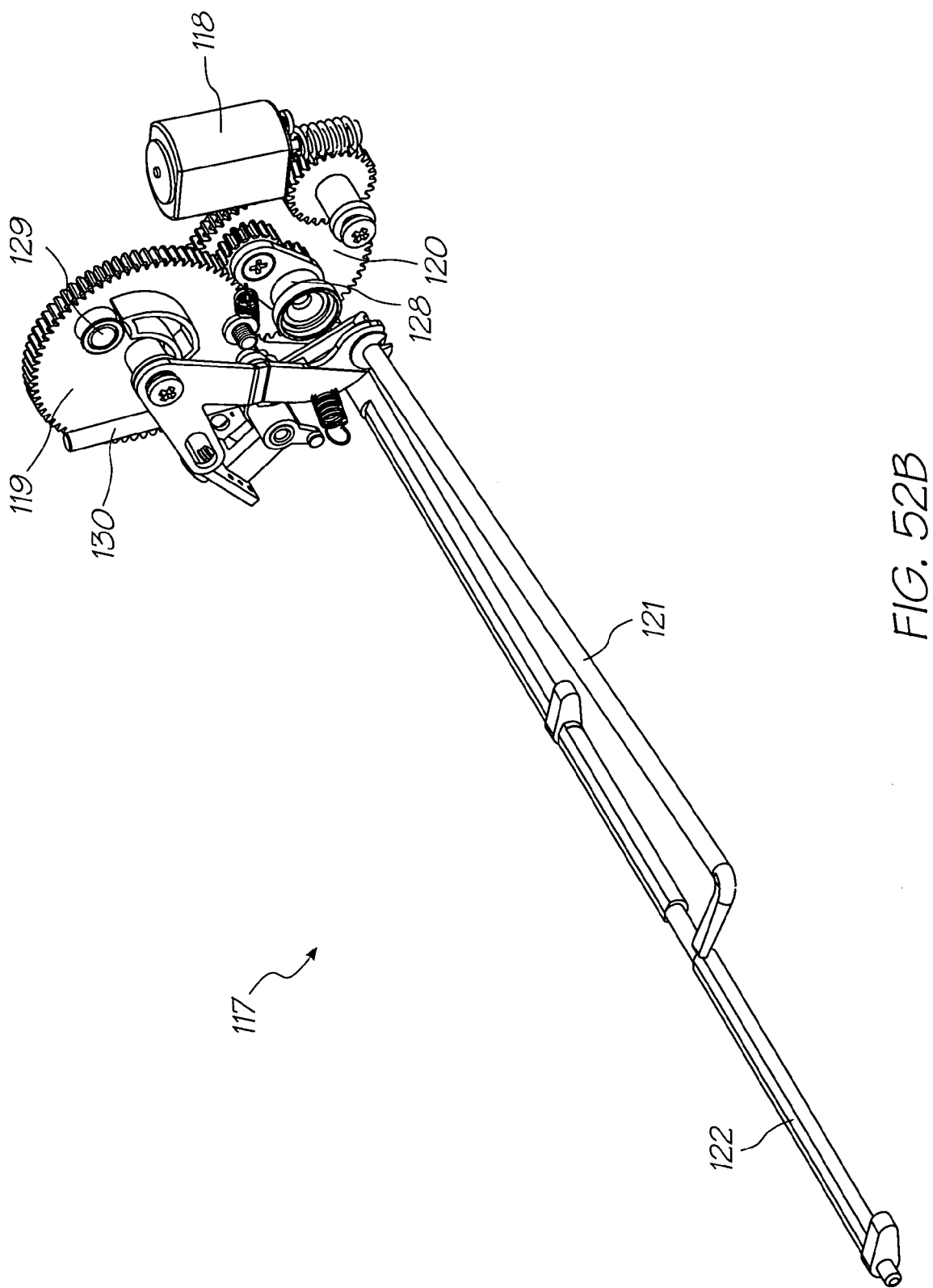

The maintenance drive assembly 117 is shown in isolation in FIGS. 52A and 52B. As the motor 118 is bi-directional, operation of the motor in one direction will cause the wiper gear 120 to move in a counter-clockwise direction as shown in FIG. 52A. The wiper gear 120, has a raised portion 123 formed on the surface thereof which comes into contact with an arm 124 of the wiper actuator as the wiper gear 120 rotates. As the raised portion 123 contacts the arm 124, the wiper actuator 122 pivots such that the projections formed thereon move in an upward direction through the window portions 92 in the maintenance chassis 88 and against the pin elements 99, thereby bring the micro fibre fabric 103 against the surface of the printhead assembly. Further rotation of the wiper gear 120 will result in the arm 124 returning to its neutral position.

Lateral movement can be applied to the wiper actuator 122 due to the presence of an additional angled raised portion 125 formed on the wiper gear 120 upon which the arm 124 rides causes the entire wiper actuator to move laterally against the returning spring 126. A sensor element 127 is provided to sense the position of the wiper actuator such that the state of the printhead can be readily determined.

In order to control the capping state of the printhead assembly 22, the motor 118 is reversed resulting in the wiper gear 120 moving in a clockwise direction as shown in FIG. 52A and a counter-clockwise direction as shown in FIG. 52B. Rotation of the wiper gear 120 in this direction ensures that the wiper actuator pivots in a downward direction away from the maintenance assembly 23. However as shown more clearly in FIG. 52B, this rotation causes a flipper gear 128 provided on the inner surface of the wiper gear 120 to engage with the maintenance gear 119 and in turn cause the maintenance gear 119 to rotate in a counter clockwise direction (as shown in FIG. 52B). Similarly, a projection 129 formed on the inner surface of the maintenance gear 119 contacts a pivot arm 130 of the maintenance actuator 121, thereby causing the hooked end of the maintenance actuator to move in a downward direction, which in turn grips the catch element 94 of the maintenance assembly 23 causing the upper rim portion 105 to retract and assume a printing state. Similarly, the sensor element 127 can sense the position of the maintenance actuator to control operation of the motor 118, and hence the desired state of the printhead.

Referring again to FIGS. 51A and 51B, a pair of cartridge unit guides 131 are attached to the end plates 111 to aid in receiving and guiding the cartridge unit 10 into the cradle unit 12. The guides 131 are angled to receive a surface of the cartridge unit 10 such that the cartridge unit 10 is orientated correctly with respect to the cradle unit 12.

The control electronics for controlling the operation of the print engine and the ICs 50 of the printhead assembly 22 is provided on a printed circuit board (PCB) 132. As shown in FIG. 51A, one face of the PCB 132 contains the SoPEC devices 133 and related componentry 134 for receiving and distributing the data and power received from external sources, whilst the other face of the PCB includes rows of electrical contacts 135 along a lower edge thereof which provides a means for transmitting the power and data signals to the corresponding electrical contacts on the flex PCB 79 for controlling the nozzles of the printhead assembly 22.

Figure 53:
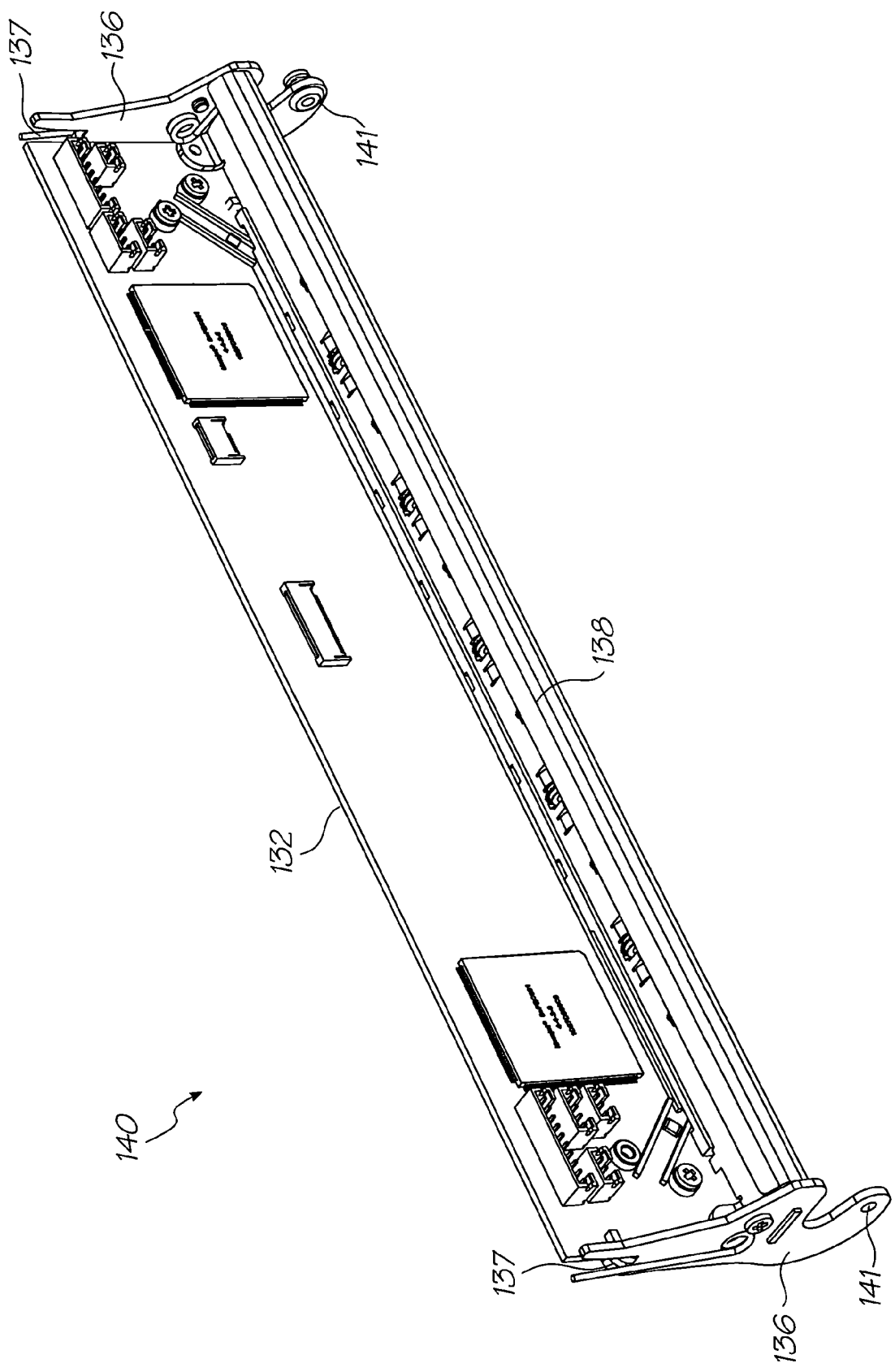
FIG. 53 shows a perspective view of the support bar assembly of FIGS. 51A and 51B assembled to the PCB assembly.
Figure 54:
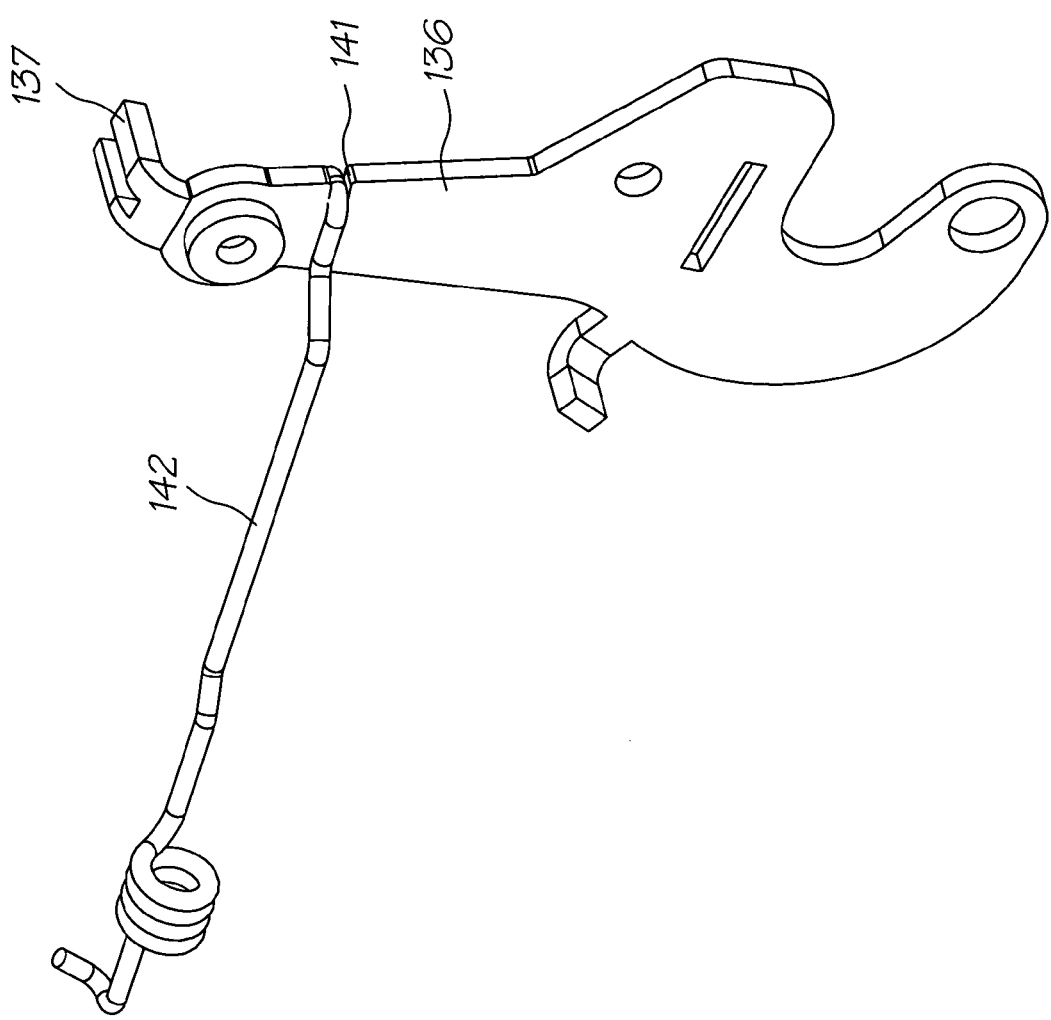
FIG. 54 shows a perspective side view of the arms of the support bar assembly of FIG. 53 connected to a spring element associated with the cover assembly.

As shown in isolation in FIG. 53, the PCB 132 forms part of a PCB assembly 140, and is mounted between two arms 136, with each of the arms having a claw portion 137 to receive and retain the PCB 132 in position. As shown in FIG. 54, each of the arms 136 has a groove 141 formed in the upper portion thereof for receiving a hook portion of a tension spring 142, the purpose of which will be described below.

In order to provide stability to the PCB 132 as it is mounted between the two arms 136, a support bar 138 is secured to the arms 136 and the PCB along the bottom edge of the PCB 132, on the face that contains the SoPEC devices 133 and the related componentry 134. The support bar 138 has a plurality of star wheels 139 mounted along its lower surface. The star wheels are spring loaded such that they can move relative to the lower surface of the support bar to grip with a surface of the exit roller 114 when the PCB assembly 140 is mounted to the end plates 111, as shown in FIG. 51A.

Figure 55A:
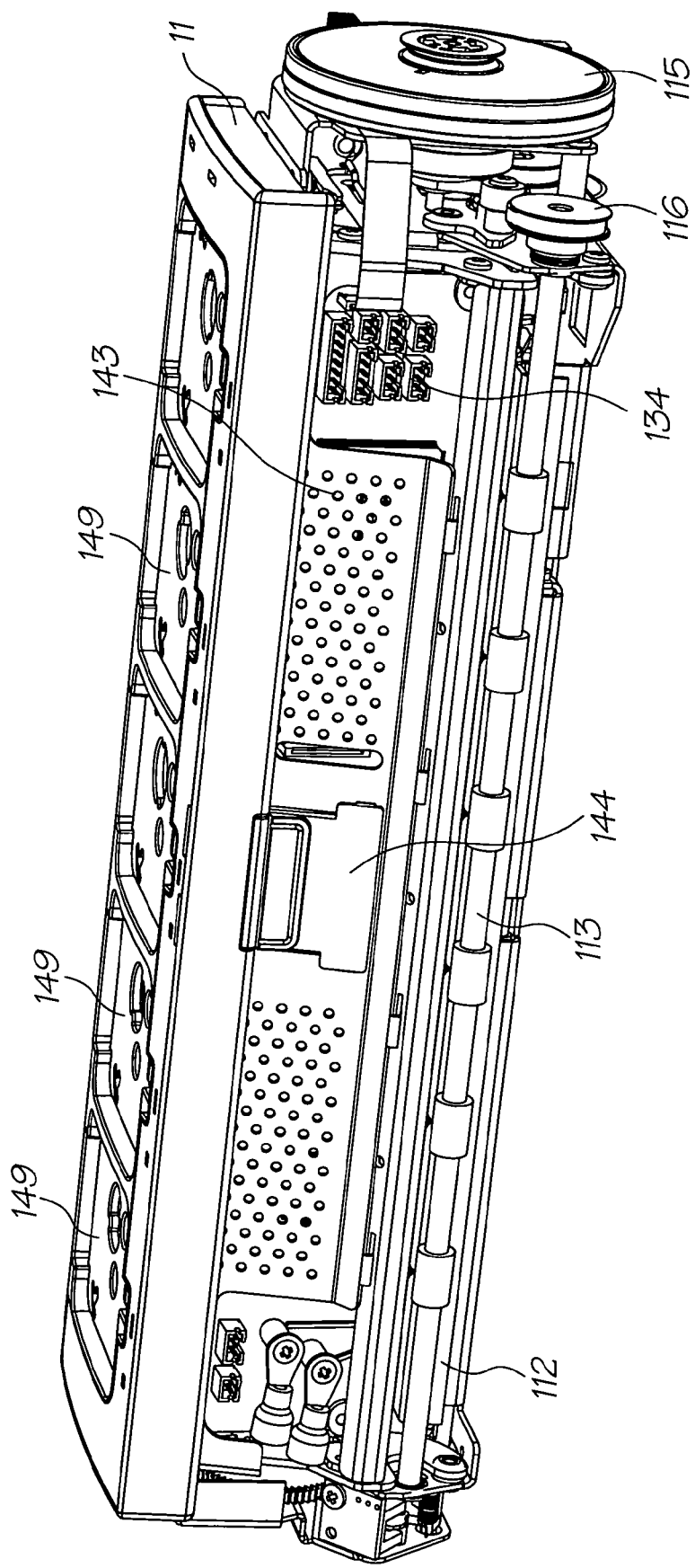
FIGS. 55A-55C show various views of the cradle unit according to one embodiment of the present invention.

A heatshield 143 is attached to the PCB 132, as shown in FIG. 55A such that it substantially covers the SoPEC devices 133 and protects the SoPEC devices from any EMI that may be within the vicinity of the printer unit 2. The heatshield 143 also has a latch mechanism 144 provided therein which mates with a clip provided on the cover assembly 11 to secure the cover assembly in a closed position as shown in FIG. 55A.

The PCB assembly 140 is pivotally mounted to the end plates 111 at pivot points 141 provided at the bottom of the arms 136. In this arrangement, the PCB assembly 140 is able to swing about its pivot points 141 between an open position, wherein the electrical contacts 135 are remote from the electrical contacts of the flex PCB 79 and the cartridge unit 10 can be readily removed from the cradle unit 12, and a closed position, where the electrical contacts 135 are in operational contact with the electrical contacts provided on the flex PCB 79 to transmit control data and power to facilitate printing from the nozzles of the printhead assembly 22.

Figure 55B:
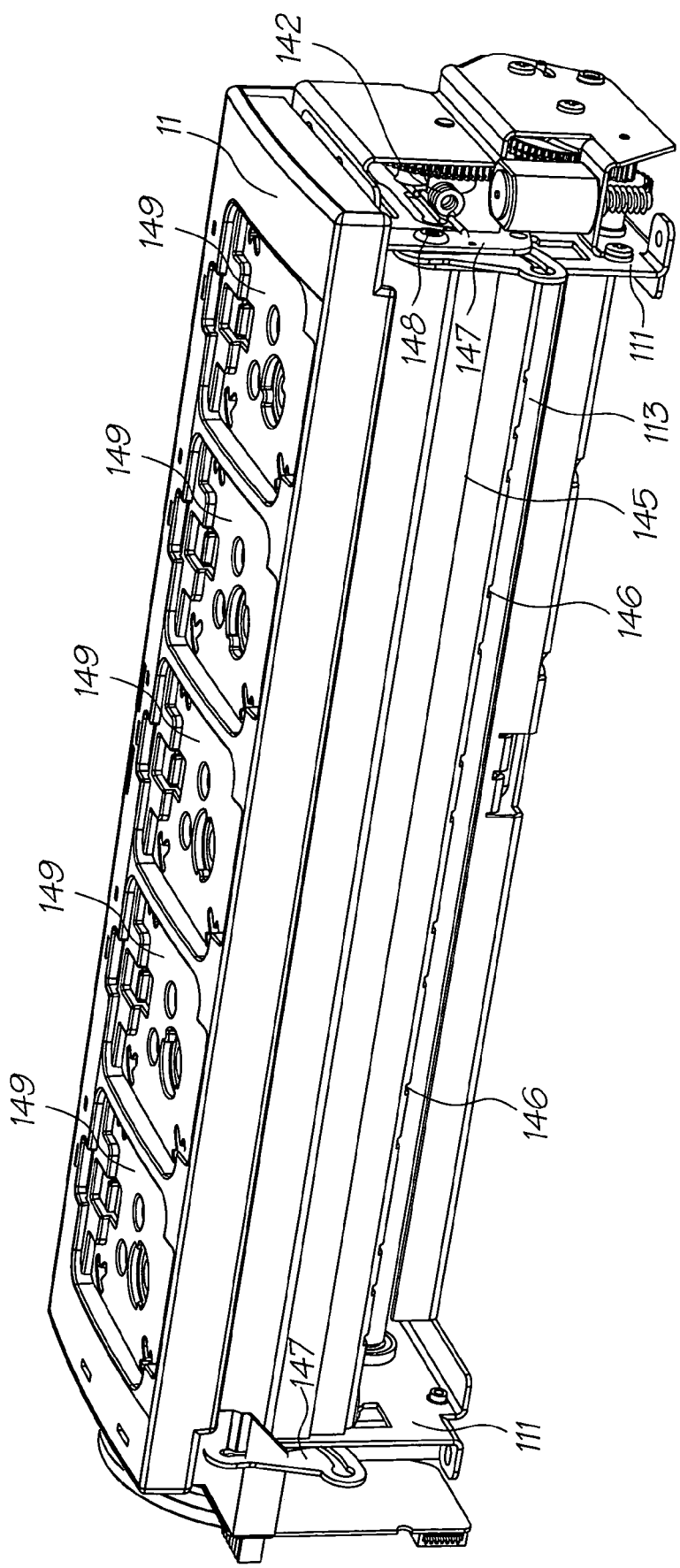

As shown in FIG. 55B, an idle roller assembly 145 is secured to the end plates 111 at the rear of the cradle unit 12 and includes a plurality of roller wheels 152 which are positioned to contact the surface of the drive roller 113 and rotate therewith. The idle roller assembly 145 ensures that any media that is presented to the print engine 1 from the picker mechanism 9 of the printer unit 2, is gripped between the drive roller 113 and the roller wheels 146 of the idle roller assembly 1145 for transport past the printhead assembly 22 of the cartridge unit 10 for printing.

The cover assembly 11, is shown in its closed position in FIGS. 55A and 55B, and is pivotally attached to the end plates 111 at an upper rear portion thereof. A pair of attachment plates 147 extend from the cover assembly 11 for attaching the cover assembly to the end plates 111 via a pin 148. The attachment plates 147 extend beyond the pin 148 and have a hole formed therein into which is received the free end of the tension spring 142 as discussed previously in relation to FIG. 54.

Figure 56A:
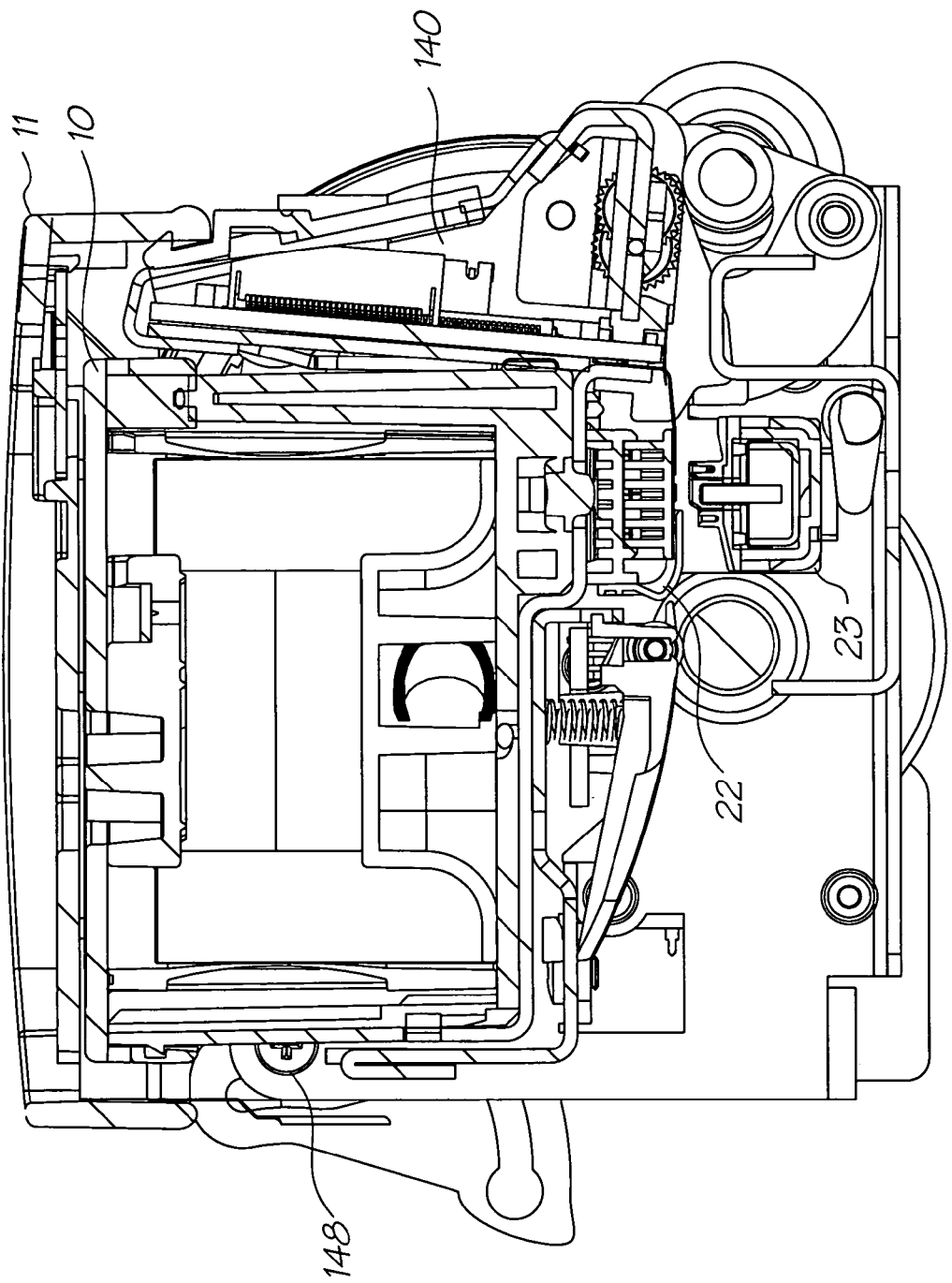
FIGS. 56A and 56B show sectional side views of the cradle unit with the cover assembly in a closed and open position respectively.

When the cover assembly 11 is in the closed position, as shown in FIG. 55B, the spring is in full tension which in turn causes the PCB assembly 40 to pivot towards the closed position, as shown in cross-section in FIG. 56A. In this position, the electrical contacts 135 of the PCB 132 are in operational contact with the corresponding electrical contacts of the flex PCB 79 of the printhead assembly 22 such that power and data signals can be transferred therebetween.

Figure 55C:
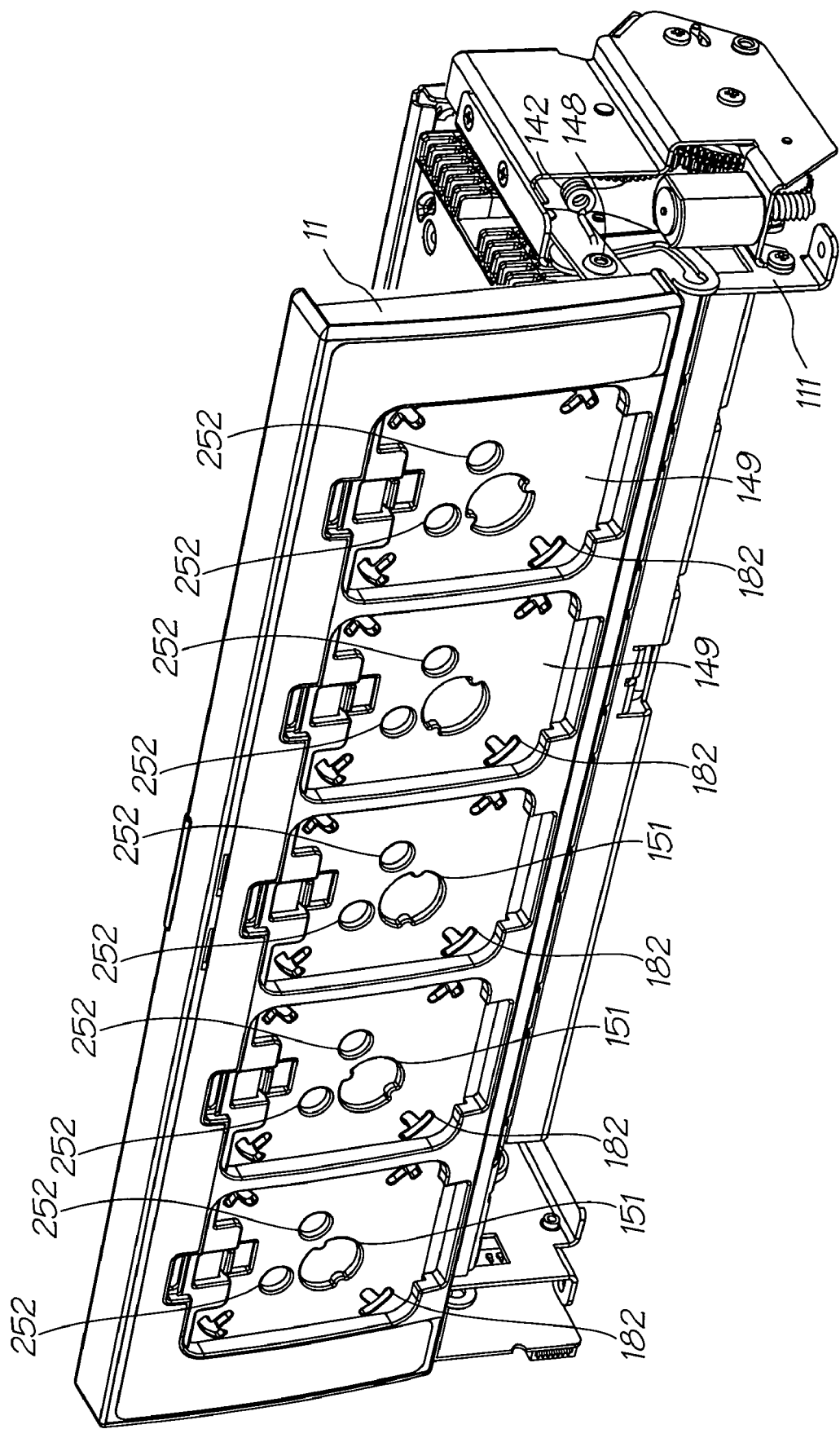
Figure 56B:
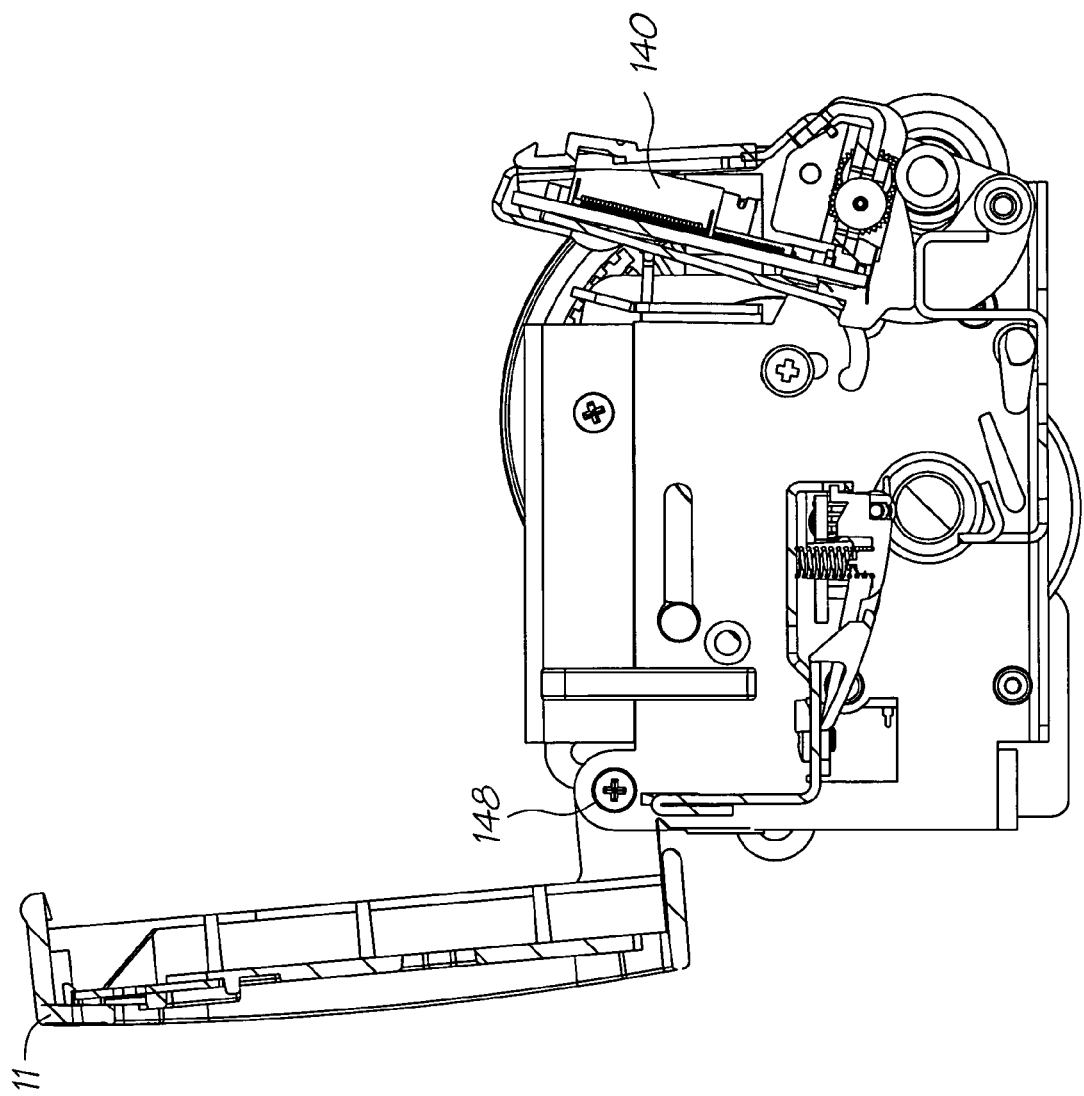

When the cover assembly is moved to its open position, as shown in FIG. 55C, the attachment plates 147 pivot towards the front of the cradle assembly thereby relieving tension in the spring 142 and causing the spring to become slack. This in turn, allows the PCB assembly to pivot away into an open position as shown in FIG. 56B. In this position, the electrical contacts 135 of the PCB 132 move away from contacting the corresponding contacts of the flex PCB 79 of the printhead assembly 22, to thereby enable the cartridge unit 10 to be removed from the cradle unit 12.

In this regard, the act of opening/closing the cover assembly 11 also performs the function of disengaging/engaging electrical communication between the cartridge unit 10 and the cradle unit 12.

Referring again to FIGS. 55A-55C, the cover assembly 11 includes a number of docking ports 149 formed in the upper surface thereof. In the embodiment shown there are five docking ports 149 provided, with each docking port corresponding to one of the ink storage modules 45. Each docking port 149 has an upwardly projecting lip portion which is shaped to receive an ink refill unit for supplying refill ink to the ink storage modules 45. As more clearly shown in FIG. 55C, each docking port 149 has a large, substantially circular opening 151 and two small circular openings 152 provided therein, which enable the delivery of ink between the ink refill unit and the cartridge unit 10 to occur in the manner as described below.

Four T-shaped openings 182 are positioned at the corners of each docking portion 149 to receive the bag constrictor actuators on the refill. These were briefly discussed above in relation to the ink storage modules 45 and are described in more detail below.

Refill Unit

Figure 57A:
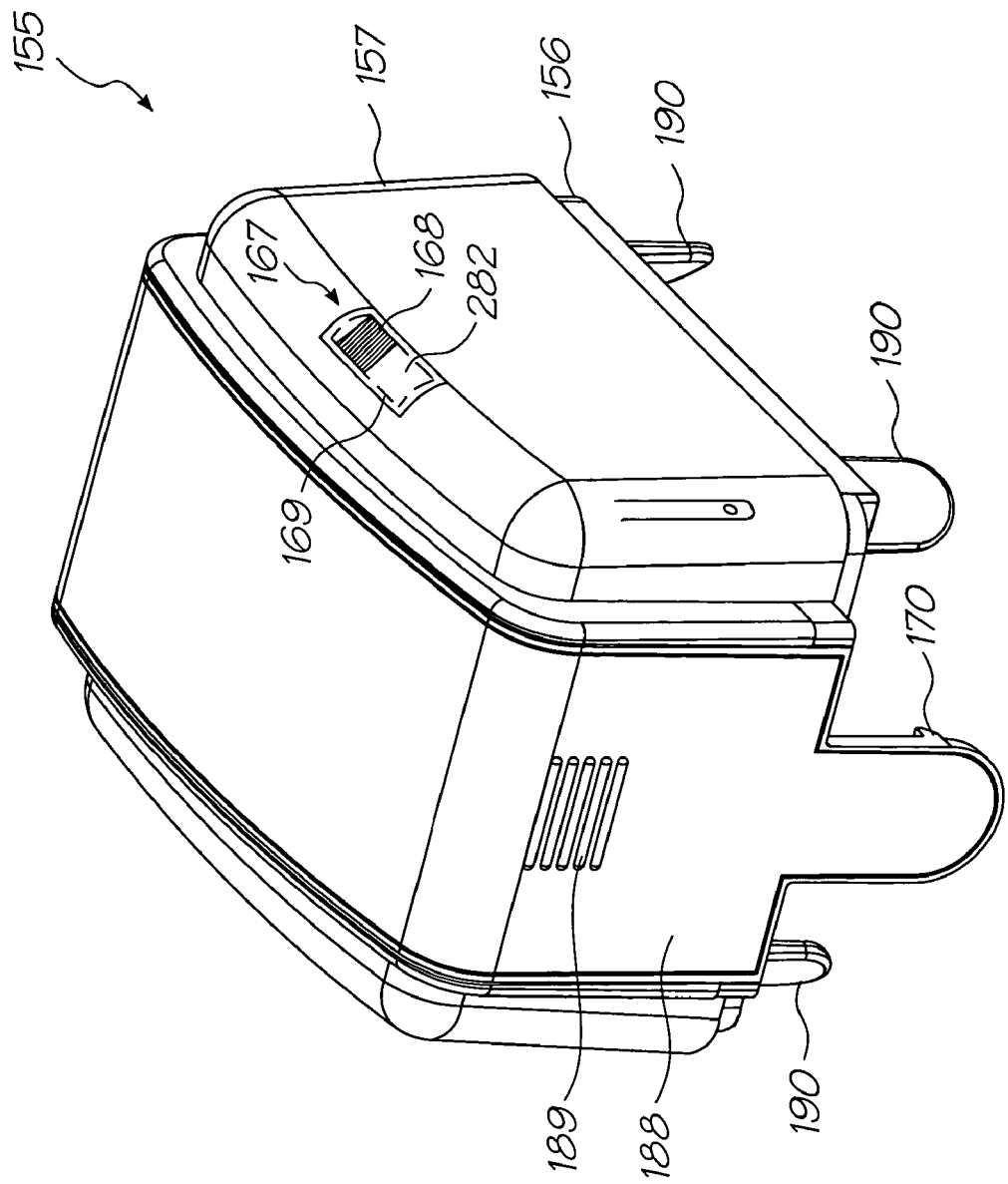
FIGS. 57A and 57B show top and bottom perspective views of the ink refill unit according to one embodiment of the present invention.
Figure 57B:
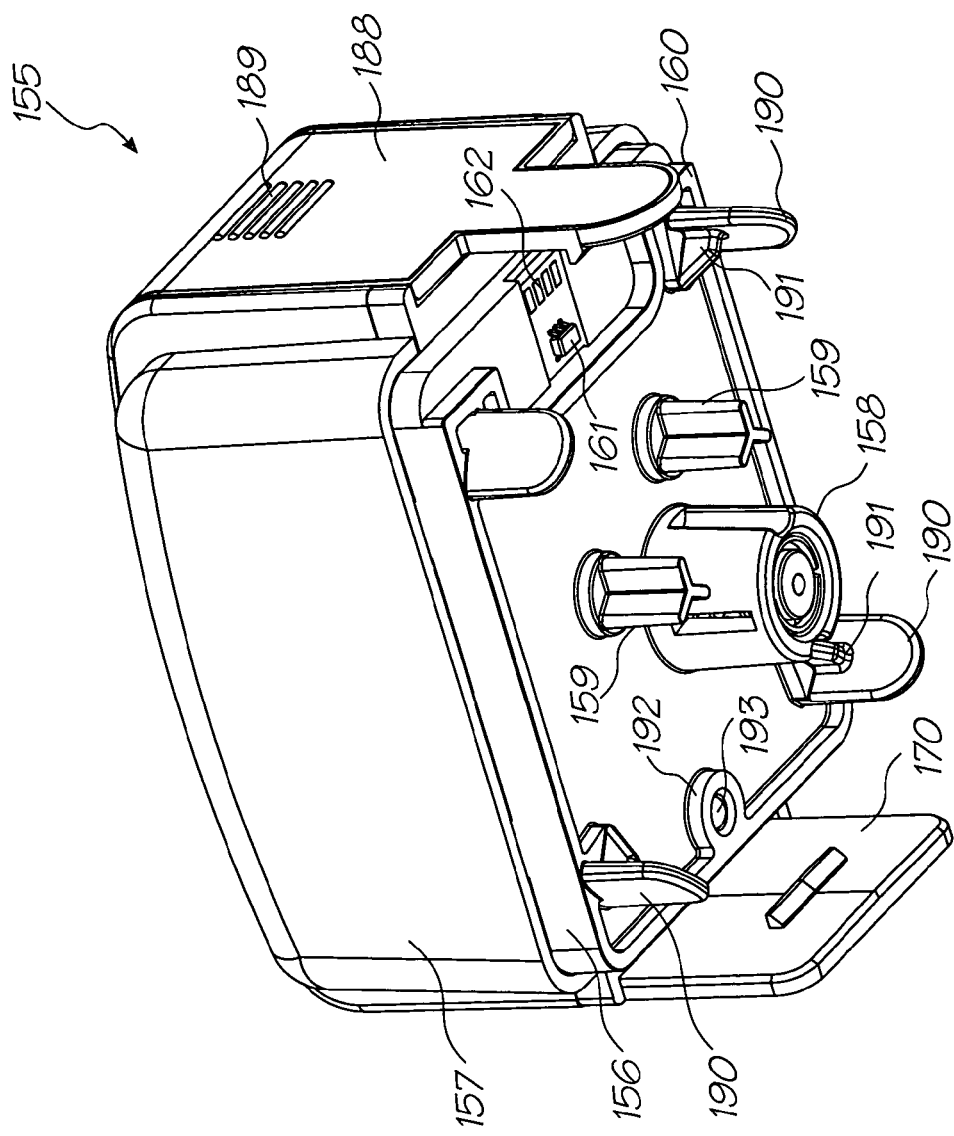

FIGS. 57A-57C show the ink refill unit 155 for supplying refill ink to the cartridge unit 10. The ink refill unit 155 is provided as a unit comprising a base assembly 156 which houses internal ink refilling components and a cover 157 which fits over the base assembly 156. The base assembly and cover may be moulded from a plastics material and the base assembly 156 may be moulded as a single piece or in sections.

The underside of the base assembly 156 is shown in more detail in FIG. 57B and includes a ridge portion 160 that projects therefrom and which mates with docking port 149 formed in the cover assembly 11, to retain the ink refill unit in docking position. A substantially cylindrical ink outlet 158 also projects from the underside of the base assembly for delivering ink into the cartridge unit 10. A two valve actuating pins 159 also project from the underside of the base assembly 156 for actuating the inlet and outlet valves of the ink storage modules 45 respectively. In the embodiment shown, the two valve actuating pins 159 have a tri star cross section for good unidirectional bending resistance and buckling strength. A QA chip 161 is also provided to project from the underside of the base assembly 156 and has a plurality of QA chip contacts 162 exposed thereon which are read by a QA chip reader provided in the cover assembly 11 when the ink refill unit 155 is docked therewith.

A constrictor actuator 190 projects from adjacent each corner of the base assembly 156. The constrictor actuators 190 are slightly arcuate and rounded at their ends. The constrictor apertures 60 (see FIG. 14) in the top 42 of the cartridge unit 10, are correspondingly arcuate. The rounded ends and arcuate cross section allow the user to easily align one constrictor actuator 190 with its corresponding aperture 60, and the curved surfaces intuitively guide the other constrictor actuators 190 into alignment with their respective apertures 60. This helps to dock the refill unit with the interface 61 quickly and with minimal fine positioning by the user. As best shown in FIG. 57B, each constrictor actuator 190 has a buttress reinforcement 191. This gives the constrictor actuators 190 a high bending strength in order to withstand large lateral forces in the event that users apply excessive force when aligning the refill unit with the docking port.

As described above with reference to FIG. 12, the constrictor actuators 190 actuate the bag constrictor 43 of the ink storage module 45.

The base assembly 156 also has a filling port 192. The bag 163 receives its initial charge of ink through this port which is then sealed with a plastic sealing ball 193.

Referring to the exploded view of FIG. 57C, an ink bag 163 is sealed to the inner surface of the base assembly 156 for storing the refill ink therein, and is made from a deformable material which allows the ink bag 163 to expand/collapse as ink is supplied to/removed from the ink refill unit 155. An ink delivery needle 164 extends into the space provided between the bag 163 and the base assembly 156 and provides a passage for ink to flow to the outlet 158. The end of the ink delivery needle 164 extends into the cylindrical outlet 158, and is surrounded by a seal ring 165 which is spring loaded via a compression spring 166 within the open end of the cylindrical outlet 158. When the ink refill unit 155 is not docked with the cartridge unit 10, the delivery needle is protected by the seal ring 165. As a further precaution, a plastic cap 187 is slid over the outlet and held in place by a slight interference fit.

An ink level indicator 167 is also provided within the cover 157 of the ink refill unit 155. The ink level indicator 167 comprises a flexible strip having an indication portion 168, such as a coloured section. The strip is attached to the upper surface of the deformable ink bag 163 at its ends and to the underside of the cover 157 at its centre, so that when the ink supply within the bag 163 is exhausted, i.e., the bag is substantially empty, the indication portion 168 aligns itself with a transparent window 169 provided in the top surface of the cover 157. In this regard, at any other time, i.e., when the bag is other than substantially empty, the indication portion is hidden from view.

As the ink dispenses, the nature of the ink bag material causes it to deform and collapse in a non-uniform manner. Each of the edges of the upper surface of the bag are unlikely to collapse at the same rate. As such, the length of the ink level indicator 167 is ensures that the indication portion 168 only aligns with the window 169 in the cover 157 once all of the edges of the deformable bag's upper surface have fully collapsed. In this regard, the ink level indicator strip 182 is initially in a folded state with the indication portion 168 being located on the strip 182 so as to be hidden from the window 169 when the bag 163 is full. The strip 167 is attached at either end to opposite edges of the bag's upper surface. A point (not shown) intermediate the ends is secured beneath the transparent window 169. When the bag 46 fully collapses the strip 167 lengthens and unfolds. This brings the previously hidden indication portion 168 into view through the window 169. The use of the ink level indicator 167 means that the one refill unit 155 can be used for multiple refill operations if the refill unit is not fully exhausted. This may occur when the amount of ink necessary for refilling the corresponding ink storage module 45 of the cartridge unit 10 in one operation is less than the capacity of the refill unit.

The cover 157 fits over a portion of the base assembly 156 to enclose the ink bag 163 and ink level indicator 167. Likewise, U-shaped docking clasp 183 fits over the cover 157 such that its legs extend beyond the base assembly 156 to engage the cartridge unit 10 when docked. Clips 170 on opposing legs of the clasp 183 snap lock onto the sides of the cartridge unit 10. This holds the refill unit 155 substantially fixed relative the cover assembly 11 for reliable and efficient transfer of ink.

An opposing pair of leaf springs 184 extend from inside each leg of the U-shaped clasp to press against the sides of the cover 157. Adjacent each leaf spring is a pivot 185 designed to engage a fulcrum ledge 186 on the side of the cover 157. This pushes the legs outwardly, however as the pivot 185 engages the fulcrum 186, the clips are levered inwardly to maintain engagement with the cartridge unit 10.

A label panel 188 is fixed to the outer surface of the clasp 183. The label panel 188 can display trademark and other information. It may also be coloured to match the ink within the refill. The label panel 188 also has finger grip pads 189 on each leg. The finger grip pads 189 are positioned so that finger pressure at these points will overcome the force of the leaf springs 184 to lever the clips 170 out of engagement with cartridge unit 10. The refill unit 155 may then be pulled off the docking port 149 of the cover assembly 11.

FIG. 58 shows the refill unit 155 docked directly with one of the interfaces 61 of the ink storage module assembly 11 of the cartridge unit 10. The cover assembly 11 and remainder of the cradle unit have been removed for clarity. The refill unit 155 is shaped, or 'keyed', such that it can only be received within the docking port 149 in one particular orientation. The ends of each leg of the U-shapes clasp 183 are significantly different widths so that the user is less likely attempt to dock the unit 155 back-to-front. The cylindrical ink outlet 158 is offset from the lateral centre line to also guard against back-to-front docking of the refill unit 155. As previously discussed, the base of the docking port 149 has a large circular opening 151, into which is received the cylindrical ink outlet 158, and two smaller openings 152, into which the valve actuators 159 are received. The cross sections of each of these interacting elements are shaped so that only the correctly coloured ink refill unit, in the correct orientation, can be used to refill each particular ink storage module 45. For example, the two tri star cross sections of the valve actuators 159 can each be rotated to give a large number of combinations that will only mate with corresponding tri star apertures, each with a matching rotational orientation.

A QA chip reader 172 is also provided in the base of the docking port 149 for mating with the QA chip contacts 162 of the QA chip 161 of the refill unit 155 and reading and receiving information stored thereon. Such information may include the storage capacity of the refill unit 155 (e.g., about 30 to about 50 ml), the colour of the ink contained within the refill unit 155, and the source of the ink contained within the ink refill unit 155. The information can be readily transferred to the control circuitry of the cradle unit 12 when the refill unit 155 is docked into position within the docking port 149. For example, the control circuitry of the cradle unit 12 is able to determine which of the ink storage modules 45 require refilling and whether the refill unit 155 contains the correct type/colour and amount of ink to facilitate refilling.

Figure 59:
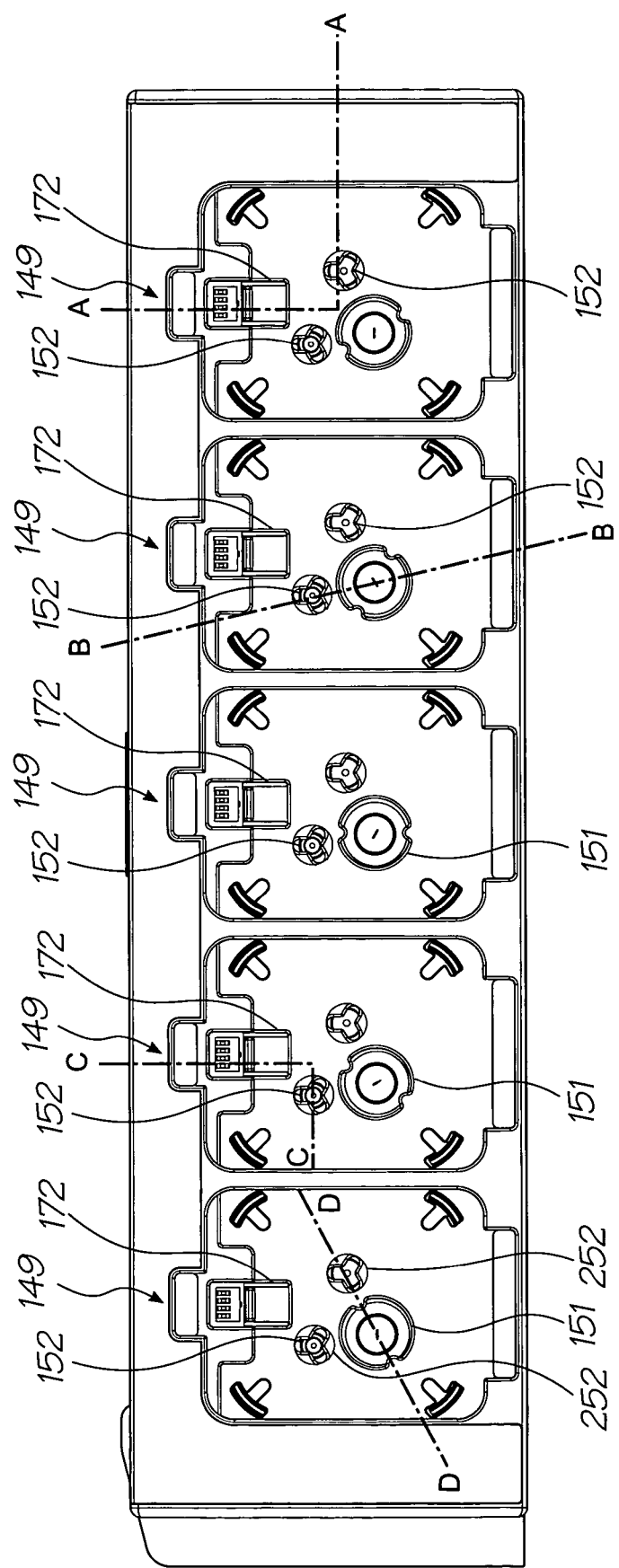
FIG. 59 shows a plan view of the cradle with the cartridge inside and the cover closed.

As shown more clearly in FIG. 59, the valve insert 49 of each of the ink storage modules 45 (see FIG. 10) is arranged such that the ink inlet 15 is aligned with the large circular opening 151 formed in the docking port 149, and the ink inlet and outlet valves 16 and 18 respectively, are aligned with the tri star openings 152. As the ink refill unit 155 is brought into position within the docking port 149, the ink outlet 158 of the refill unit 155 contacts the ink inlet 15 of the ink storage assembly 45, and the valve actuator pins 159 contact each of the ink inlet valve 16 and ink outlet valve 18.

In this position, the ink delivery needle 164 penetrates the ink inlet 15 of the valve insert 49 as the spring loaded seal ring 165 retracts within the cylindrical ink outlet 158 to form a tight seal around the surface of the ink inlet 15. The seal ring 165 is able to 'ride' up the ink delivery needle 164 and is loaded such that upon removal of the refill unit 155 from the docking port 149, the seal ring is returned to its protection position via action of a seal spring 166.

As discussed previously, the ink retained within ink bag 46 of the ink storage module 45 is in a constant state of negative pressure due to the spring element 54 applying a constant expansion force to the ink bag 46. This produces a negative or back pressure in the ink, thereby preventing ink from leaking from the nozzles of the printhead assembly 22. This back pressure also provides a simple means for extracting the refill ink from the refill unit 155 when the refill unit is docked into position. Due to a pressure gradient between the ink bag of the refill unit 155 (which is at atmospheric pressure) and the ink bag of the ink storage module 45, when the ink delivery needle 164 penetrates the ink inlet 15, the refill ink simply flows from the refill init 155 into the ink bag 46 of the ink storage module 45.

In order to alternate between a refilling operation and a printing operation and to maintain the ink in the printhead assembly 22 in a constant state of back pressure such that ink does not leak from the nozzles during refilling, valves 16 and 18 are provided in the valve insert as discussed above. Both valves are controlled by the valve actuator pins 159 when the refill unit is docked into position with the docking port 149. The manner in which the valves are controlled is shown with reference to FIGS. 60A-60D.

Figure 60A:
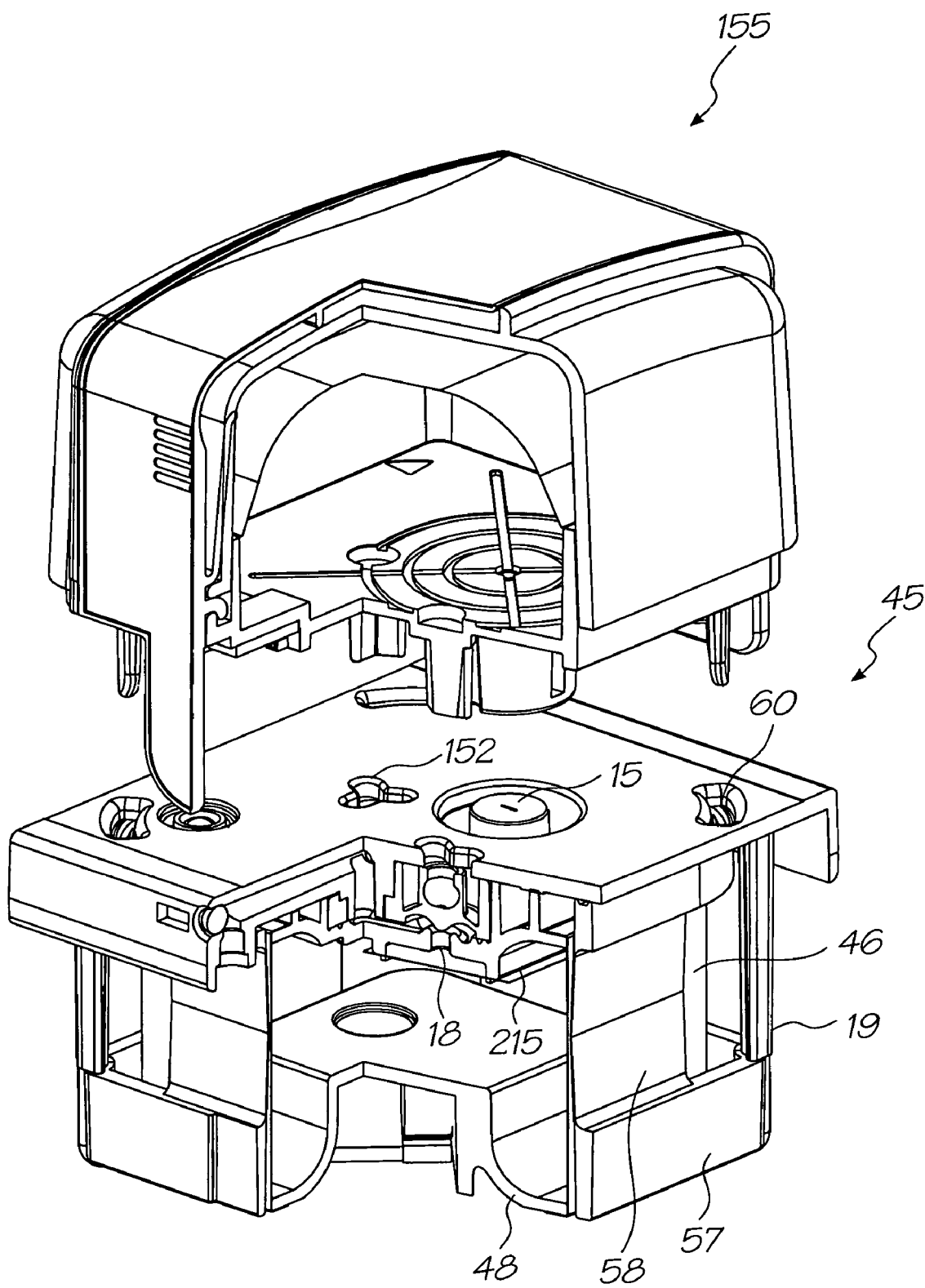
FIG. 60A shows a cross-sectional view of the ink refill unit and the print engine along line A-A of FIG. 59.
Figure 60B:
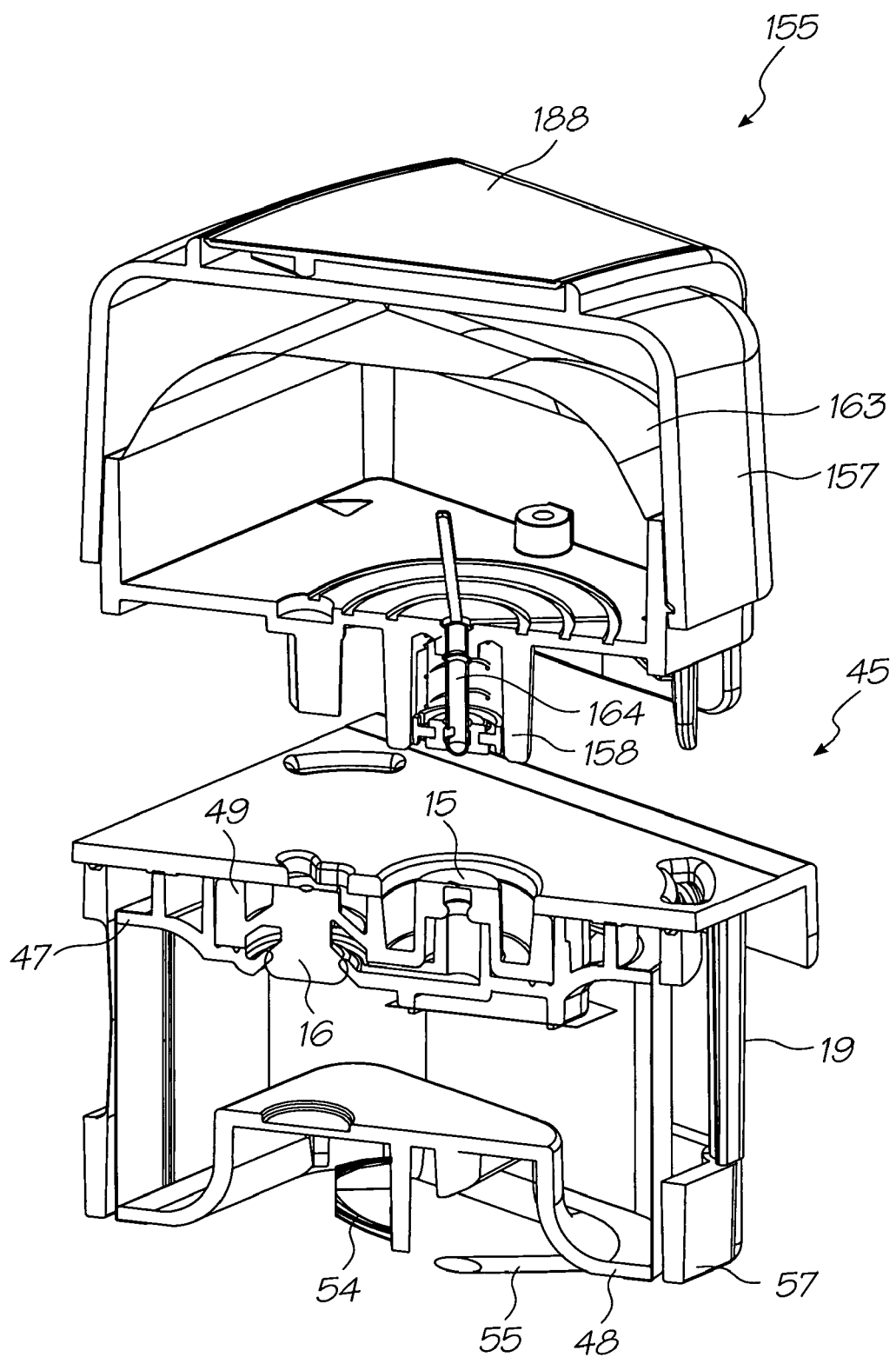
FIG. 60B shows a cross-sectional view of the ink refill unit and the print engine along line B-B of FIG. 59.
Figure 60C:
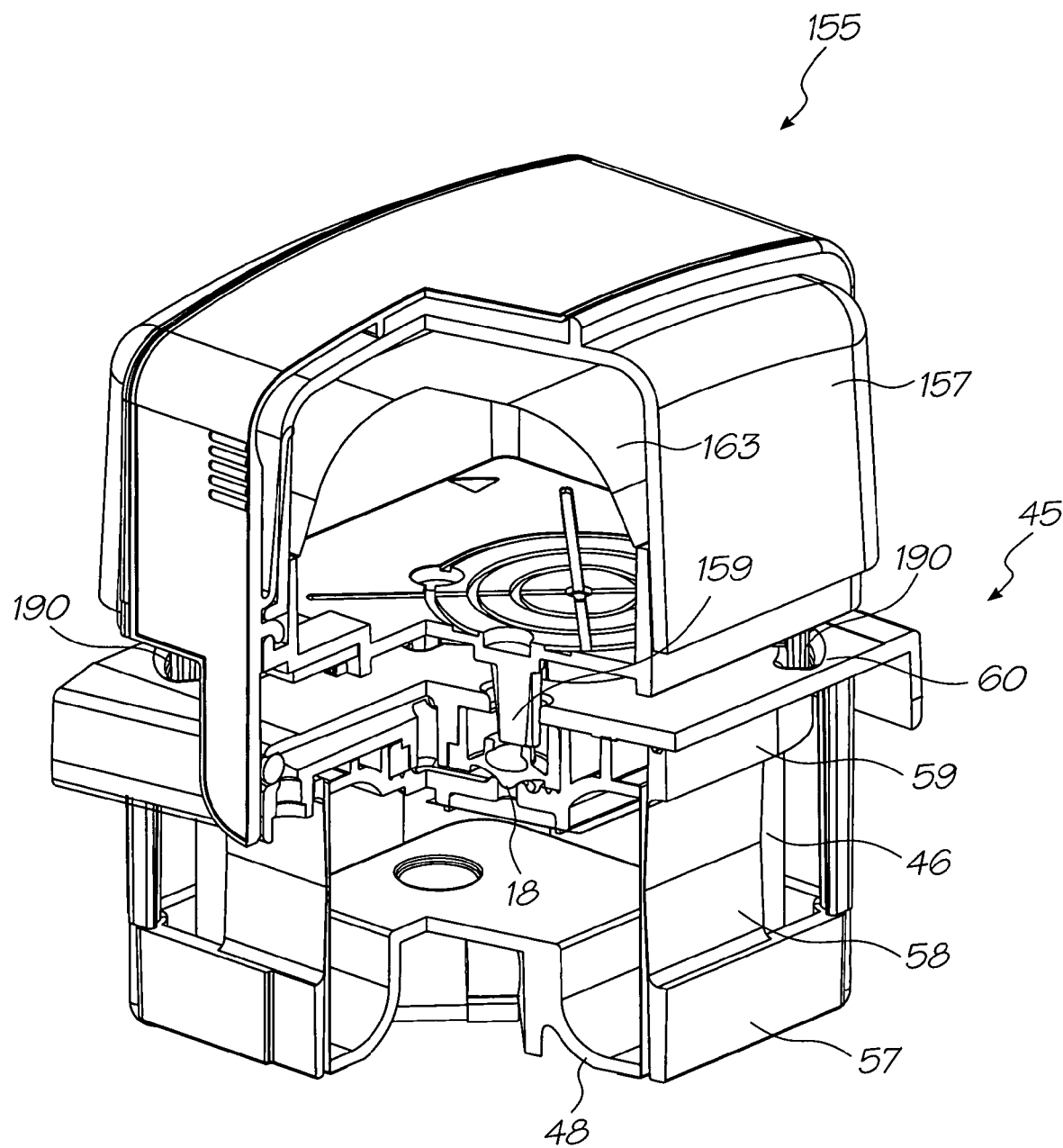
FIG. 60C shows a cross-sectional view of the ink refill unit in docking position with the print engine along line C-C of FIG. 59.
Figure 60D:
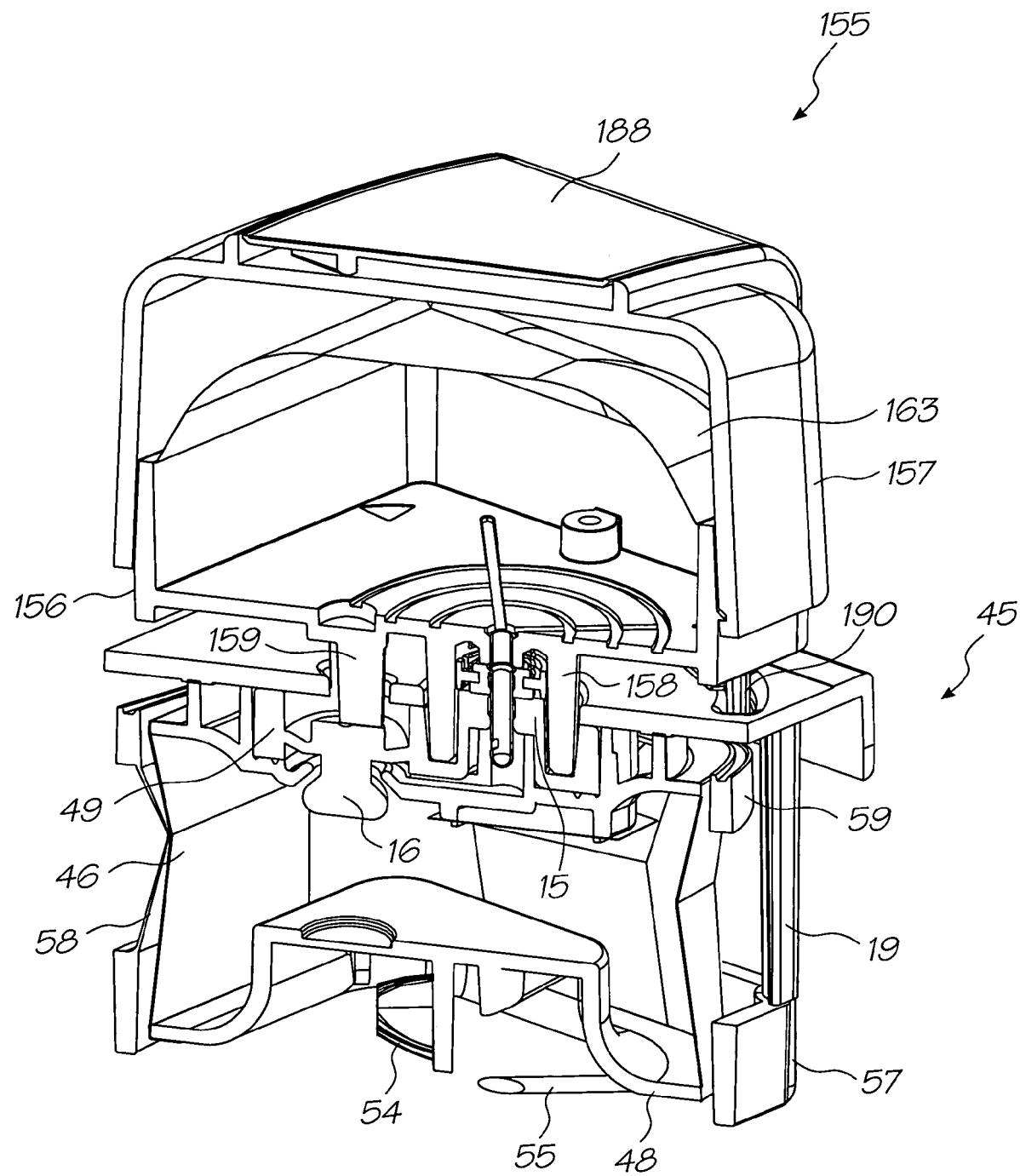
FIG. 60D a cross-sectional view of the ink refill unit in docking position with the print engine along line D-D of FIG. 59.

FIGS. 60A and 60B show different cross-sectional views respectively along lines A-A and B-B in FIG. 59 illustrating a state of the valve arrangement before refilling, and FIGS. 60C and 60D respectively show the views of FIGS. 60A and 60B illustrating a state of the valve arrangement during refilling.

Prior to refilling, as shown in FIGS. 60A and 60B, the ink inlet valve 16 is in a closed position, thereby preventing the passage of ink or air from entering the ink inlet 15 and making its way into the ink bag 46. This is shown in FIG. 60B, whereby any ink present in the passage between the ink inlet 15 and the ink inlet valve 16 remains in this space. An o-ring seal is provided at the ink inlet 15 to maintain an air tight seal around the ink delivery needle 164 of the refill unit 155. In this state, the ink outlet valve 18 is in an open position thereby providing a passage for ink to flow out the ink outlet 52, down the ink downpipe 30 and to the printhead assembly 22. As discussed, the spring element 54 establishes a state of back pressure within the ink bag 46, and the printhead 22 draws the ink from the ink bag 46 against this back pressure during printing.

During refilling, as shown in FIGS. 60C and 60D, the ink refill unit 155 is docked into the docking port 149 such that the ink outlet 158 engages with the ink inlet 15 of the valve insert 49 and the valve actuator pins 159 come into engagement with the valves 16 and 18. As shown in FIG. 60C, contact of the valve actuator pin with the ink outlet valve 18 causes the valve 18 to be depressed and close, thereby preventing further ink flow from the ink outlet 52 to the printhead assembly 22. In this regard, ink present in the passage from the closed ink outlet valve 18 to the printhead assembly 22 remains stationary until the ink outlet valve 18 opens.

As shown more clearly in FIG. 60D, when the valve actuator pin 159 contacts the ink inlet valve 16 and depresses the valve, the valve opens allowing a passage for the ink to flow from the refill unit 155 to the ink bag 46. Due to the back pressure present in the ink bag 46, the ink is drawn into the ink bag due to the pressure differential and as the ink bag 46 fills and expands with ink, the spring element 54 maintains a constant force between the ink bag 46 and the retainer element 55, thereby also maintaining a constant back pressure within the ink in the ink bag 46. This continues until the ink bag 46 reaches its maximum capacity whereby the pressure of the ink present in the ink bag 46 equalises with the pressure of the ink of the refill unit 155 and no more ink is drawn from the refill unit 155.

Bag constrictor actuators 190 extend through the apertures 60 to press the upper constrictor collar 59 towards the lower constrictor collar 57 to bow the side panels 58 inwards and constrict the bag 46. As discussed above with reference to FIG. 12, the bag constrictor 43, re-establishes the negative pressure in the ink bag 46 as the refill unit is removed, by releasing the constriction.

While the present invention has been illustrated and described with reference to exemplary embodiments thereof, various modifications will be apparent to and might readily be made by those skilled in the art without departing from the scope and spirit of the present invention. Accordingly, it is not intended that the scope of the claims appended hereto be limited to the description as set forth herein, but, rather, that the claims be broadly construed.

The invention claimed is:

1. A method of sealing an attachment face of a micro system technologies (MST) device to a mounting surface on a support member, the attachment face having a plurality of ink inlets, and the support member having a plurality of apertures along a length thereof, the method comprising the steps of:

applying a thermosetting adhesive to the mounting surface, the thermosetting adhesive having an array of apertures therethrough;

aligning an aperture of the thermosetting adhesive to overlap with at least two ink inlets of the attachment face;

aligning the aperture of the attachment face with at least part of one aperture of the support member;

heating the attachment face to a temperature above ambient but less than the curing temperature of the thermosetting adhesive;

pressing the heated attachment face and the mounting surface together; and, heating the thermosetting adhesive and the attachment face above the curing temperature to cure the thermosetting adhesive wherein the ink inlets are arranged as a plurality of channels, each channel separated into a plurality of channel sections by a wall structure, and the method further comprises a step of aligning an aperture of the thermosetting adhesive to overlap the ink inlets of two separate channel section, whereby one aperture supplies ink to two channel sections.

2. A method according to claim 1 wherein the thermosetting adhesive is applied to the mounting surface as a laminated film having a central web with a layer of the thermosetting adhesive on either side.

3. A method according to claim 2 wherein the opening in the laminated film is laser drilled.

4. A method according to claim 3 wherein the laminated film is drilled with a UV laser so as to not cure the thermosetting adhesive layers immediately adjacent the opening.

5. A method according to claim 4 wherein the central web is a polyimide film.

6. A method according to claim 5 wherein the polyimide film is more than 25 microns thick.

7. A method according to claim 6 wherein the polyimide film about 50 microns thick.

8. A method according to claim 2 wherein each of the thermosetting adhesive layers is more than 12 microns thick.

9. A method according to claim 8 wherein each of the thermosetting adhesive layers are about 25 microns thick.

10. A method according to claim 1, wherein the ink inlets are arranged as a series of channels in the attachment face.

11. A method according to claim 10 wherein the channels are more than 50 microns wide and spaced from adjacent channels by more than 50 microns.

12. A method according to claim 11 wherein the attachment face has recesses adjacent the channels to hold thermosetting adhesive displaced from between the attachment face and polyimide layer.

13. A method according to claim 2 wherein the laminated film is sandwiched between two protective liners, the liner on the support member side of the laminated film being removed after laser drilling the opening but before the attachment of the support structure and the protective liner on the MST device side is removed prior to attaching the MST device.

14. A method according to claim 13 wherein the protective liners are polyethylene terephthalate (PET).

15. A method according to claim 2 wherein the thermosetting adhesive layers have different curing temperatures so that the laminated film is cured to the support member before the MST device is attached without the MST device side thermosetting adhesive curing until after the MST device is attached.

16. A method according to claim 1 wherein the MST device is a printhead integrated circuit (IC) and the support structure is a liquid crystal polymer (LCP) molding.

17. A method according to claim 2 wherein the support structure has at least one fiducial marker on the mounting face and the array of openings is aligned with the array of outlet apertures using a vision system tracking a predetermined opening within the array of openings, relative to the at least one fiducial marker.

18. A method according to claim 1, wherein the thermosetting adhesive has a viscosity of between 100 centiPoise and 10,000,000 centiPoise.

* * * * *